(12) United States Patent
Bodner et al.

(10) Patent No.: US 8,491,311 B2
(45) Date of Patent: Jul. 23, 2013

(54) SYSTEM AND METHOD FOR ANALYSIS AND FEEDBACK OF STUDENT PERFORMANCE

(75) Inventors: Mark Bodner, Placentia, CA (US); Gordon L. Shaw, Laguna Beach, CA (US); Matthew R. Peterson, Albany, CA (US)

(73) Assignee: Mind Research Institute, Irvine, CA (US)

( * ) Notice: Subject to any disclaimer, the term of this patent is extended or adjusted under 35 U.S.C. 154(b) by 1422 days.

(21) Appl. No.: 10/675,232

(22) Filed: Sep. 29, 2003

(65) Prior Publication Data

US 2004/0180317 A1 Sep. 16, 2004

Related U.S. Application Data

(60) Provisional application No. 60/414,981, filed on Sep. 30, 2002.

(51) Int. Cl.
*G09B 7/00* (2006.01)

(52) U.S. Cl.
USPC ........... 434/323; 434/118; 434/169; 434/187; 434/322; 434/335; 434/336; 434/350; 434/362; 434/365; 434/430; 706/45; 706/46; 706/927

(58) Field of Classification Search
USPC ................. 434/322, 350, 353, 323, 365, 118, 434/167, 187, 188, 335, 336, 362, 430; 706/45, 706/46, 927
See application file for complete search history.

(56) References Cited

U.S. PATENT DOCUMENTS

| | | | |
|---|---|---|---|
| 3,596,377 A | 8/1971 | Abbey | |
| 3,698,277 A | 10/1972 | Barra | |
| 4,402,249 A | 9/1983 | Zankman | |
| 4,416,182 A | 11/1983 | Wise et al. | |
| 4,820,165 A | 4/1989 | Kanapa | |
| 4,867,685 A | 9/1989 | Brush et al. | |

(Continued)

FOREIGN PATENT DOCUMENTS

WO    WO 2007/028142    3/2007

OTHER PUBLICATIONS

Today@UCI: Press Releases: Piano and Computer Training Boost Student Math Achievement, UC Irvine Study Shows [online]. Mar. 15, 1999 [retrieved on Mar. 16, 2008]. Retrieved from the Internet: <URL: http://today.uci.edu/news/release_detail.asp?key=646>.*

(Continued)

*Primary Examiner* — Jack Yip
(74) *Attorney, Agent, or Firm* — Knobbe, Martens, Olson & Bear LLP

(57) ABSTRACT

Embodiments of systems and methods are disclosed that analyze student performance and provide feedback regarding the student performance, for example, to an instructor, other school official, parent or directly to the student. In certain embodiments, the methods and systems communicate in real time with the educational program, for example, math or science games, lessons, quizzes or tests, to provide contemporaneous feedback or recommendations to the instructor regarding student performance. In addition, embodiments of the systems and methods evaluate and provide feedback of the effectiveness of the educational program itself, and track progress at different levels, for example, a student, class, school or district level, over a multitude of different durations and time periods. Still further, embodiments of the systems and methods perform comprehensive data analysis and statistical computations.

16 Claims, 33 Drawing Sheets

U.S. PATENT DOCUMENTS

| | | | |
|---|---|---|---|
| 5,059,127 A * | 10/1991 | Lewis et al. | 434/353 |
| 5,169,342 A | 12/1992 | Steele et al. | |
| 5,261,823 A | 11/1993 | Kurokawa | |
| 5,302,132 A | 4/1994 | Corder | |
| 5,447,166 A | 9/1995 | Gevins | |
| 5,447,438 A | 9/1995 | Watanabe et al. | |
| 5,478,240 A | 12/1995 | Cogliano | |
| 5,486,112 A | 1/1996 | Troudet et al. | |
| 5,533,903 A | 7/1996 | Kennedy | |
| 5,574,238 A | 11/1996 | Mencher | |
| 5,584,699 A | 12/1996 | Silver | |
| 5,590,057 A | 12/1996 | Fletcher et al. | |
| 5,618,182 A | 4/1997 | Thomas | |
| 5,690,496 A | 11/1997 | Kennedy | |
| 5,727,951 A * | 3/1998 | Ho et al. | 434/362 |
| 5,746,605 A | 5/1998 | Kennedy | |
| 5,779,486 A * | 7/1998 | Ho et al. | 434/353 |
| 5,783,764 A | 7/1998 | Amar | |
| 5,797,130 A | 8/1998 | Nelson et al. | |
| 5,806,056 A * | 9/1998 | Hekmatpour | 706/50 |
| 5,810,605 A * | 9/1998 | Siefert | 434/362 |
| 5,820,386 A * | 10/1998 | Sheppard, II | 434/322 |
| 5,822,745 A * | 10/1998 | Hekmatpour | 706/59 |
| 5,827,066 A | 10/1998 | Henter | |
| 5,841,655 A * | 11/1998 | Stocking et al. | 700/83 |
| 5,842,868 A | 12/1998 | Phillips | |
| 5,870,731 A | 2/1999 | Trif et al. | |
| 5,870,768 A * | 2/1999 | Hekmatpour | 715/207 |
| 5,904,485 A | 5/1999 | Siefert | |
| 5,907,831 A | 5/1999 | Lotvin et al. | |
| 5,934,909 A * | 8/1999 | Ho et al. | 434/362 |
| 5,956,040 A | 9/1999 | Asano et al. | |
| 5,957,699 A * | 9/1999 | Peterson et al. | 434/350 |
| 5,987,302 A | 11/1999 | Driscoll et al. | |
| 5,987,443 A | 11/1999 | Nichols et al. | |
| 6,000,945 A * | 12/1999 | Sanchez-Lazer et al. | 434/322 |
| 6,020,886 A | 2/2000 | Jacober et al. | |
| 6,030,226 A | 2/2000 | Hersh | |
| 6,045,515 A * | 4/2000 | Lawton | 600/558 |
| 6,047,261 A | 4/2000 | Siefert | |
| 6,072,113 A | 6/2000 | Tohgi et al. | |
| 6,077,085 A | 6/2000 | Parry et al. | |
| 6,112,049 A * | 8/2000 | Sonnenfeld | 434/350 |
| 6,118,973 A * | 9/2000 | Ho et al. | 434/362 |
| 6,144,838 A | 11/2000 | Sheehan | |
| 6,155,971 A * | 12/2000 | Calhoun et al. | 600/28 |
| 6,164,971 A | 12/2000 | Figart | |
| 6,166,314 A | 12/2000 | Weinstock et al. | |
| 6,186,794 B1 * | 2/2001 | Brown et al. | 434/116 |
| 6,206,700 B1 * | 3/2001 | Brown et al. | 434/116 |
| 6,213,956 B1 * | 4/2001 | Lawton | 600/558 |
| 6,270,352 B1 | 8/2001 | Ditto | |
| 6,281,422 B1 | 8/2001 | Kawamura | |
| 6,288,315 B1 | 9/2001 | Bennett | |
| 6,334,779 B1 * | 1/2002 | Siefert | 434/322 |
| 6,336,813 B1 * | 1/2002 | Siefert | 434/322 |
| 6,364,666 B1 | 4/2002 | Jenkins et al. | |
| 6,386,883 B2 * | 5/2002 | Siefert | 434/322 |
| 6,388,181 B2 | 5/2002 | Moe | |
| 6,390,918 B1 | 5/2002 | Yagi et al. | |
| 6,418,298 B1 * | 7/2002 | Sonnenfeld | 434/350 |
| 6,419,496 B1 | 7/2002 | Vaughan | |
| 6,435,508 B1 | 8/2002 | Tavel | |
| 6,480,698 B2 | 11/2002 | Ho et al. | |
| 6,484,010 B1 * | 11/2002 | Sheehan | 434/362 |
| 6,486,388 B2 | 11/2002 | Akahori | |
| 6,513,042 B1 | 1/2003 | Anderson et al. | |
| 6,514,084 B1 * | 2/2003 | Thomas | 434/322 |
| 6,526,258 B2 * | 2/2003 | Bejar et al. | 434/350 |
| 6,565,359 B2 | 5/2003 | Calhoun et al. | |
| 6,582,235 B1 | 6/2003 | Tsai et al. | |
| 6,629,892 B2 | 10/2003 | Oe et al. | |
| 6,644,973 B2 | 11/2003 | Oster | |
| 6,648,648 B1 | 11/2003 | O'Connell | |
| 6,676,412 B1 | 1/2004 | Masterson et al. | |
| 6,676,413 B1 * | 1/2004 | Best et al. | 434/178 |
| 6,688,889 B2 | 2/2004 | Wallace et al. | |
| 6,699,123 B2 | 3/2004 | Matsuura et al. | |
| 6,716,033 B1 | 4/2004 | Lassowsky | |
| 6,751,439 B2 | 6/2004 | Tice et al. | |
| 6,755,657 B1 * | 6/2004 | Wasowicz | 434/167 |
| 6,755,661 B2 | 6/2004 | Sugimoto | |
| 6,827,578 B2 * | 12/2004 | Krebs et al. | 434/118 |
| 6,905,340 B2 | 6/2005 | Stansvik | |
| 6,915,286 B2 * | 7/2005 | Policastro et al. | 1/1 |
| 6,978,115 B2 | 12/2005 | Whitehurst et al. | |
| 6,978,244 B2 * | 12/2005 | Rovinelli et al. | 705/2 |
| 7,024,398 B2 | 4/2006 | Kilgard et al. | |
| 7,122,004 B1 | 10/2006 | Cassily | |
| 7,182,600 B2 | 2/2007 | Shaw et al. | |
| 7,184,701 B2 | 2/2007 | Heslip | |
| 7,199,298 B2 | 4/2007 | Funaki | |
| 7,220,907 B2 | 5/2007 | McIntosh | |
| 7,294,107 B2 | 11/2007 | Simon et al. | |
| 7,451,065 B2 * | 11/2008 | Pednault et al. | 703/2 |
| 8,083,523 B2 | 12/2011 | De Ley et al. | |
| 8,137,106 B2 | 3/2012 | De Ley et al. | |
| 2001/0018178 A1 * | 8/2001 | Siefert | 434/322 |
| 2001/0023059 A1 | 9/2001 | Toki | |
| 2001/0036620 A1 | 11/2001 | Peer et al. | |
| 2001/0041330 A1 * | 11/2001 | Brown et al. | 434/332 |
| 2001/0046659 A1 | 11/2001 | Oster | |
| 2001/0055749 A1 * | 12/2001 | Siefert | 434/322 |
| 2002/0002411 A1 | 1/2002 | Higurashi et al. | |
| 2002/0005109 A1 | 1/2002 | Miller | |
| 2002/0032733 A1 | 3/2002 | Howard | |
| 2002/0042790 A1 | 4/2002 | Nagahara | |
| 2002/0076684 A1 | 6/2002 | Blevins et al. | |
| 2002/0102522 A1 * | 8/2002 | Sugimoto | 434/322 |
| 2002/0142278 A1 * | 10/2002 | Whitehurst et al. | 434/350 |
| 2002/0150868 A1 | 10/2002 | Yui et al. | |
| 2002/0160347 A1 * | 10/2002 | Wallace et al. | 434/322 |
| 2002/0168100 A1 | 11/2002 | Woodall | |
| 2002/0169822 A1 | 11/2002 | Packard et al. | |
| 2002/0177113 A1 | 11/2002 | Sherlock | |
| 2002/0188583 A1 | 12/2002 | Rukavina et al. | |
| 2003/0009352 A1 | 1/2003 | Bolotinikov et al. | |
| 2003/0017442 A1 | 1/2003 | Tudor et al. | |
| 2003/0017443 A1 * | 1/2003 | Kilgore | 434/350 |
| 2003/0027122 A1 * | 2/2003 | Stansvik | 434/323 |
| 2003/0039948 A1 | 2/2003 | Donahue | |
| 2003/0059759 A1 * | 3/2003 | Calhoun et al. | 434/322 |
| 2003/0077559 A1 | 4/2003 | Braunberger et al. | |
| 2003/0113697 A1 * | 6/2003 | Plescia | 434/322 |
| 2003/0129574 A1 * | 7/2003 | Ferriol et al. | 434/362 |
| 2003/0129576 A1 | 7/2003 | Wood et al. | |
| 2003/0148253 A1 | 8/2003 | Sacco et al. | |
| 2003/0151628 A1 | 8/2003 | Salter | |
| 2003/0151629 A1 * | 8/2003 | Krebs et al. | 345/810 |
| 2003/0165800 A1 | 9/2003 | Shaw et al. | |
| 2003/0167902 A1 | 9/2003 | Hiner et al. | |
| 2003/0167903 A1 | 9/2003 | Funaki | |
| 2003/0176931 A1 * | 9/2003 | Pednault et al. | 700/31 |
| 2003/0232318 A1 | 12/2003 | Altenhofen et al. | 434/362 |
| 2004/0005536 A1 * | 1/2004 | Lai et al. | 434/322 |
| 2004/0014017 A1 * | 1/2004 | Lo | 434/322 |
| 2004/0014021 A1 * | 1/2004 | Suleiman | 434/354 |
| 2004/0033475 A1 * | 2/2004 | Mizuma et al. | 434/219 |
| 2004/0039603 A1 | 2/2004 | Hanrahan | |
| 2004/0111310 A1 | 6/2004 | Sziam et al. | |
| 2004/0137984 A1 | 7/2004 | Salter | |
| 2004/0166484 A1 | 8/2004 | Budke et al. | |
| 2004/0180317 A1 | 9/2004 | Bodner et al. | |
| 2004/0237756 A1 | 12/2004 | Forbes | |
| 2004/0244564 A1 | 12/2004 | McGregor | |
| 2004/0260584 A1 * | 12/2004 | Terasawa | 705/7 |
| 2005/0064375 A1 | 3/2005 | Blank | |
| 2007/0046678 A1 | 3/2007 | Peterson et al. | |
| 2007/0134630 A1 | 6/2007 | Shaw et al. | |
| 2009/0325137 A1 | 12/2009 | Peterson et al. | |

OTHER PUBLICATIONS

"The Stochastic Learning Curve: Optimal Production in the Presence of Learning-Curve Uncertainty", Joseph B. Mazzola and Kevin F. McCardle; Source: Operations Research, vol. 45, No. 3 (May-Jun. 1997), pp. 440-450.*

"Toward a Theory of Continuous Improvement and the Learning Curve", Willard I. Zangwill and Paul B. Kantor; Management Science, vol. 44, No. 7 (Jul. 1998), pp. 910-920.*

"Rigorous Learning Curve Bounds from Statistical Mechanics" by David Haussler, Michael Kearns, H. Sebastian Seung, Naftali Tishby, (1996), Machine Learning 25, 195-236.*

"The Learning Curve: Historical Review and Comprehensive Survey", Louis E. Yelle, University of Lowell, pp. 1-27.*

"Seer: Maximum Likelihood Regression for Learning-Speed Curves", Carl Myers Kadie, Graduate College of the University of Illinois at Urbana-Champaign, 1995, pp. 1-104.*

Bodner and Shaw, "Symmetry Math Video Game Used to Train Profound Spatial-Temporal Reasoning Abilities Equivalent to Dynamical Knot Theory" American Mathematical Society (2004); vol. 34; pp. 189-202.

Bodner and Shaw, "Symmetry Operations in the Brain: Music and Reasoning" (2001); pp. 1-30.

Bodner M, Shaw GL, "Music Math Connection" Journal of music and movement based learning. (2002) vol. 8, No. 3; pp. 9-16.

Bodner, Peterson, Rodgers, Shaw et al., "Spatial-Temporal (ST) Math Video Game Results Show Rapid Learning Curves Supportive of Innate ST Brain Function" Oct. 9, 2006; ScholarOne, Inc., 2000 (2001); 1 page.

Hu W, Bodner M, Jones EG, Peterson M, Shaw GL., "Dynamics of Innate Spatial-Temporal Learning Process: Data Driven Education Results Identify Universal Barriers to Learning" $6^{th}$ Annual International Conference on Complex Systems (2004); 8 pages.

Hu W, Bodner M, Jones EG, Peterson MR, Shaw GL, "Data Mining of Mathematical Reasoning Data Relevant to Large Innate Spatial-Temporal Reasoning Abilities in Children: Implications for Data Driven Education" Soc. Neurosci. Abst. $34^{th}$ annual meeting (2004); 1 page.

M.I.N.D.® Institute, Research Division, "Cramming v. Understanding", Position Paper #4, Feb. 2003, 1 page.

M.I.N.D.® Institute, Research Division, "Education = Music Math Causal Connection", Position Paper #1, Jul. 2002, 2 pages.

M.I.N.D.® Institute, Research Division, "The race to raise a brainer baby", Position Paper #2, Aug. 2002, 1 page.

M.I.N.D.® Institute, Research Division, "Trion Music Game: Breakthrough in the Landmark Math + Music Program", Position Paper #3, Jan. 2003, 1 page.

Peterson, Bodner, Rodgers, Shaw et al., Music—Math Program Based on Cortical Model Enhances $2^{nd}$ Graders Performance on Advanced Math Concepts and Stanford 9 Math; Oct. 9, 2006; ScholarOne, Inc. (2000); 1 page.

Peterson, Bodner, Shaw et al., "Innate Spatial-Temporal Reasoning and the Identification of Genius" Neurological Research, vol. 26, Jan. 2004; W.S. Maney & Son Ltd.; pp. 2-8.

Peterson, Shaw et al., "Enhanced Learning of Proportional Math Through Music Training and Spatial-Temporal Training" Neurological Research(1999) vol. 21; Forefront Publishing Group; pp. 139-152.

Shaw et al., "Music Training Causes Long-Term Enhancement of Preschool Children's Spatial-Temporal Reasoning" Neurological Research (1997); vol. 19, No. 1; pp. 1-8; Forefront Publishing Group, Wilton, CT, USA.

Shaw GL, Bodner M, Patera J "Innate Brain Language and Grammar: Implications for Human Language and Music" In Stochastic Point Processes (eds Srinivasan SK and Vihayakumar A). Narosa Publishing, New Dehli (2003); pp. 287-303.

Shaw, G.L., "Keeping Mozart in Mind," M.I.N.D. Institute/University of California, Academic Press, 2000, Cover Page, Table of Contents, Chapters 2, 12, 13, 14, 18, 19, 20, 23.

Special Report—Summary of the 2002 M.I.N.D.® Institute newsletter which details data from $2^{nd}$ graders in our Music Spatial-Temporal Math Program (2002) vol. 1, Issue 2; pp. 1-12.

Watson S. Wind M, Yee M, Bodner M, Shaw GL., "Effective Music Training for Children with Autism" Early Childhood Connections, (2003); vol. 9; pp. 27-32.

International Search Report, Application No. PCT/US06/34462, mailed Aug. 30, 2007, 2 pgs.

Kennedy, Brian, Tetris Plus—Jaleco. Review and description of Tetris Plus [online], [retrieved on May 29, 2013]. Retrieved from the Internet <URL:http//dextremes.com/sega/revs/tetrisplus.html>.

Thompson, Jon. Tetris Plus Review. [online], [retrieved on May 29, 2013]. Retrieved from the Internet <URL:http://www.allgame.com/game.php?id=1968&tab=review>.

* cited by examiner

STAR Proportions
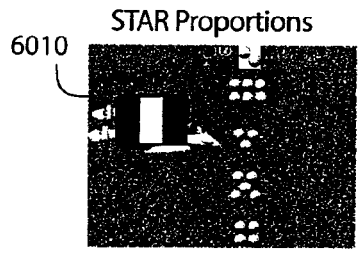
A. Spaceship must intercept the amount of round "fuel pods" to fill the green "fuel tank" based on the example at the top of the screen, with 2 fuel pods filling the same squre tank
AMC Proportions
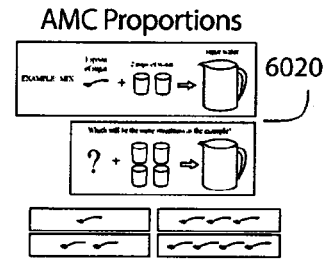
B. Students choose spoons of sugar in the correct proportion to make sugar water based on the example
Diagnostic Quiz
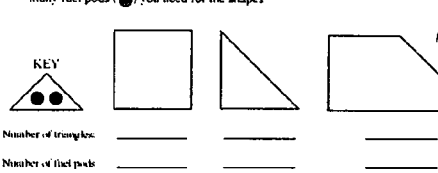
C
Math Integration
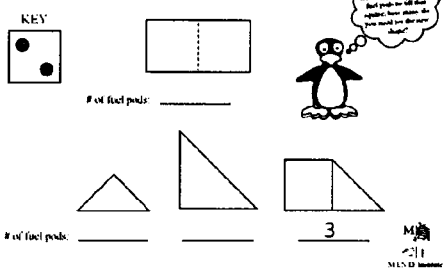
D
FIG. 6

School Name: 1410

School A

Close Data for Teacher E, Student B, playing Bricks — 1420

JJJ# 2;, 1/15 Oct 11 2001,1/20,1/5,1/30 Oct 11 2001/P,2/0 Oct 15 2001,1/30/P,1/25,1/20,2/0 Oct 18 2001, 1/25 Oct 18 2001,1/40/P,1/35 Oct 18 2001/P,1/40 Oct 18 2001/P,1/45 Oct 25 2001/P,1/45 Oct 25 2001/P,1/45 Oct 25 2001/P,1/45 Oct 25 2001/P,1/45 Oct 29 2001/P,1/40 Oct 29 2001/P,2/20,2/15 Oct 29 2001,2/20,2/40 Nov 1 2001/P,3/45/P,4/60/P,5/60/P,6/30 Nov 5 2001,6/15,6/20,6/15,6/35 Nov 8 2001,6/60 Nov 15 2001/P,7/65/P,8/55/P,9/35/P,10/35 Nov 19 2001/P;

JJJ#2;,1/0 Oct 18 2001 1/5 Oct 18 2001, 1/25 Oct 22 2001,1/35/P,2/10 Oct 22 2001,2/10 Oct 25 2001,2/20 Oct 29 2001,2/15 Oct 28 2001,2/15 Nov 1 2001,2/30/P,3/25 Nov5 2001,3/45/P,4/60/P,5/60 Nov 15 2001/P,6/60/P,7/70/P,8/65/P,9/28/P,10/33 Nov 19 2001/P;

JJJ#18;,1/0 Oct 15 2001,1/5,1/5,1/25 Oct 18,2001,1/40/P,2/30/P,3/30 Oct 22 2001/P,4/45/P,5/50/P,6/10,6/60 Oct 252001/P,7/55/P,8/70/P,9/32/P,10/28 Oct 29 2001/P;

JJJ#6;,1/25 Oct 11 2001,1/10 Oct 18 2001,1/35 Oct 18 2001/P,2/20 Oct 22 2001,2/40/P,3/35/P,4/60 Oct 25 2001/P,5/60P,6/60 Oct 29 2001/P,7/75/P,8/75/P,9/30/P,10/34/P,7/65 Nov 15 2001/P,10/30 Nov 19 2001/P,1/45 Feb 7 2002/P;

JJJ#2; ;

JJJ#2;,1/15 Oct 25 2001,1/45 Oct 29 2001/P,2/30/P,3/20,3/45/P,4/25,4/45/P,5/55 Nov 1 2001/P,6/60/P,7/70/P,8/65/P,9/33 Nov 8 2001/P,10/36/P;

JJJ#2;,1/0 Oct 11 2001,1/5 Oct 11 2001,1/5 Oct 15 2001,1/5,1/5,1/10,1/10 Oct 18 2001,1/10,1/20,1/30 Oct 22 2001/P,2/35 Oct 25 2001/P,3/35 Oct 29 2001/P,4/55/P,5/60/P,6/20,6/45 Oct 29 2001/P,7/70 Nov 1 2001/P,8/55 Nov 6 2001/P,9/33/P,10/26 Nov 6 2001/P;

JJJ#2;,1/10 Oct 11 2001,1/40 Oct 11 2001/P,2/40 Oct 15 2001/P,3/25 Oct15 2001,3/20,3/30/P,4/60 Oct 18 2001/P,5/60 Oct 18 2001/P,6/60 Oct 22 2001/P,7/70/P,8/75/P,9/29/P,10/16 Oct 25 2001,10/27/P,7/70 Oct 29 2001/P,6/60/P,7/70 Nov 5 2001/P,10/22,10/33/P;

JJJ#2;,1/0 Oct 22 2001,1/30 Oct 25 2001/P,2/35/P,3/40 Oct 29

Note: mdata cannot be edited from this screen

Scoring Parameters: 1430

400,10,95,puzzle
400,10,300,bricks
142,10,80,Icecaves
50,10,40,savefish
80,10,60,oxone
200,10,50,fishing
400,10,100,Jijisays
75,10,50,graphPlot
90,10,90,snail
120,10,120,spaceship
130,10,130,seed
235,10,235,helicopter
5,10,5,pingo
60,10,10,starfish
,,0,toys
22,5,22,boats
280,10,280,review
5,10,5,fracwall2
150,10,15,estimation
280,10,140,iceblocks
90,10,58,candystore
91,10,51,adventure
60,10,50,starwatching
75,10,50,probably
60,10,60,mathfactory
11,10,7,piemonster

School List: 1440

Schools ••••••••
School A
School B
School C
School D
School E
School F
School G
School H
School I
School J
School K
School L
School M
School N
School O
School P
School Q
School R
School S
School T
School U
School V
School W
School X
School Y
School Z
School AA
School AB

[back]

SYSTEM AND METHOD FOR ANALYSIS AND FEEDBACK OF STUDENT PERFORMANCE

RELATED APPLICATIONS

This application claims priority under 35 U.S.C. §119(e) to U.S. Provisional Application No. 60/414,981, filed Sep. 30, 2002 and titled "SYSTEM AND METHOD FOR ANALYSIS OF STUDENT PERFORMANCE," which is hereby incorporated by reference in its entirety.

This application is related to U.S. patent application Ser. No. 10/319,254, filed Dec. 12, 2002, and issued as U.S. Pat. No. 7,182,600 on Feb. 27, 2007, and titled "METHOD AND SYSTEM FOR TEACHING VOCABULARY," and U.S. Provisional Application No. 60/479,948, filed Jun. 19, 2003, and U.S. patent application Ser. No. 10/872,957, filed on Jun. 21, 2004, and titled "METHOD AND SYSTEM FOR TEACHING MUSIC," which are hereby incorporated by reference in their entireties.

BACKGROUND OF THE INVENTION

1. Field of the Invention

The present invention generally relates to computer systems. More particularly, the present invention relates to computerized systems and methods for analyzing student performance and providing feedback regarding the student performance, for example, to a school official, parent, or student.

2. Description of the Related Technology

An alternative approach to the traditional language-based education uses spatial temporal reasoning, which involves making a mental image and projecting it ahead in space and time by performing a temporal sequence of spatial operations on that image. Spatial temporal software can be used to help persons learn math, science or other educational concepts by using a spatial temporal approach. Spatial temporal software includes, but is not limited to, software games designed to train students to use spatial temporal abilities to conceptually learn and understand educational concepts, for example, math or science. "Keeping Mozart in Mind" by Gordon L. Shaw, Ph.D. (Academic Press 2000), which is hereby incorporated by reference in its entirety, provides some examples of spatial temporal software. Spatial temporal software includes a broader range of software than described in Gordon L. Shaw's book and in U.S. patent application Ser. No. 10/319,254 (see "Related Applications" above).

In some situations, spatial temporal software teaches math or science concepts to persons who failed to learn math concepts through the traditional language-based approach. However, the standardized test scores of those persons may fail to reflect their knowledge of those concepts. In addition, the spatial temporal software may fail to teach the desired concepts, for example, due to refinements needed to the software or because additional help of the instructor is needed by the student. Raw test scores are not very helpful in identifying or determining potential causes or solutions to learning deficiencies. Instead, detailed analysis of student performance and feedback in the form of recommendations is most helpful to enhancing the learning process.

Accordingly, methods and systems are needed to analyze student performance and provide feedback regarding the student performance, for example, to an instructor, other school official, parent or directly to the student. The methods and systems should communicate in real time with the educational program, for example, math or science games, quizzes or tests, to provide contemporaneous feedback to the instructor on student performance. In this way, any assistance or additional instruction can be provided to the student on the spot, or the student can be allowed to continue on to a next game or quiz if the current game or quiz has been mastered. In addition, the methods and systems should evaluate and provide feedback regarding effectiveness of the educational program itself, and track progress at a student, class, or school level over a multitude of different durations and time periods. Still further, the methods and systems should perform comprehensive data analysis and statistical computations. The various embodiments of the present invention described herein seek to satisfy these and other needs in the technology.

SUMMARY OF CERTAIN INVENTIVE ASPECTS

The systems and methods of the invention have a multitude of features, no single one of which is solely responsible for their desirable attributes. Without limiting the scope of the invention, as expressed by the claims that follow, the more prominent features will now be discussed briefly. After considering this discussion, and particularly after reading the section entitled "Detailed Description of Certain Embodiments," one of ordinary skill in the technology will understand how the features of the system and methods provide various advantages over traditional systems.

One aspect involves a computerized system for analyzing student performance data and providing feedback based on the student performance data, the system comprising a computer network interface module configured to receive student performance data and transmit recommendation data via a computer network, a data acquisition module configured to receive the student performance data from the computer network interface module and reformat the student performance data, a performance analysis module configured to receive the reformatted student performance data from the data acquisition module and generate analysis data by analyzing the reformatted student performance data, and a feedback generation module configured to receive the analysis data from the performance analysis module and generate the recommendation data based on the reformatted student performance data, wherein the computer network interface module receives the recommendation data from the feedback generation module and transmits the recommendation data onto the computer network.

Additionally included is the system wherein the student performance data indicates a source of the data. Additionally included is the system wherein the data source is a school, a teacher or a student. Additionally included is the system wherein the student performance data comprises indexing the data with codes that have been pre-assigned to the school, teacher or student. Additionally included is the system wherein the student performance data comprises a score achieved by the student on a performance evaluation, and wherein the performance evaluation is a game, a lesson, a quiz or a test. Additionally included is the system wherein the student performance data comprises encrypted information indicating a student, teacher, or school that is the source of the test data.

Additionally included is the system wherein the game comprises a spatial temporal math video game. Additionally included is the system wherein the student performance data comprises a sequence of consecutive scores achieved by the student on the math video game. Additionally included is the system wherein the analysis data comprises a learning curve. Additionally included is the system wherein the computer network is the Internet. Additionally included is the system wherein the analysis data is stored on a relational database, and wherein statistical and data mining analysis is performed on the analysis data to determine a specific learning problem of the student and to generate a remedial recommendation. Additionally included is the system wherein the analysis data is stored on a relational database, and wherein statistical and data mining analysis is performed on the analysis data to determine one or more universals of learning encoded in the analysis data.

Another aspect involves a computerized system for analyzing student performance data and providing feedback based on the student performance data, the system comprising a student computer system configured to administer a spatial temporal performance evaluation and record student response data, an education module configured to receive the student response data from the student system and generate student performance data indicative of the level of the student's mastery of the subject matter of the performance evaluation, an analysis and feedback module configured to receive the student performance data from the education module and generate analysis data by performing an analysis of the student performance data, and a school official computer system configured to receive the feedback data from the analysis and feedback module, wherein the feedback data comprises recommendations to a school official for enhancing student performance on subsequent performance evaluations.

Additionally included is the system wherein the performance evaluation is a game, a lesson, a quiz, or a test. Additionally included is the system wherein the game is a spatial temporal math video game. Additionally included is the system wherein the student performance data indicates a source of the data. Additionally included is the system wherein the student performance data comprises a score achieved by the student on a performance evaluation, and wherein the performance evaluation is a game, a lesson, a quiz or a test. Additionally included is the system wherein the student performance data comprises encrypted information indicating a student, teacher, or school that is the source of the test data.

Another aspect involves a method of analyzing successive performances by a student for a computerized quiz and providing feedback based on the performances, the method comprising determining whether a student has achieved a passing score on a quiz, comparing the passing score to at least one score obtained from at least one subsequent quiz, determining whether the student is authorized to progress to a next task of a curriculum or whether the student needs assistance from an instructor based on the comparison, analyzing the passing score and the at least one subsequent quiz score to generate a learning curve and determine whether a deviation in a learning rate exists, calculating a best fit curve to the learning curve, extrapolating the best fit curve to determine whether the passing score will be reached within a maximum allotted number of times of taking the quiz, and generating feedback data based on the determination of whether the passing score will be reached within the maximum allotted number of times of taking the quiz.

Additionally included is the system wherein the feedback data comprises recommending that the student continue taking the quiz, recommending that the instructor provide assistance to the student, or recommending that the student continue taking the quize with further observation and reevaluation by the instructor. Additionally included is the system wherein the determining whether a deviation in a learning rate exists comprises graphing the quiz scores against the number of times the quiz is taken for the most recent day. Additionally included is the system wherein the determining whether a deviation in a learning rate exists further comprises comparing the quiz scores against the number of times the quiz is taken for all days the quiz is taken.

Another aspect involves a method of developing a computerized game for teaching mathematical concepts to a student, the method comprising determining a mathematical concept to be taught to a student, formulating a basic spatial temporal test of the mathematical concept, administering the basic spatial temporal test to the student, testing an initially designed game of the mathematical concept to obtain a progress curve of game scores, analyzing the progress curve to determine whether it indicates successful learning and retention of the mathematical concept, comparing a score on the initially designed game with a score on the basic spatial temporal test to determine whether the game score is commensurate with the test score, administering a diagnostic quiz of the mathematical concept to the student, comparing the game score to a score on the diagnostic quiz to determine whether the game score is commensurate with the diagnostic quiz score, determining adjustments to the game or the diagnostic quiz based on the comparison of the game score to the diagnostic quiz score, redesigning the game based on the adjustments to the game or the diagnostic quiz, and integrating the redesigned game into an educational curriculum.

Another aspect involves a computer readable storage medium having stored thereon instructions that when executed by a computer processor perform a method of analyzing successive performances by a student for a computerized game and providing feedback based on the performances, the method comprising determining whether a student has achieved a passing score on a quiz, comparing the passing score to at least one score obtained from at least one subsequent quiz, determining whether the student is authorized to progress to a next task of a curriculum or whether the student needs assistance from an instructor based on the comparison, analyzing the passing score and the at least one subsequent quiz score to generate a learning curve and determine whether a deviation in a learning rate exists, calculating a best fit curve to the learning curve, extrapolating the best fit curve to determine whether the passing score will be reached within a maximum allotted number of times of taking the quiz, and generating feedback based on the determination of whether the passing score will be reached within the maximum allotted number of times of taking the quiz.

Additionally included is the system wherein the feedback data comprises recommending that the student continue taking the quiz, recommending that the instructor provide assistance to the student, or recommending that the student continue taking the quiz with further observation and reevaluation by the instructor. Additionally included is the system wherein the determining whether a deviation in a learning rate exists comprises graphing the quiz scores against the number of times the quiz is taken for the most recent day. Additionally included is the system wherein the determining whether a deviation in a learning rate exists further comprises graphing the quiz scores against the number of times the quiz is taken for all days the quiz is taken.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

FIG. 6 is an example of a math video game with a corresponding advanced math concept test, a corresponding diagnostic quiz, and a corresponding math integration lesson, any or all of which can provide performance scoring data to certain embodiments of the analysis and feedback system.

FIG. 14 is an example of a screen display 1400 that displays class performance data for a particular student playing a particular game, lesson, quiz or test.

FIG. 17 is an example of a screen display allows display of certain assessment data computed by the algorithms of the analysis and feedback processing system.

DETAILED DESCRIPTION OF CERTAIN EMBODIMENTS

Figure 1:
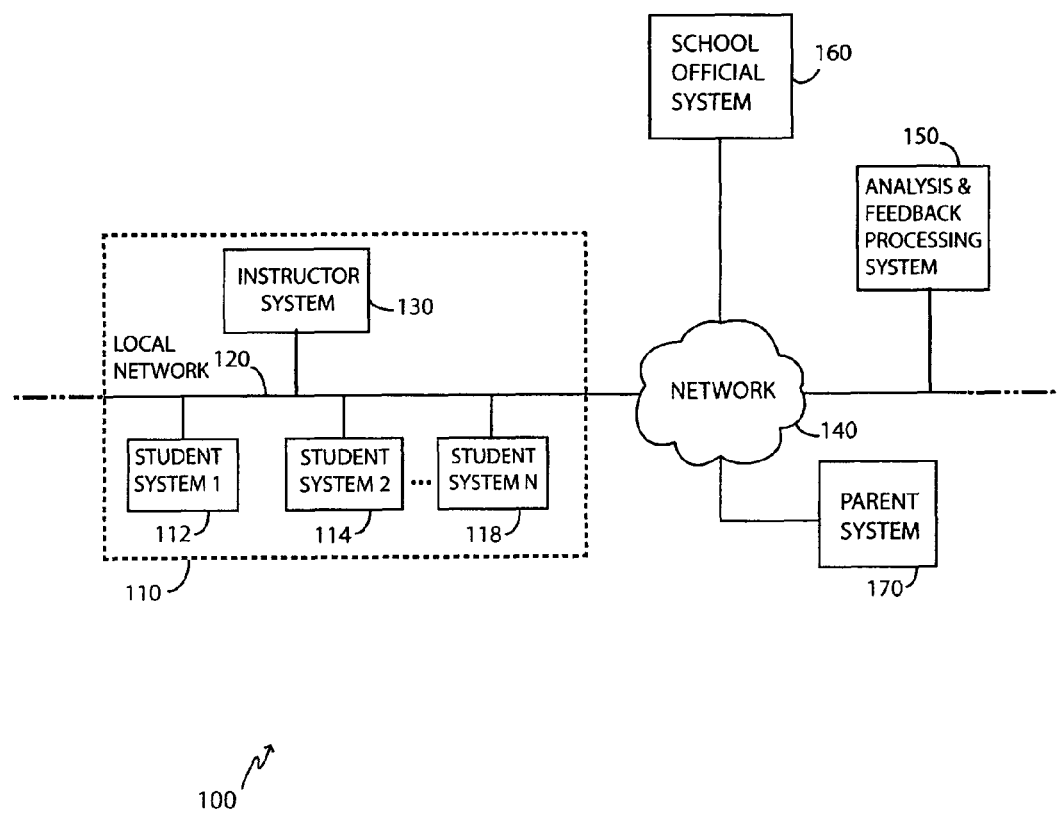
FIG. 1 is a system block diagram illustrating one example of a system architecture in which the analysis and feedback system can execute.

The following detailed description is directed to certain specific embodiments of the invention. However, the invention can be embodied in a multitude of different ways as defined and covered by the claims. The scope of the invention is to be determined with reference to the appended claims. In this description, reference is made to the drawings wherein like parts are designated with like numerals throughout.

Clarifications of Certain Terms

Computers or Computer Systems:

The computers or computer systems, as used herein, may be one or more of a number of microprocessor or processor controlled devices, for example, personal computers, workstations, servers, clients, mini computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or any combination thereof. The computers may further possess one or more input devices as described below. The computers may also possess an output device, such as a screen or other visual conveyance means and a speaker or other type of audio conveyance means.

Input Devices:

In typical computer systems, an input device can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch-screen.

Instructions:

Instructions refer to computer-implemented steps for processing information in the systems and methods described herein. Instructions can be implemented in software, firmware or hardware, and can include any type of programmed step undertaken by components of the systems and methods.

Networks:

The systems and methods described herein may include any type of electronically connected group of computers including, for example, one or more of the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Further, the computer may be configured to support a variety of network protocols such as, for example, NFS v2/v3 over UDP/TCP, Microsoft® CIFS, HTTP 1.0, HTTP 1.1, DAFS, FTP, Real-Time Streaming Protocol (RTSP), and so forth. Note that computing devices may be desktop, server, portable, hand-held, set-top, or any other desired type of configuration. As used herein, the term Internet includes network variations such as public internet, a private internet, a secure internet, a private network, a virtual private network (VPN), a public network, a value-added network, an intranet, and the like.

LAN:

One example of the Local Area Network (LAN) may be a corporate computing network, including access to the Internet, to which computers and computing devices comprising the systems and methods described herein are connected. In one embodiment, the LAN conforms to the Transmission Control Protocol/Internet Protocol (TCP/IP) industry standard. In alternative embodiments, the LAN may conform to other network standards, including, but not limited to, the International Standards Organization's Open Systems Interconnection, IBM's SNA, and Novell's Netware. In still other embodiments, the LAN may implement a proprietary network protocol.

Microprocessor:

A microprocessor may be any conventional general purpose single- or multi-chip microprocessor such as a Pentium® processor, a Pentium® II processor, a Pentium® Pro processor, a Pentium® IV processor, an x86 processor, a 8051 processor, a MIPS® processor, a Power PC® processor, a SPARC processor, an ALPHA® processor, or the like. In addition, the microprocessor may be any conventional special purpose microprocessor such as a digital signal processor or a graphics processor. The microprocessor typically has conventional address lines, conventional data lines, and one or more conventional control lines.

Modules:

The computerized systems are typically comprised of various modules as discussed in detail below. The components or modules include, but are not limited to, software, hardware or firmware components that perform certain tasks. Thus, a component or module may include, by way of example, software components, object-oriented software components, class components and task components, processes, functions, attributes, procedures, subroutines, macros, segments of program code, drivers, firmware, microcode, circuitry, data, databases, data structures, tables, arrays, and variables. Each of the modules are typically separately compiled and linked into a single executable program, or may be run in an interpretive manner, such as a macro. The processes that are undergone by each of the modules may be arbitrarily redistributed to one of the other modules, combined together in a single module, or made available in, for example, a shareable dynamic link library. Furthermore, the functionality provided for in the components or modules may be combined into fewer components, modules, or databases or further separated into additional components, modules, or databases. Additionally, the components or modules may be implemented to execute on one or more computers.

Operating Systems:

The operating system refers to the software that controls the allocation and usage of hardware resources, for example, memory, central processing unit (CPU), disk space or peripheral devices. The systems and methods described herein may be used in connection with computer systems executing various operating systems such as the following: Microsoft® Windows® 3.X, Microsoft® Windows 98, Microsoft® Windows® 2000, Microsoft® Windows® 95, Microsoft® Windows® CE, Microsoft® Windows® NT, Microsoft® Windows® ME, Palm Pilot OS, Apple® MacOS®, Disk Operating System (DOS), UNIX, IRIX, Solaris, SunOS, FreeBSD, Linux®, and IBM® OS/2® operating systems, for example. However, any computer operating system performing standard or custom operating system functions may likewise be utilized.

Programming Languages:

The systems and methods may be implemented in any programming language such as C, C++, BASIC, Pascal, Ada, Java, HTML, XML, FORTRAN, or Visual BASIC, and executed under any well-known operating system. C, C++, BASIC, Pascal, Ada, Java, HTML, XML, FORTRAN, and Visual BASIC are industry standard programming languages for which many commercial compilers are available that can be used to create executable code.

Transmission Control Protocol:

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions and multiplexing multiple connections through a single network connection. Finally, TCP is responsible for encapsulating information into a datagram structure.

Overview

Generally speaking, the systems and methods described herein provide a performance assessment, analysis and feedback system for interfacing in real time with computer-based math and science education programs. The analysis and feedback system receives and analyzes student performance data and parameters on video games, lessons, quizzes and tests. The real-time assessment and feedback of student performance enables contemporaneous identification by the instructor or other educational official of the degree of mastery of the students' learning concepts throughout the learning process. Feedback can be provided to teachers, other school officials both at the school site or at another site, parents or directly to students. Analysis and feedback of the educational program itself is also possible, which additionally enables evaluation of the effectiveness and optimization of the educational program. The analysis and feedback can also be performed and tracked for students, classes, schools, school districts, or entire geographical areas, and can cover any duration or specific period of time.

The systems and methods provide contemporaneous feedback that enables a teacher or other school official to determine the degree to which each student has mastered the math concepts taught by each spatial temporal animation reasoning (STAR) video game, lesson, quiz or test. The feedback includes whether a student is in the process of acquiring mastery of the learning concept and is not currently in need of assistance or further instruction from the teacher, whether a student is not mastering the concept and need assistance, or whether a student has acquired and mastered the concept and should be moved on to the next game, lesson, quiz or test in the sequence.

The feedback information enables teachers to optimize classroom and instructional time. Students requiring assistance are quickly identified so that teachers may allocate the necessary time and resources to those students, keeping them from falling behind. In addition, students that are mastering the concepts are quickly identified, so that their learning rate is not unnecessarily impeded. Teachers are therefore able to optimize the learning process for each student.

In certain embodiments, the analysis and feedback systems and methods acquire game, lesson, quiz or test scores and student performance data over a network such as the Internet. The system sorts the data by student, class, school or district by utilizing a dynamically generated lookup table. The system analyzes the learning curves for each student as they are received at an analysis and feedback computer. The system further analyzes the parameters of the curves and generates recommendations based on the analysis as to which of the following categories the student falls into: (1) not learning the concepts and needs assistance; (2) learning the concepts and should continue at the current pace; or (3) mastered the concepts and should advance to new material. The recommendations can be sent contemporaneously to the teacher via the network, enabling intervention and assistance quickly during the learning process.

DESCRIPTIONS OF FIGURES

FIG. 1 is a system block diagram illustrating one example of a system architecture of a spatial temporal animation reasoning (STAR) math analysis and feedback system 100. As illustrated in FIG. 1, the STAR analysis and feedback system 100 includes one or more on-site systems 110. In the private or public school embodiments, the on-site system 110 refers to those computer systems that are located at the school facility, for example, an elementary school. The on-site school systems 110 are typically connected to one another, and to other on-site computer systems, via a computer network 120, for example, a Local Area Network (LAN).

The on-site school system 110 includes one or more student systems 112, 114, 118 and one or more instructor systems 130, connected to one another via the local network 120. The system 100 shown in FIG. 1 additionally includes one or more school official systems 160, analysis and feedback processing systems 150, and patent systems 170, that communicate via a communications medium 140, such as a computer network.

As would be understood by one of skill in the technology, different embodiments may employ many different system configurations than that shown in FIG. 1, including different numbers and types of computer systems, and different types and configurations of computer networks. For example, the computer systems 112, 114, 118, 130, 150, 160, 170 shown in FIG. 1 may be general-purpose computers using one or more microprocessors executing a computer operating system communicating via a standard network protocol. Other embodiments can utilize custom computers executing proprietary operating systems and communicating via custom networks. The operation and data flow of the various components illustrated in FIG. 1 are described in greater detail below.

Figure 2:
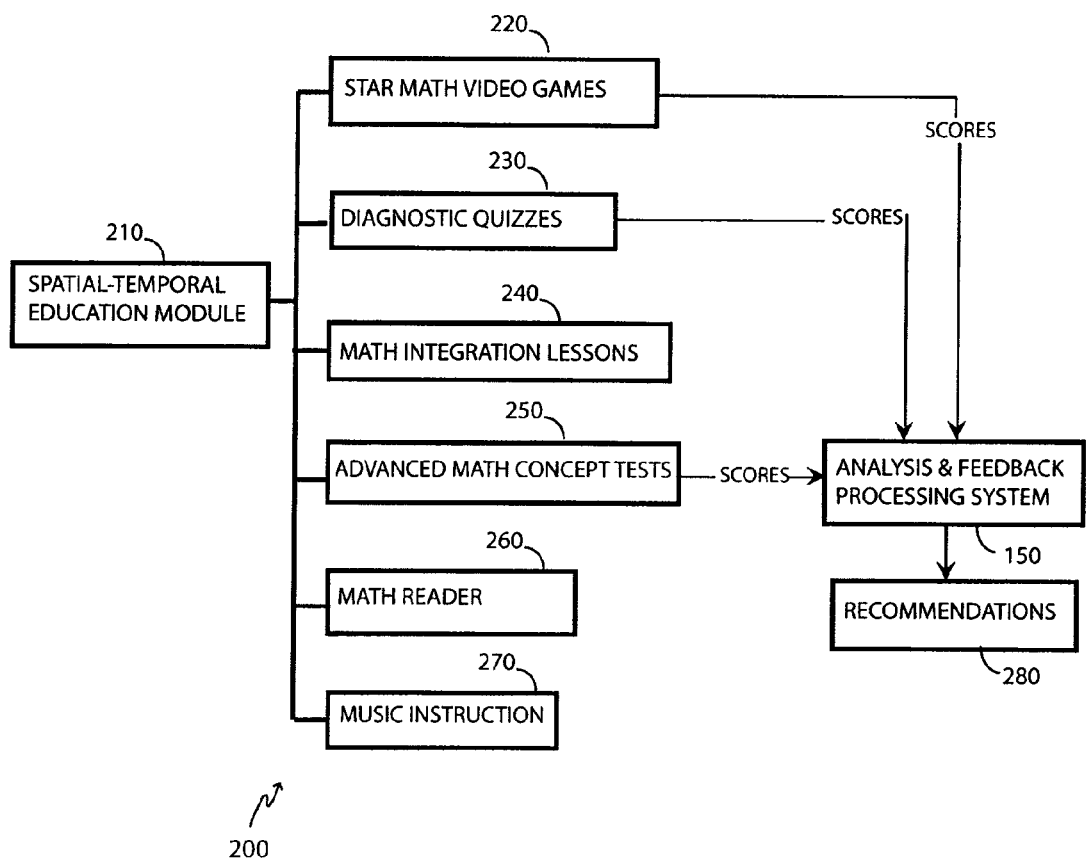
FIG. 2 is a block diagram illustrating various games, quizzes and tests to evaluate student performance from which scores can be input to the analysis and feedback system.

FIG. 2 is a block diagram illustrating various games, quizzes, tests and lessons that can be utilized to evaluate student performance from which scores can be input to the STAR analysis and feedback system 100. FIG. 2 outlines the components of a spatial temporal education module 210. By using the spatial temporal education module 210, the system 100 can illustrate mathematical concepts and allow students to solve problems through manipulations of objects in 2 or 3-dimensional space and/or time. This taps into the brain's innate spatial temporal reasoning abilities, and is applicable to a broad range of mathematical concepts. One example illustrates the simple mathematical concept of fractions by dividing a pizza into slices and distributing some of these slices. Another illustrates the relatively more difficult concept of derivatives through the relation between distance, speed and acceleration of an object. For background information on spatial temporal reasoning, refer to the book titled "Keeping Mozart in Mind" by Gordon L. Shaw, Ph.D. (Academic Press 2000).

In the embodiment shown in FIG. 2, there are six basic components of the spatial temporal education module 210. The first component involves STAR math video games 220. In the STAR math video games 220, mathematical problems are presented as goals to be accomplished via the manipulation of one or more objects in 2 or 3-dimensional space and/or time. The STAR math video games 220 typically begin with an animated sequence that illustrates its game play and its goal being at least partially accomplished to convey to the student the goal of the game. This is analogous to learning to play the PAC-MAN video game by observing the animated sequence displayed before the quarter is inserted.

The second component involves diagnostic quizzes 230. The diagnostic quizzes 230 present mathematical problems in the traditional formats of mathematical equations and word problems. Thus, solving these problems involves math and language-analytical skills. These quizzes 230 may draw from standardized tests, such as the Stanford 9 test, to ensure that performance on these quizzes 230 are commensurate with performance on standardized tests at the same grade level.

The third component of the spatial temporal education module 210 involves math integration lessons 240. The math integration lessons 240 integrate the two components described above, namely, the STAR math video games 220 and the diagnostic quizzes 230, in a series of lessons that teach the math and language analytical skills required to understand mathematical problems. These can be presented in the traditional formats of mathematical equations and word problems, as well as visualizing and solving these problems with a spatial temporal approach or framework.

The fourth component involves advanced math concept tests 250. In the advanced math concept tests 250, each mathematical problem is presented using simple and minimal language, and a spatial temporal approach or framework is outlined for the student to solve the problem. This minimizes the effect of language ability on the solution of the mathematical problem.

The fifth component involves a math reader 260. The math reader 260 serves as a glossary of sorts that teaches the math and language-analytical skills required to understand mathematical problems presented in the traditional formats of mathematical equations and word problems. In other words, it summarizes the material in the math integration lessons 240.

The sixth component involves musical instruction 270. The musical instruction 270 teaches basic music concepts and skills helpful for playing the piano. It is designed to enhance the brain's spatial temporal reasoning ability in preparation for the student's learning through STAR math games 220 and math integration lessons 240, and to complement the standard math curriculum. It introduces the concept of smaller note values at an early stage and fosters an understanding of their proportional relationships within the mathematical architecture of the music. A typical 45-minute piano lesson can include three components: rug time, the listening component, and the keyboard instruction. During rug time, children participate in activities designed to teach basic music theory. These activities include clapping note values, reading musical notation and learning about composers. During the listening component the children listen to about five minutes of a spatial temporal reasoning enhancing piece of music such as the Mozart Sonata K.448, as disclosed in "Keeping Mozart in Mind" by Gordon L. Shaw, Ph.D., © 2000 Academic Press.

During keyboard instruction, children can work both independently and in groups on headsets, performing a repertoire of progressively more difficult songs. At the end of the curriculum, children are able to function independently in a variety of musical environments, including rhythmic recognition and manipulation of note values as small as sixteenths, aural recognition of major and minor tonalities, knowledge of basic musical symbols, recognition of linear musical patterns, and recognition of basic sonata form in listening pieces. In addition, students typically master approximately 15 teaching pieces which make use of parallel and contrary motion between the hands, as well as textures involving right hand melody with left hand accompaniment. This reinforces the students' ability to identify symmetry. In addition, some of the STAR math video games 220 also incorporate knowledge learned during the musical instruction 270, thus correlating music to a spatial temporal framework.

The musical instruction 270 module can additionally include a music game that utilized the spatial temporal approach for teaching music to student. In this approach, the system 150 records the keystrokes that are entered by each student, and performs a quantitative analysis of the subjects or lessons that the student has mastered. In addition, the system 150 correlates the student's mastery of subjects or lessons to math performance. This spatial temporal approach to teaching music is described in detail in U.S. Provisional Application No. 60/479,948 titled "METHOD AND SYSTEM FOR TEACHING MUSIC."

In certain embodiments, the analysis and feedback processing system 150 receives and stores scores from the math video games 220, diagnostic quizzes 230, and advanced math concept tests 250, categorized by the student, class or instructor, grade level, school, school district, or other criteria. It also performs analysis on these scores and provides recommendations 280 formed from the analysis data produced by the analysis and feedback processing system 150. The analysis and feedback algorithms are described in greater detail below.

In additional embodiments of the diagram of FIG. 2, rather than the modules 220, 230, 240, 250, 260, 270 representing all STAR games, quizzes, lesson, test, math reader skills and music instruction skills, respectively, the modules 220, 230, 240, 250, 260, 270 represent a subset of the total set of components. For example, the modules 220, 230, 240, 250, 260, 270 can represent all the components of a given learning area that the student can work through. In this way, the student can acquire a level of mastery of certain learning areas, for example, fractions, proportions, and the like, and at certain levels, for example, second grade, third grade, etc. Thus, in these embodiments, the modules 220, 230, 240, 250, 260, 270 can be selected according to levels of learning mastery such as fractions or proportions.

Figure 3:
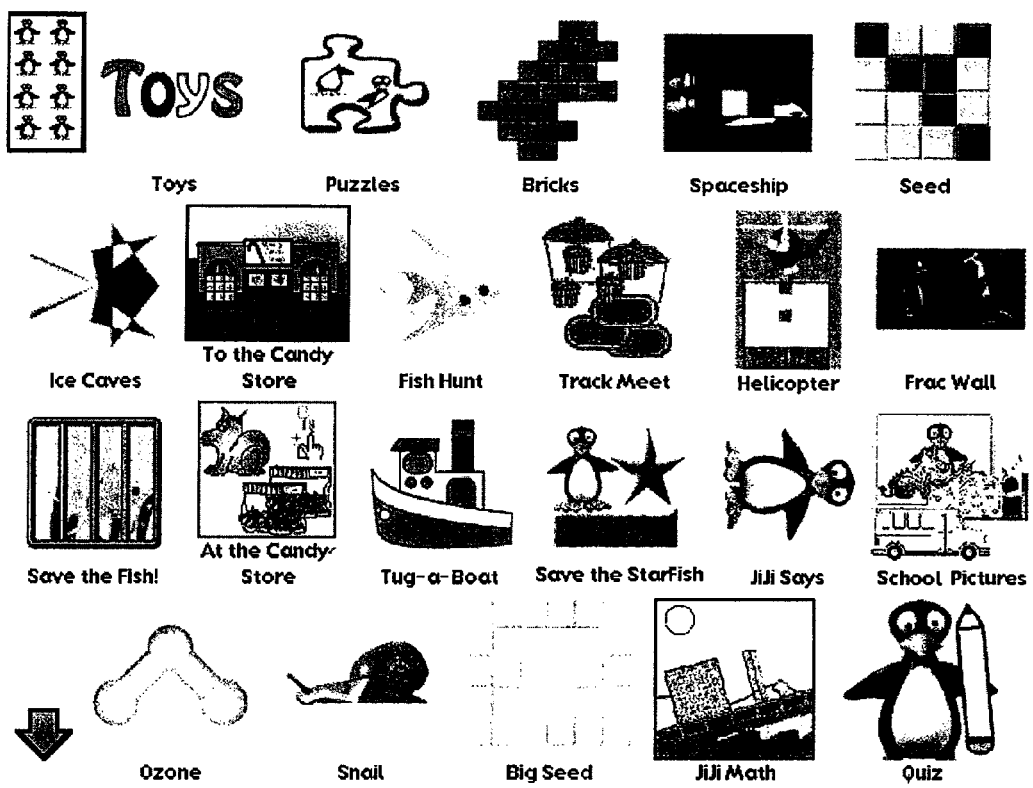
FIG. 3 is a diagram illustrating examples of educational games for second grade students that may be included to provide performance scoring data in certain embodiments of the analysis and feedback system.

FIG. 3 is a diagram illustrating examples of educational games for second grade students that may be included to provide performance scoring data in certain embodiments of the analysis and feedback system 100. The STAR games teach math through the spatial temporal approach. STAR teaches material required at grade level as well as math concepts as advanced as two grade levels higher, for example, second graders learn third and fourth grade material. The embodiment in FIG. 3 shows the game panel that appears on the computer screen of each student listing the complete set of games for second grade. Selecting the icon by clicking the mouse when the mouse pointer is over an icon starts that particular game.

Each STAR module is a collection of video games that are stimulating and fun for children. STAR for second grade includes the games for second graders to participate in the math spatial temporal learning program. In the embodiment in FIG. 3, the games include Toys, Puzzles, Bricks, Spaceship, Seed, Ice Caves, To the Candy Store, Fish Hunt, Track Meet, Helicopter, Frac Wall, Save the Fish, At the Candy Store, Tug-a-Boat, Save the Starfish, JiJi Says, School Pictures, Ozone, Snail, Big Seed, JiJi Math, or Quiz. In other embodiments, more or fewer games are available for students to choose from, and different games are available and can be selected than those shown in FIG. 3.

Figure 4:
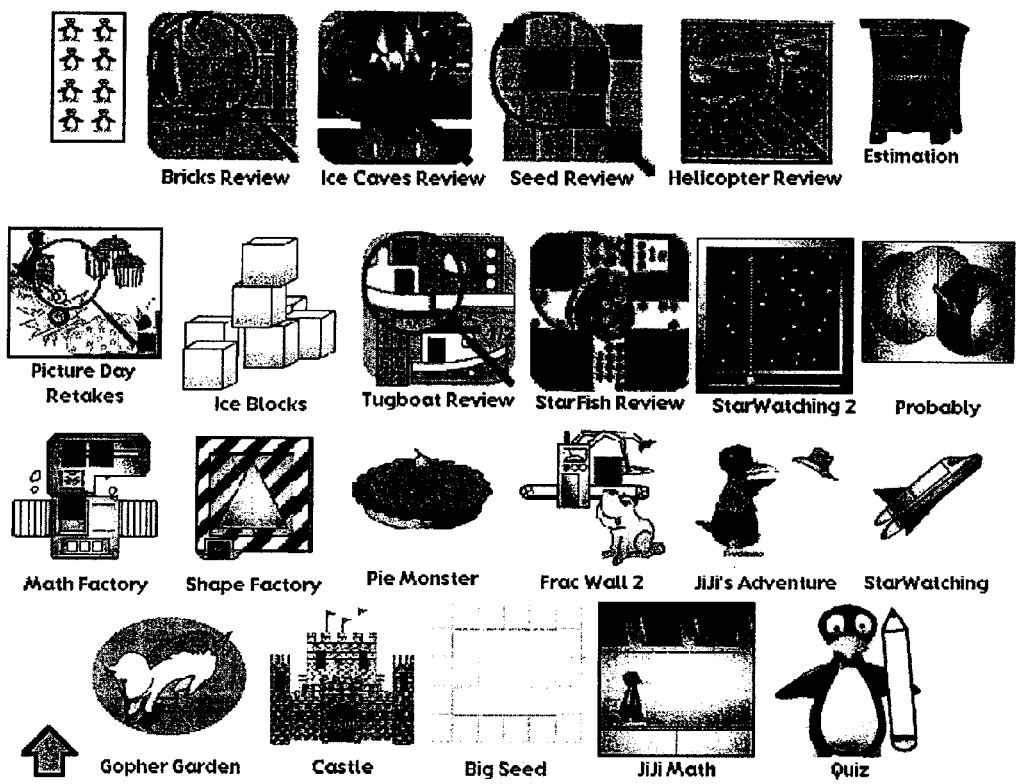
FIG. 4 is a diagram illustrating examples of educational games for third grade students that may be included to provide performance scoring data to certain embodiments of the analysis and feedback system.

FIG. 4 is a diagram illustrating examples of educational games for third grade students that may be included to provide performance scoring data to certain embodiments of the analysis and feedback system. The STAR games for third grade students include the games for second grade students, as well as games for third grade students. JiJi, a cartoon penguin that serves as the main character of certain embodiments of the games, is present in each game to provide consistency and interest for the students. The students are able to guide the character JiJi through each of the games. In the embodiment in FIG. 4, the games include Bricks Review, Ice Caves Review, Seed Review, Helicopter Review, Estimation, Picture Day Retakes, Ice Blocks, Tugboat Review, Starfish Review, StarWatching 2, Probably . . . , Math Factory, Shape Factory, Pie Monster, FracWall 2, JiJi's Adventure, StarWatching, Gopher Garden, Castle, Big Seed, JiJi Math, or Quiz. In other embodiments, more or fewer games are available for students to choose from, and different games are available and can be selected than those shown in FIG. 4.

The games focus on building the student's spatial temporal learning abilities and general math concepts. The math concepts include fractions, proportions, probability, symmetry, equations, graphing and estimation. As in the video games with which children are already familiar, passing a level and achieving a high score are indications of success in the games shown in FIG. 4. In each game, students can track their progress by looking at a graph of their scores for each attempt. The system 100 is configured to automatically track the scores and common mistakes student typically make, and to compile the performance data so the analysis and feedback processing system 150 can analyze the data and provide feedback to various individuals, for example, teachers.

Figure 5:
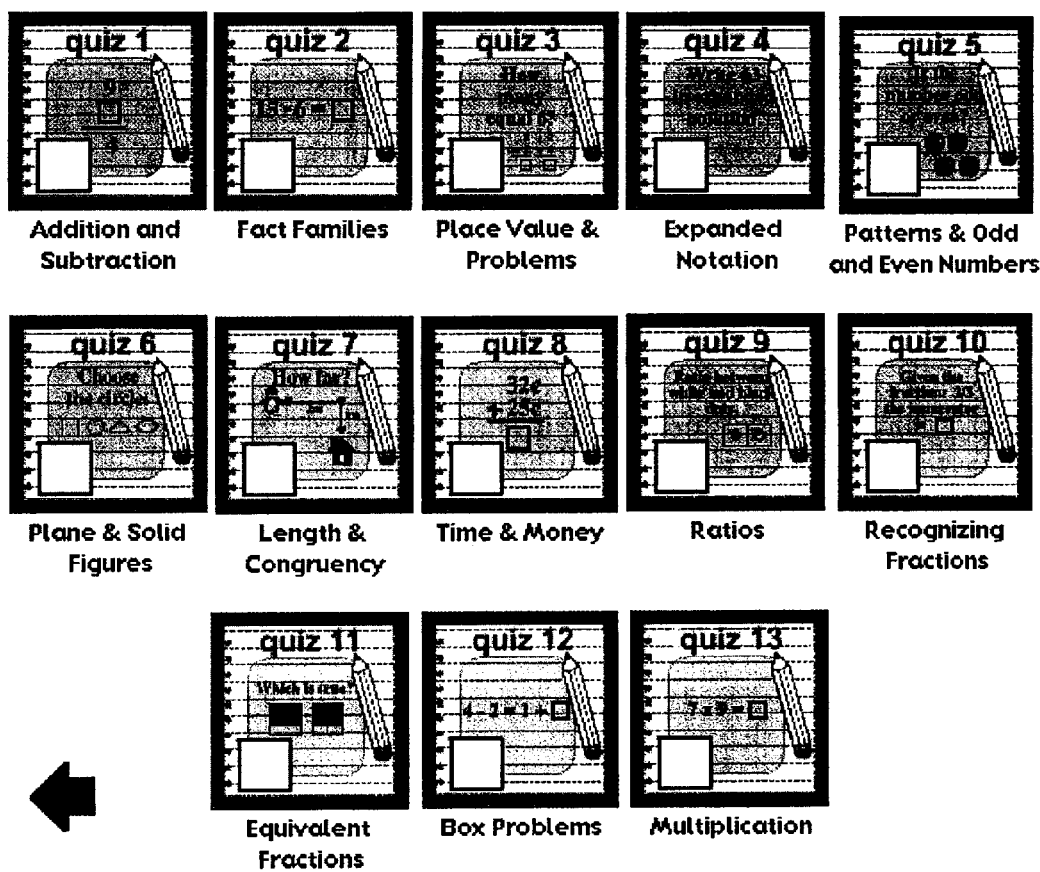
FIG. 5 is a diagram illustrating examples of diagnostic quizzes and math concepts covered by each quiz.

FIG. 5 is a diagram illustrating examples of diagnostic quizzes and math concepts covered by each quiz. The diagnostic quizzes test that students have successfully transferred understanding of math concepts from the spatial temporal approach taught in STAR to the standard language analytic format helpful in taking standardized math tests such as the Stanford 9. Quiz questions are of the same form as standardized tests and cover the same material as covered in those tests. FIG. 5 shows the one example of a set of second grade diagnostic quizzes and the corresponding math concepts covered in each quiz. Quizzes are typically timed, such that at the end of the allotted time the quiz stops and further time for finishing the quiz is not allowed.

In the embodiment in FIG. 5, the quizzes include Addition & Subtraction, Fact Families, Place Value & Problems, Expanded Notation, Patterns & Odd and Even Numbers, Plane & Solid Figures, Length & Congruency, Time & Money, Ratios, Recognizing Fractions, Equivalent Fractions, Box Problems, or Multiplication. In other embodiments, more or fewer quizzes are available for students to choose from, and different quizzes are available and can be selected than those shown in FIG. 5.

FIG. 6 is an example of a math video game 6010 with a corresponding advanced math concept test 6020, a corresponding diagnostic quiz 6030, and a corresponding math integration lesson 6040, any or all of which can provide performance scoring data to certain embodiments of the analysis and feedback system 100. These four examples of a math game, lesson, quiz and test are directed to improving a student's understanding of proportions.

Figure 7:
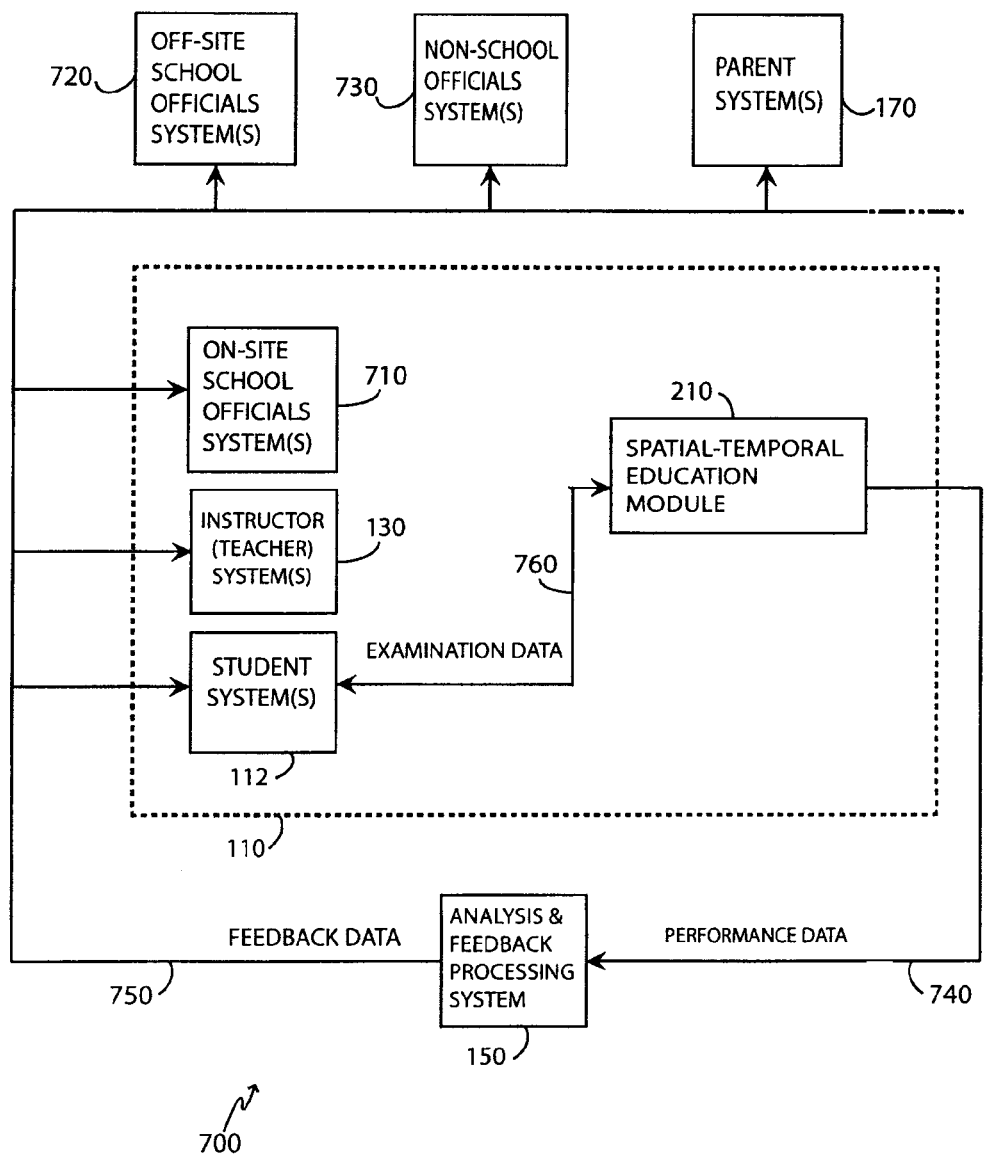
FIG. 7 is a block diagram illustrating a teaching-analysis-feedback data flow in an embodiment of the analysis and feedback system.

FIG. 7 is a block diagram illustrating a teaching-analysis-feedback data flow 700 in an embodiment of the analysis and feedback system 100. In contrast to FIG. 1, which illustrates physical network connections between various systems, FIG. 7 illustrates the flow of data between various systems or modules of the analysis and feedback system 100. Accordingly, certain modules and systems shown in FIG. 7 may be combined onto a single computer system, and similarly the functionality of a particular module or system in FIG. 7 may be split across multiple computer systems.

In the private or public school embodiments, the teaching-analysis-feedback data flow 700 includes the on-site system 110, the analysis and feedback processing system 150, and one more off-site systems, for example, one or more off-site school officials systems 720, one or more non-school official systems 730, or one or more parent systems 170. The on-site system 110 includes one or more on-site school officials system 710, one or more of the instructor (e.g., teacher) systems 130, or one or more of the student systems 112. The on-site system 110 additionally includes the spatial temporal education module 210.

On the student computers 112, the students play computer games, take quizzes or tests such as math quizzes or tests, or take lessons such as music lessons. In certain embodiments, the education module 210 executes on the student computer 112. Learning or examination data 760 and certain raw data, for example, data regarding keyboard keys pressed or computer mouse activity, is transmitted from the student computer 112 to the analysis and feedback processing system 150 as performance data 740. In other embodiments, the education module 210 executes on a different computer than the student computer 112 that is in data communication with the student computer 112. Raw data regarding keyboard keys pressed or computer mouse activity is transmitted from the student computer 112 to the education module 210. From this raw data, the education module 210 generates the performance data 740 that is transmitted to the analysis and feedback processing system 150.

The learning or examination data 760 is generated by students playing games or taking lessons, quizzes or tests on the student computer 112. The games, lessons, quizzes or tests can include 1) performance scores on spatial temporal math video games, 2) scores on quizzes that test the mastery of math concepts and the successful integration of that knowledge into a standard language analytic form (e.g., diagnostic quizzes), or 3) performance scores on a language reduced, spatial temporal exam covering the math concepts taught in the math video games. In certain embodiments, the performance data 740 is transmitted in encrypted form via the Internet to the computer system 150 on which the analysis and feedback processing system executes. The performance data 740 can also be transmitted via a Virtual Private Network (VPN), transmitted in unencrypted form, or transmitted via other types of networks.

The performance data 740 is received by the analysis and feedback processing system 150, where the data 740 is analyzed, for example, automatically or manually, using analysis algorithms. The analysis algorithms, which are described in greater detail below, for example, with regard to FIGS. 25 and 27-29, determine for each student from which data is received whether 1) mastery of the math or other learning concept has already been obtained, 2) mastery of the math or other learning concept is being obtained, or 3) mastery is not being obtained. Comparisons between components of the analysis and feedback processing system 150 enable specific tailored recommendations on courses of action at the level of each student, class, or school to optimize learning or correct deficiencies when present.

The analysis and feedback processing module 150 generates feedback data 750, which are transmitted to various computer systems as shown in the example of FIG. 7, that include tailored recommendations for the student, class, or school. In this embodiment, the feedback data 750 is transmitted to an on-site school officials system 710, the teacher system 130, or directly to the student system 112 at the on-site school systems 110 from which the corresponding examination data 760 was obtained.

The on-site school officials include principals and teachers. The feedback data 750 enables the teacher to determine in a short amount of time which of the three categories outlined above (mastery either already obtained, being obtained, or not being obtained) that each student in the teacher's class falls into, and the appropriate course of action for optimization or correction. Thus, the teacher can intervene, for example, by giving verbal instructions to the student, or by electronically controlling the game, lesson, quiz or test that the student is taking. For example, the teacher can enter a command or selection at the teacher computer 130 that allows a particular student to advance to the next game or next level of the current game.

Still further, the principal can utilize the on-site school officials system 710 to access the feedback data 130 to identify and evaluate teacher effectiveness, and to identify classes that are may be having difficulties and are likely to perform poorly on standardized tests (e.g., the Stanford 9 test). In this way, the teachers can be informed of their teaching effectiveness, which may in turn be used, for example, for decisions regarding promotions, salary increases, hiring, or termination.

In addition, the feedback data 750 can be transmitted to one or more off-site systems that are not located at the school itself and are not connected to the local network of the school. Examples of such off-site systems that can receive feedback data include an off-site school official system 720 such as a school administrators or superintendents, a non-school official system 730 such as a third party entity that monitors or collects data regarding student progress, or the parent system 170 whereby parents of the students are contemporaneously informed of their child's progress in school. The off-site school officials system 720, for example, utilized by the school district personnel, allows receipt and analysis of the feedback data 750, which enables the evaluation of progress at the school level, and facilitates decisions such as budget allocations to various schools within the school district.

Figure 8:
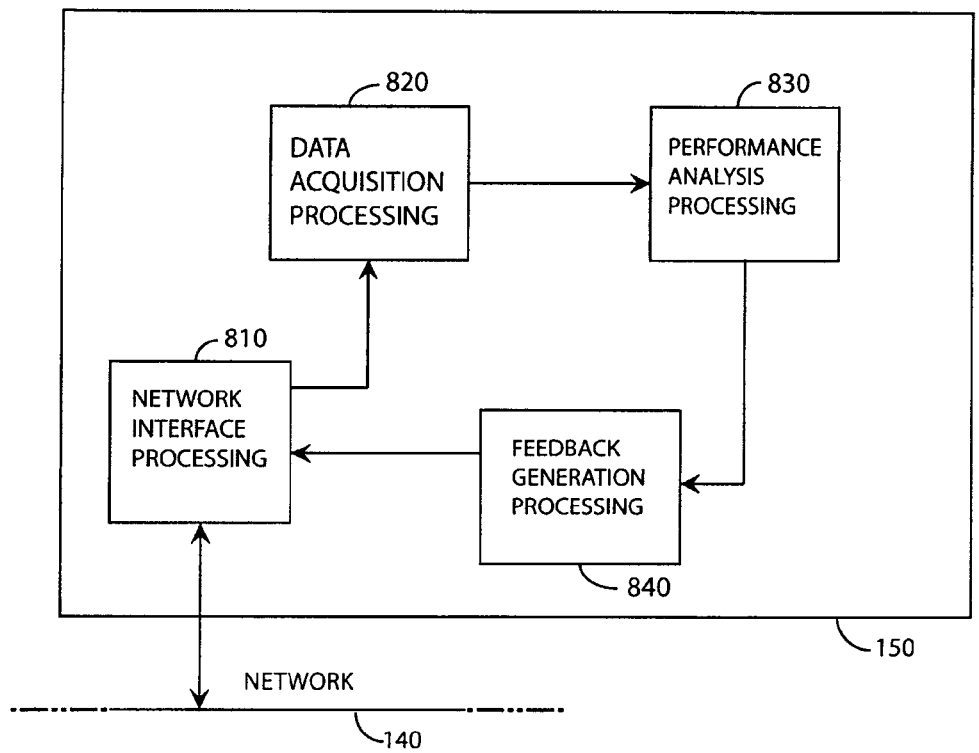
FIG. 8 is high-level functional block diagram of certain embodiments of the analysis and feedback system.

FIG. 8 is high-level functional block diagram of certain embodiments of the analysis and feedback processing system 150. The analysis and feedback processing system 150 includes a network interface processing module 810, a data acquisition processing module 820, a performance analysis processing module 830, and a feedback generation processing module 840. Of course, other embodiments of the analysis and feedback processing system 150 could be configured to have more or fewer modules, as the functionality of one or more of the modules shown in FIG. 8 could be divided into additional modules or combined into a smaller number of modules.

The network interface processing module 810 can be implemented entirely in hardware, entirely in software, or some combination of hardware and software. The network interface processing module 810 receives data from the network that is addressed to the analysis and feedback processing system 150, and transmits data on the network sent by the analysis and feedback processing system 150 to one or more systems that are connected to the network. The network interface processing module 810 sends incoming network data to the data acquisition processing module 820, and receives outgoing network data from the feedback generation processing module 840. The network interface processing module 810 performs the network protocol processing and for incoming network data strips off network related data, for example, network addresses, message word counts, and the like, leaving the application specific data. For outgoing network data, the network interface processing module 810 receives the application specific data and adds the network related data.

The data acquisition processing module 820 receives and processes the performance data 740 from the on-site school system 110. In certain embodiments, the performance data 740 indicates the school, teacher or student associated with the data, for example, by indexing the data with codes or numbers that have been pre-assigned to the various schools, teachers or students. In addition, inquiries on class or student performance, or other references to the various schools, teachers or students, can be identified and located by its corresponding index.

In some embodiments, each time a student finishes using one of the education module 210 components, the education module 210 transmits a text file via the network 140, for example, the Internet, to a particular, pre-assigned Internet Protocol (IP) address. The text file generated is referred to as "mdata" for the spatial temporal animated reasoning (STAR) component, "qdata" in the case of diagnostic quiz data, or "AMC" in the case of the advanced math concept test data).

For illustrative purposes, the "mdata" text file can include the following data:

Keystrokes or other user input data as entered by the student, including, for example, the path the student takes in answering and mastering the material, incorrect responses, etc.

The sequence of consecutive scores obtained by the student for the current game (with corresponding dates of play), up to the most recent score obtained.

The sequence of consecutive scores for the other STAR games played by the student (with corresponding dates of the scores).

The sequence of consecutive scores for the games by the students that played STAR games on the particular computer from which the current information was transmitted.

Information identifying the source of the data in the "mdata" file listed above, including the students' names, teachers' names, and school. This identifying information can be encrypted, for example, by only identifying the students, teachers, and schools with pre-assigned numbers, and not in a textual form that could potentially be intercepted and read by any system on the network.

In the case of the "qdata" file, the following data can be included:

Keystrokes or other user input data as entered by the student, including, for example, the path the student takes in answering and mastering the material and incorrect responses, etc.

Answers to the quiz questions.

Dates identifying when each quiz was taken.

Encrypted information indicating the student, teacher, or school that is the source of the quiz data.

In the case of the "AMC" text file, the following data can be included:

Keystrokes or other user input data as entered by the student, including, for example, the path the student takes in answering and mastering the material and incorrect responses, etc.

Answers to the test questions.

Dates corresponding to when the test was taken.

Encrypted information indicating the student, teacher, or school that is the source of the test data.

Figure 9:
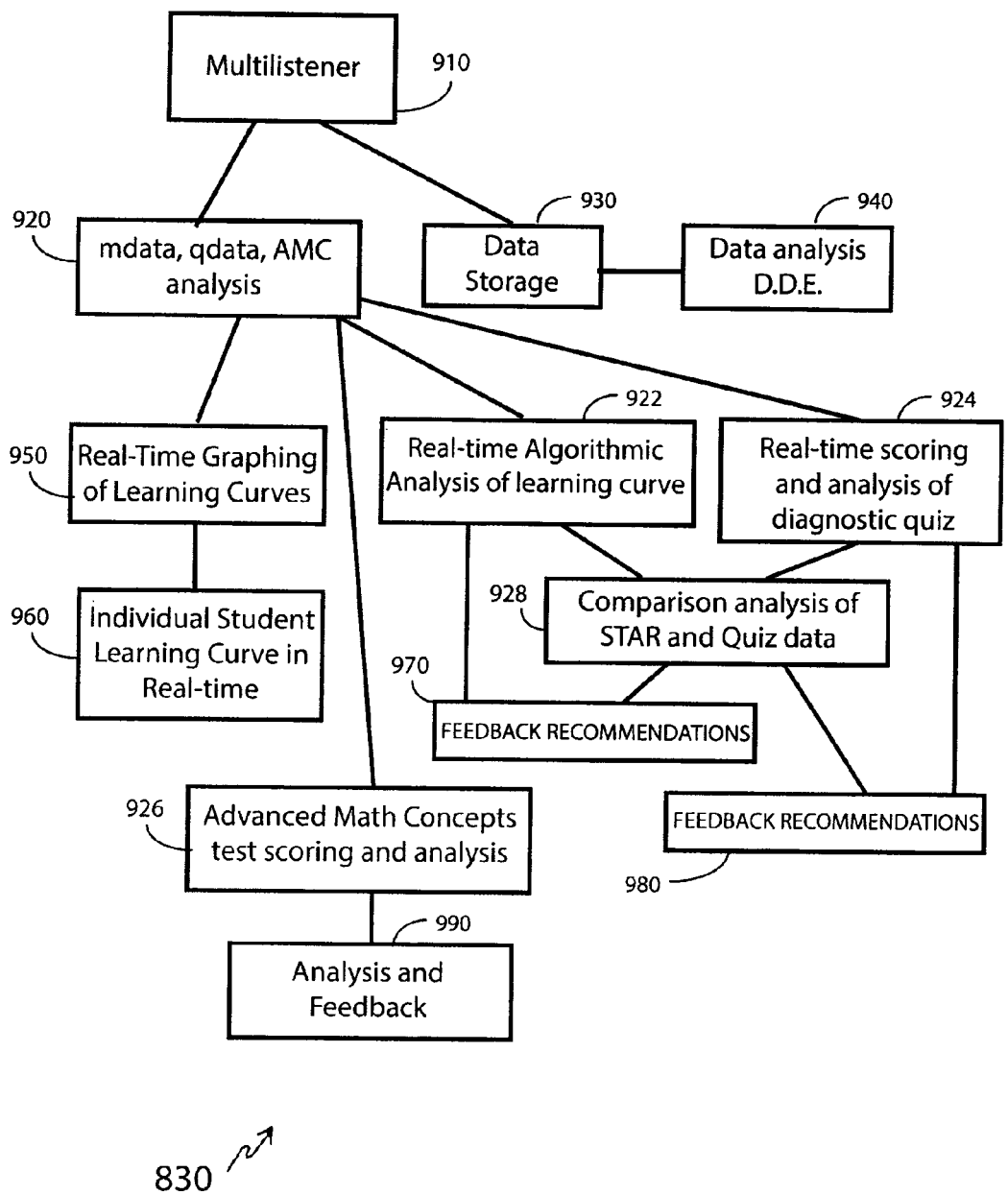
FIG. 9 is block diagram illustrating the hierarchical structure of various components of the performance analysis processing module shown in FIG. 8.

The performance analysis processing module 830 performs an analysis of the performance data 740 for one or more particular class, teacher or school. This is possible as a result of the indexing of the data in the "mdata," "qdata," or "AMC" text files by school, teacher, or student. The structure and a more detailed description of the performance analysis processing module 830 is shown in FIG. 9 and described in the corresponding detailed description of FIG. 9 below.

The feedback generation processing module 840 generates recommendations in the form of the feedback data 750 that are sent via the network to the computer that generated the inquiry or that is designated to receive the recommendation, for example, to a teacher of the particular student. In the case of responding to specific inquiries, for example, the feedback generation processing module 840 generates and sends recommendations if the information requested matches the school and class from which the inquiry originated. In the absence of specific inquiries, the feedback generation processing module 840 generates and sends recommendations at a certain, pre-defined interval, for example, once a week.

Among the purposes of the feedback data 750 are to: 1) optimize instruction time for teachers by reducing the time required for teachers to produce feedback data, 2) optimize learning for students by providing the teachers with contemporaneous recommendations, 3) identify problems quickly and maximize accelerated student learning, and 4) optimize games, lessons, quizzes and tests. The feedback generation processing module 840 fulfills these purposes as described above.

Figure 10:
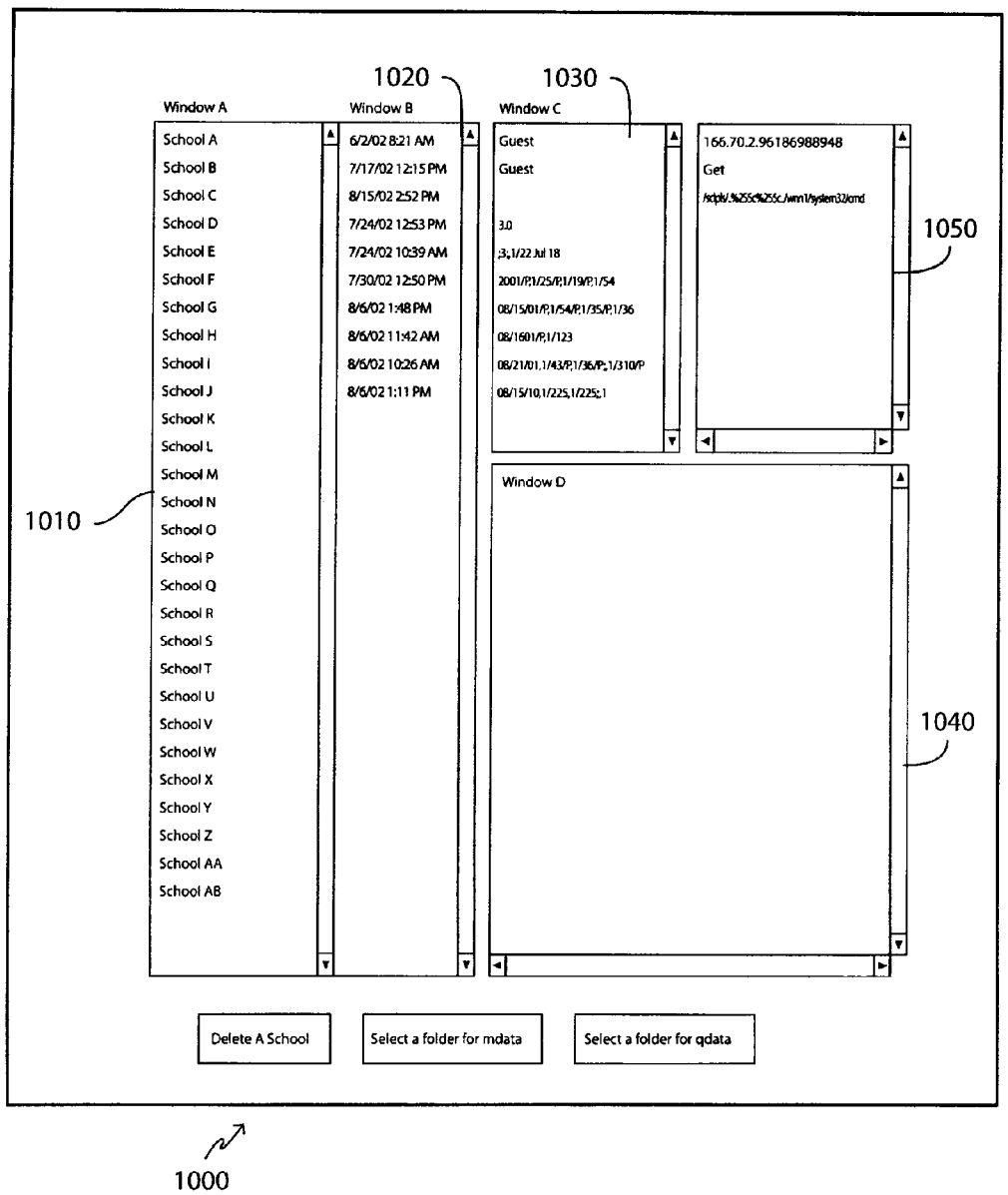
FIG. 10 is an example of a screen display that allows management and display by the user of the multi-listener module shown in FIG. 9.
Figure 11:
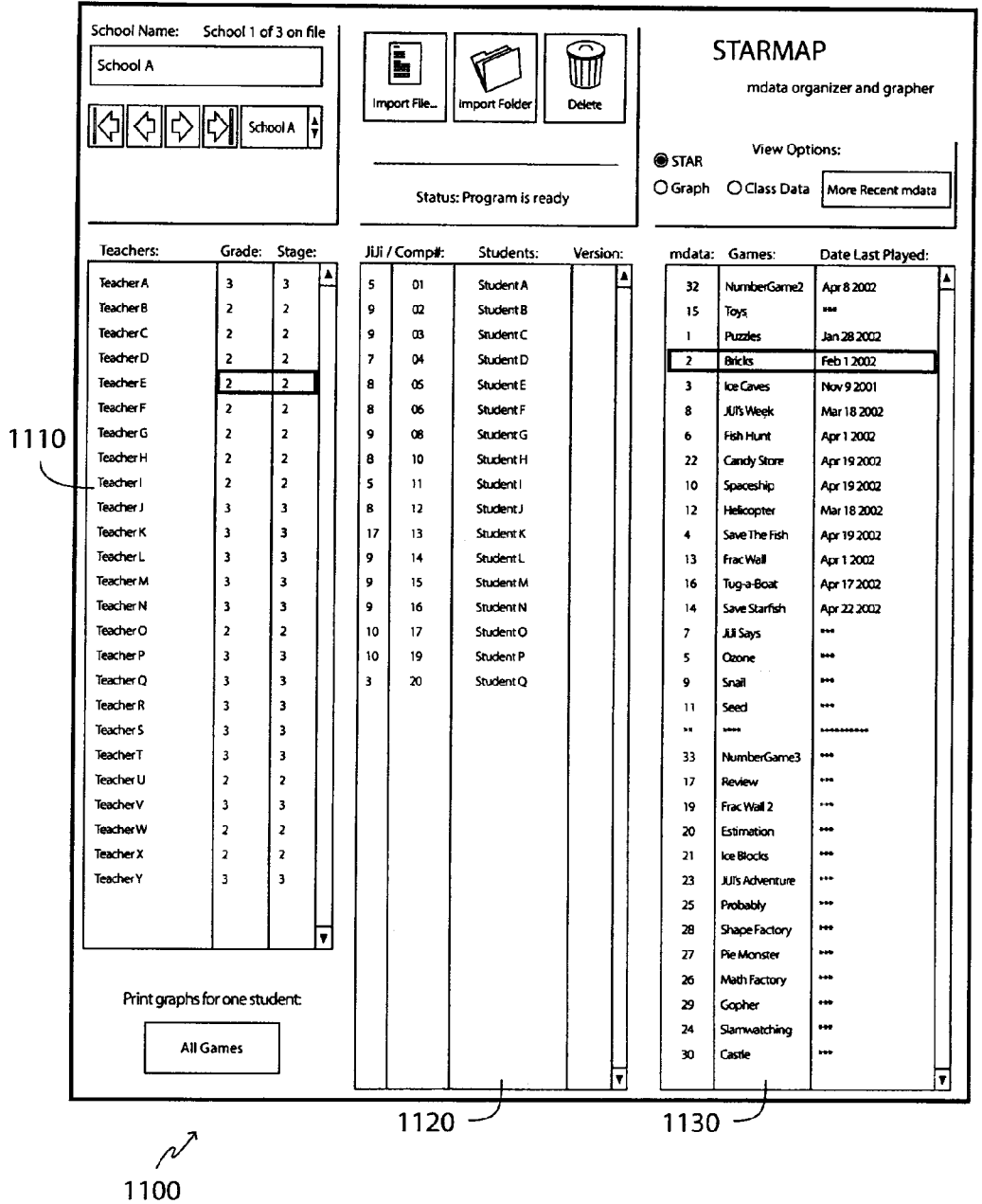
FIG. 11 is an example of a screen display that enables management and display by the user of data related to the analysis module shown in FIG. 9.
Figure 12:
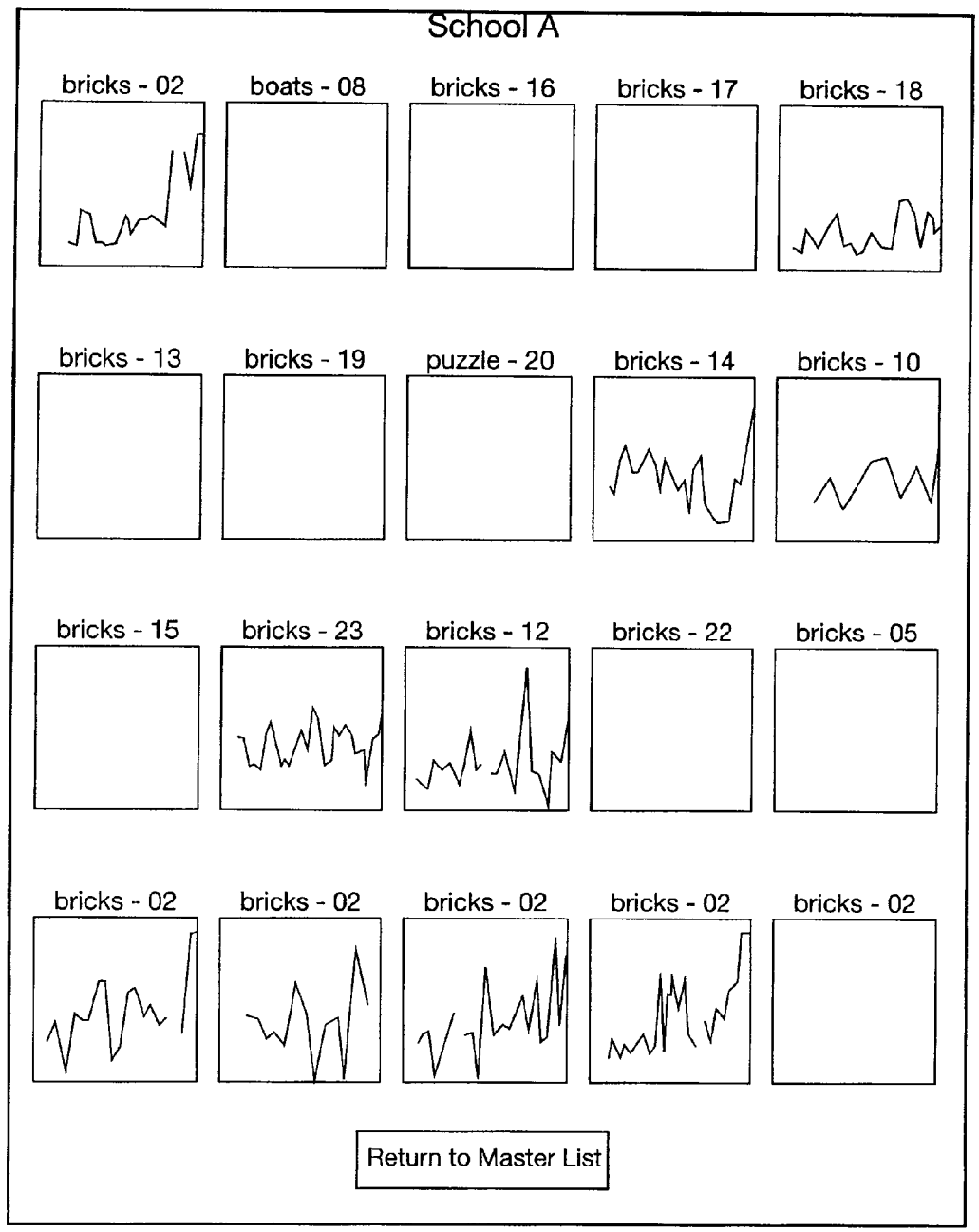
FIG. 12 is an example of a screen display that displays a series of student learning curve graphs for a particular school as generated by the data analysis module shown in FIG. 9.

Characteristic learning curves, examples of which are shown in FIGS. 10-12 and described in the accompanying detailed description, provide an objective measure of the degree of mastery of concepts taught in the STAR video games, lessons, quizzes and tests. The learning curve of individual students constitutes one feature on which feedback on student performance is based. For each game or quiz, standard curves have been established, the analysis of the standard curves enables the determination of the stage of learning each student is in. The analysis of the standard curves additionally enables the recommendation to the teacher on the actions that should be taken with respect to the student. For example, one recommendation could be that the student is in a rapid learning phase and should be left alone to continue mastering the material. An additional recommendation is that the student has already mastered the material and should be allowed to move on to a more challenging game or lesson. A further recommendation is that the student is having difficulty with the current game or lesson and needs assistance from the teacher. These recommendations to teachers for each student comprise the standard feedback in certain embodiments of the systems and methods.

Feedback can be generated and sent in various forms, including: 1) in real time and sent over the Internet, 2) in real time and sent as an email attachment, in that feedback recommendations can be written to a text file, which can be sent contemporaneously via email, and 3) in hardcopy form by printing out the text file having the recommendations and sending via regular mail.

FIG. 9 is block diagram illustrating the hierarchical structure of various components of the performance analysis processing module 830. The performance analysis processing module 830 includes a multi-listener module 910. The multi-listener module 910 receives, for example, the "mdata," "qdata," or "AMC" files from the education module 210 via the network 140. Upon initialization of the multi-listener module 910, a communication link, e.g., a socket, is opened and the system waits for receipt of information that is sent to the IP address of the computer on which it is executing. Once received, the data fields are stored in a data storage area 930 within the analysis and feedback processing computer 150 for access by the performance analysis processing module 830 for graphical display, for example, as a learning curve or access by any of the analysis features (automatic or manual) of the analysis and feedback processing computer 150.

The multi-listener module 910 is configured to scan the incoming "mdata" files for its information, and to send and store the information in the appropriate field location that is dynamically created for it. This information is compared to a stored look-up table in a data field having information regarding the school or schools from which data has previously been obtained, and to send the data to the appropriate field location that is created for it. If the school is new, for example, if the school name identified in the data file has not been previously acquired by the analysis and feedback processing system 150, a school look-up table field is appended with the new school name. In addition, the multi-listener module 910 creates a pathway with analysis screens from which the analysis and display functionality and recommendation generation occurs. An example of a screen display that enables management and display by the user of the multi-listener module 910 is shown in FIG. 10 and described below.

The performance analysis processing module 830 additionally includes a data analysis ("mdata," "qdata" or "AMC" files) module 920. The module 920 performs analysis of the streaming or retrieved data and executes algorithms that generate the requested performance assessment and recommendations such as real-time algorithmic analysis of learning curve 922. Analysis may be conducted, for example, according to each school, teacher, student, or game, quiz 924 or test 926. An example of a screen display that enables management and display by the user of the analysis module 920 is shown in FIG. 11 and described below.

The performance analysis processing module 830 additionally includes a data analysis data driven education (DDE) module 940. Application of data analysis techniques analysis and feedback processing module 150 to the learning or performance data 740 can be undertaken to uncover trends, to elucidate on how humans think, reason and create, and to optimize teaching tools and methods. If, after concentrated effort, mastery of the subject matter is not achieved by a particular student, the DDE module 940 can conduct detailed analysis to determine the specific conceptual difficulties in learning that are preventing mastery by the student. An example of a screen display that enables management and display by the user of the DDE module 940 is shown in FIGS. 17-21 and described below.

The performance analysis processing module 830 additionally includes a learning curve graphing module 950. The learning curve graphing module 950 is configured to display one or more display screens showing learning curves of a school for live data, or the most recently acquired data. Individual learning curves can be displayed in a larger size on the user's computer screen by clicking on a learning curve graph on the multi-learning curve screen. An example of a screen display that displays a series of student learning curve graphs for a particular school is shown in FIG. 12 and described below.

Figure 15:
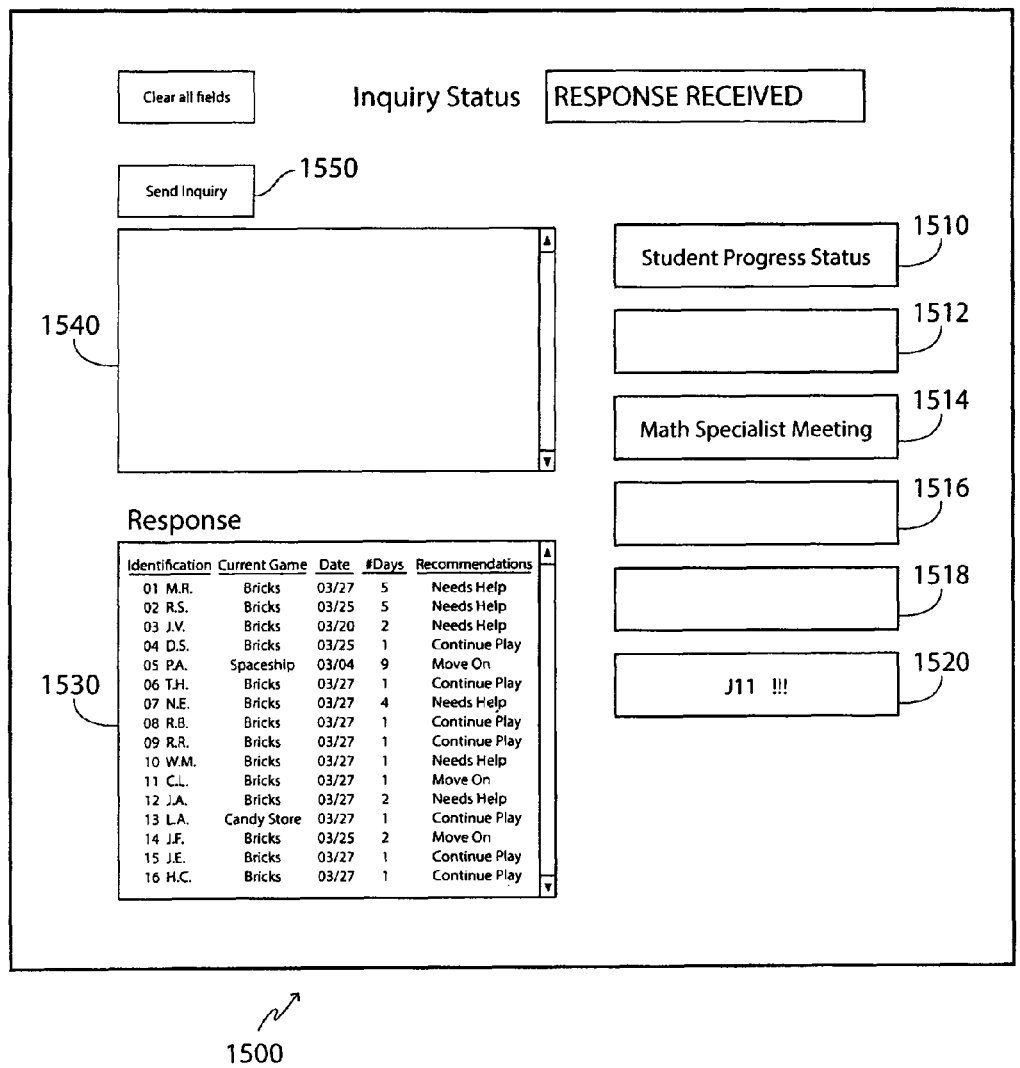
FIG. 15 is an example of a screen that allows entry and submission of a STAR game feedback request inquiry.
Figure 16:
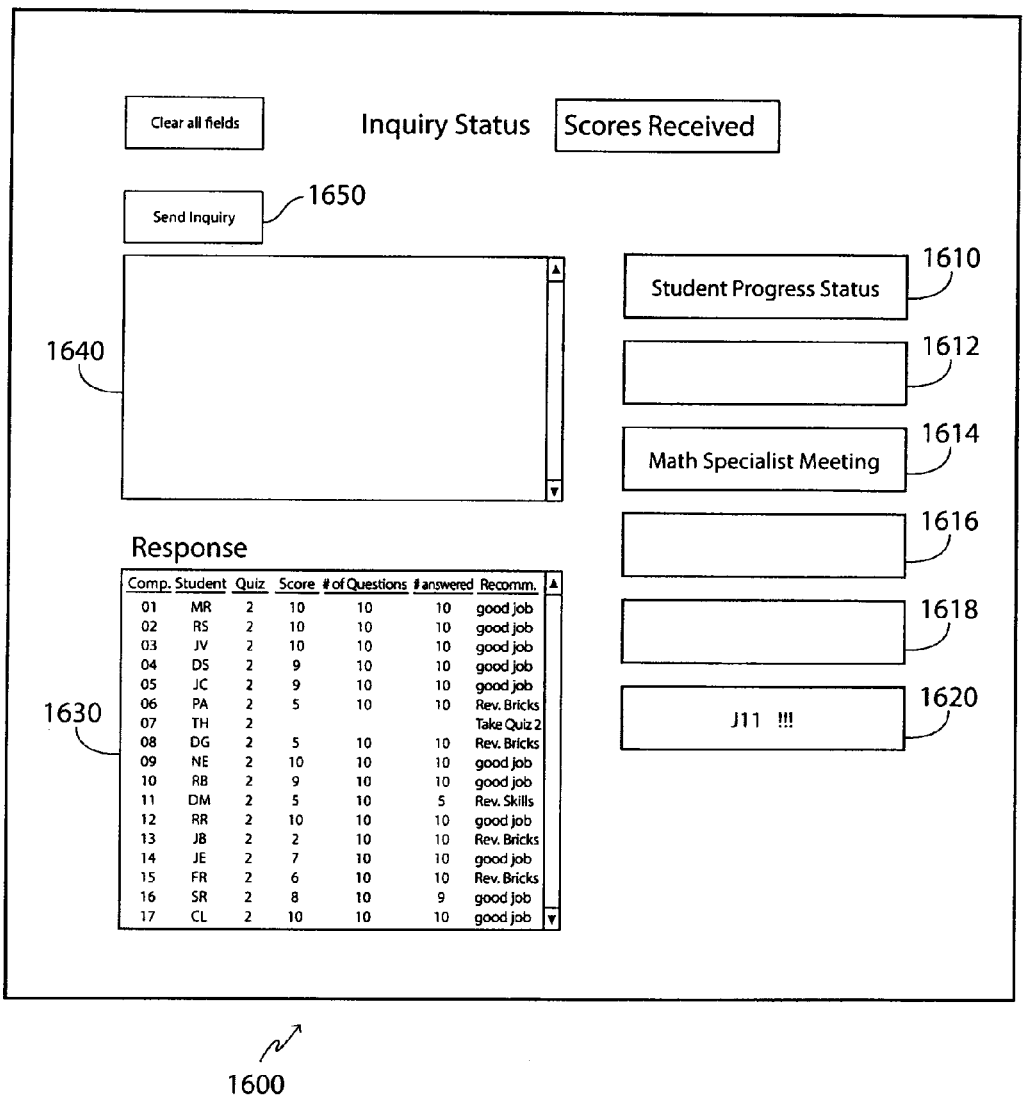
FIG. 16 is an example of a screen 1600 that allows entry and submission of a quiz feedback request inquiry.

The performance analysis processing module 830 additionally includes one or more feedback recommendations module 970, 980. The operations of the feedback recommendations module 970, 980 can be performed in one or more modules, and are shown in FIG. 9, for example, as multiple modules to illustrate that one or more types of feedback data can be produced. In the example shown in FIG. 9, the feedback recommendation module 970 provides feedback based on STAR game performance data 928, and the feedback recommendation module 980 provides feedback based on diagnostic quiz performance data 924 and 928. Examples of screen displays that illustrate several of possible feedback recommendations are shown in FIGS. 15 and 16 and described below.

The performance analysis processing module 830 additionally includes one or more feedback recommendations module 970, 980. The operations of the feedback recommendations module 970, 980 can be performed in one or more modules, and are shown in FIG. 9, for example, as multiple modules to illustrate that one or more types of feedback data can be produced. In the example shown in FIG. 9, the feedback recommendation module 970 provides feedback based on STAR game performance data, and the feedback recommendation module 980 provides feedback based on diagnostic quiz performance data. Examples of screen displays that illustrate several of possible feedback recommendations are shown in FIGS. 15 and 16 and described below.

The performance analysis processing module 830 additionally includes an analysis and feedback module 990. The analysis and feedback module 990 is configured to score and analyze advanced math concepts (AMC) tests from 926, and provide feedback based on that scoring and analysis.

FIG. 10 is an example of a screen display 1000 that allows management and display by the user of the multi-listener module 910 shown in FIG. 9. In the example screen display 1000 of FIG. 10, the schools from which data is acquired and analyzed appear in a display field labeled "Window A" 1010. The most recent date of data acquisition from one or more of the school listed in the field 1010 may be displayed in a field labeled "Window B" 1020. In addition, live data strings from one or more of the schools listed in the field 1010 are displayed in a field labeled "Window C" 1030. Data acquisition errors (if any) can be displayed in a field labeled "Window D" 1040, and miscellaneous messages can be displayed in a field 1050.

FIG. 11 is an example of a screen display 1100 that enables management and display by the user of data related to the analysis module 920 shown in FIG. 9. The screen 1100 shown in FIG. 11 displays analysis data related to a particular school, for example, "School A." The screen display 1100 includes a teacher information field 1110, which displays individual teacher information such as teacher name or identifier, a grade taught by the particular teacher, or a stage, e.g., a level of accomplishment. The screen display 1100 additionally includes a student score information field 1120 having, for example, game and performance information. The screen display 1100 further includes a game information field 1130, having, for example, a name of the game being played, the "mdata" score information for the particular game, or a date last played for the particular game. Various additional options allowing changing the selection of the school information displayed on the screen 1100 or various file and view options may also be included, for example, along the top of the screen 110 as shown on FIG. 11. In other embodiments, more or less teacher information, student information or game information may be displayed in the corresponding fields 1110, 1120, 1130 as shown in FIG. 11, or the arrangement and location of the various fields may be different than that shown in FIG. 11.

FIG. 12 is an example of a screen display 1200 that displays a series of student learning curve graphs for a particular school as generated by the data analysis module 920 shown in FIG. 9. In FIG. 12, the learning curves displayed are for different plays of a bricks, boats and puzzle game, although learning curves for any game, lesson, quiz or test could also be displayed in the screen display 1200. The learning curves displayed are computed and analyzed by the analysis and feedback processing system 150. The screen 1200 of the learning curves of a class, for example, is displayed by clicking on the name of the school on the multi-listener module 910 screen display 1000 shown in FIG. 10. The screen 1200 displays the data from, for example, the class that is currently playing the game(s), or has most recently played the STAR games. Any other class activity and performance may additionally be viewed on the screen display 1200. The individual learning curves are displayed and described in greater detail with regard to FIGS. 13 and 23 below.

Figure 13:
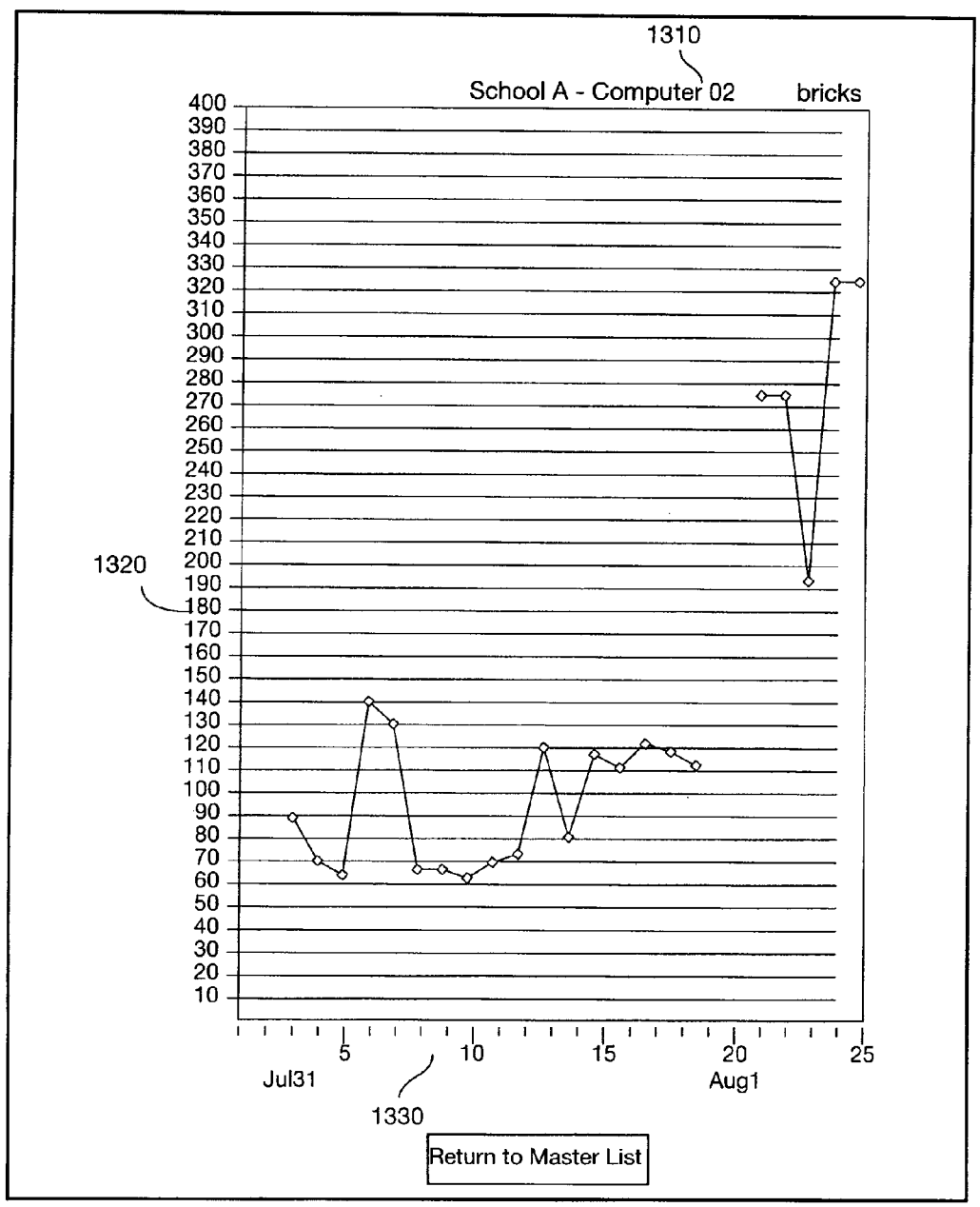
FIG. 13 is an example of a screen display that displays individual learning curves of the series of learning curves shown in FIG. 12.

FIG. 13 is an example of a screen display 1300 that displays individual learning curves of the series of learning curves shown in FIG. 12. In the example shown in FIG. 13, an individual learning curve is displayed for a student playing the bricks game on a computer having the identifier "Computer 02," as shown by the text 1310 in the upper right portion of the individual learning curve display 1300. In the learning curve display 1300, the score is plotted on the left-hand vertical axis 1320 of the curve, while the number of plays is plotted on the bottom horizontal axis 1330 of the curve. Of course, the display 1300 is just one example of the many different ways that the learning curves could be graphed or displayed on a computer screen. The individual sections or portions of the learning curve itself are described in greater detail below with regard to FIG. 23.

FIG. 14 is an example of a screen display 1400 that displays class performance data for a particular student playing a particular game, lesson, quiz or test. The display 1400 in the embodiment of FIG. 14 includes a school name field 1410 for displaying the textual name of the school for which the performance and analysis data pertains. The display 1400 additionally includes a data field 1420 for displaying the class performance data for a particular student with a particular teacher playing a certain game, lesson, quiz or test. The display 1400 also includes a field 1430 for displaying scoring parameters pertaining to the teacher, student and game displayed in the class data field 1420. The display 1400 further includes a school list field 1440 for displaying a list of schools for which the analysis and performance data of FIG. 14 may be accessed and displayed. Of course, the display 1400 is just one example of the many different ways that the learning curves could be graphed or displayed on a computer screen, more or less information could be displayed and the information displayed could be arranged differently and displayed in different locations than shown in the example of FIG. 14.

FIG. 15 is an example of a screen 1500 that allows entry and submission of a STAR game feedback request inquiry. Generalized inquiries can be entered in the "Send Inquiry" query field 1540 by, for example, typing the request via a computer keyboard, and sent to the analysis and feedback processing module 150 by clicking on the "Send Inquiry" button 1550 using a computer mouse device. By utilizing a screen such as the feedback request inquiry screen 1500, the user desiring performance feedback can request real-time or contemporaneous feedback by selecting one of the present buttons 1510, 1512, 1514, 1516, 1518, 1520 on the right of the screen. Selecting one or more of the buttons 1510, 1512, 1514, 1516, 1518, 1520 initiates an automatic algorithmic assessment of the data and results in generation of various recommendations that appear in a response field 1530. In the example in FIG. 15, the response field 1530 includes data arranged in columns for student identification data, current game information, date information, number of days the student has been playing the current game, or short textual recommendation information.

Feedback can be generated by the analysis and feedback processing system 150 and transmitted over the network 140, for example, the Internet, via the inquiry feature of the system that is installed on a computer at the school site. The operational principles of the inquiry feature are similar to those of the multi-listener module 910. For example, when a query is initiated by clicking on one of the appropriate buttons 1510, 1512, 1514, 1516, 1518, 1520 on the inquiry window as described above, a preset message or the message typed into the query field 1540 of the screen 1500 is sent to a pre-set IP address corresponding to the analysis and feedback processing computer 150. In some embodiments, a socket is opened on the computer that sent the query, and that computer waits passively for a response to the query. The analysis and feedback processing computer 150 passively monitors incoming messages at the designated IP address and receives the information, which triggers either a manual response, or an automatic response generated by the analysis algorithms if the query is sent via one of the pre-set buttons.

FIG. 16 is an example of a screen 1600 that allows entry and submission of a quiz feedback request inquiry. Generalized inquiries can be entered in the "Send Inquiry" field 1640 by, for example, typing the request via a computer keyboard, and sent to the analysis and feedback processing module 150 by clicking on the "Send Inquiry" button 1650 using a computer mouse device. By utilizing a screen such as the feedback request inquiry screen 1600, the user desiring quiz performance feedback can request real-time or contemporaneous feedback by selecting one of the present buttons 1610, 1612, 1614, 1616, 1618, 1620 on the right of the screen. Selecting one or more of the buttons 1610, 1612, 1614, 1616, 1618, 1620 initiates an automatic algorithmic assessment of the quiz data and results in generation of various recommendations that appear in a response field 1630. In the example in FIG. 16, the response field 1630 includes data arranged in columns for computer identification number, student identification data, quiz number, quiz score data, number of questions in the quiz, number of quiz questions answered, or short textual recommendation information.

Figure 17:
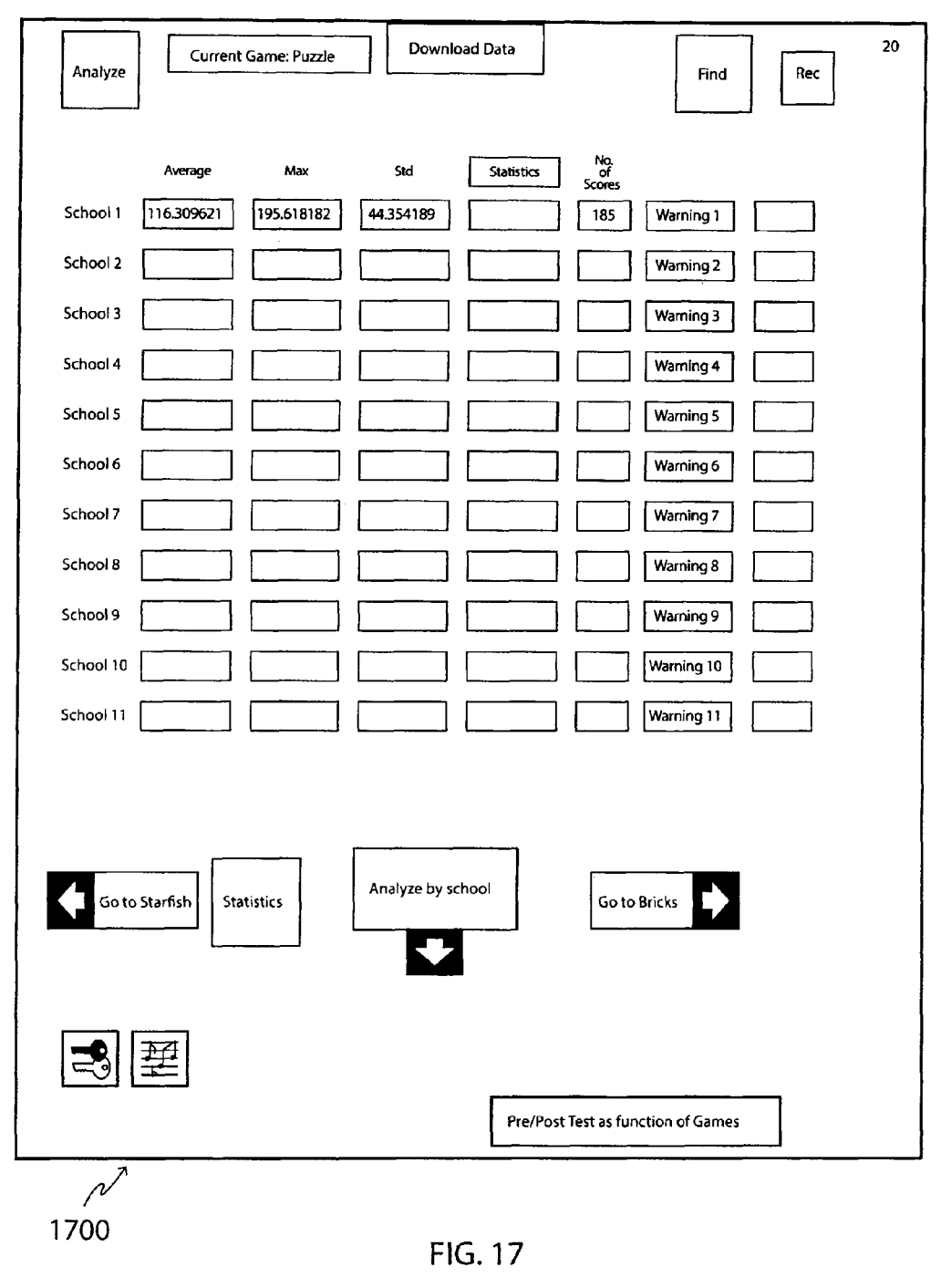

FIG. 17 is an example of a screen display 1700 that allows display of certain assessment data computed by the algorithms of the analysis and feedback processing system 150. In the example shown in FIG. 17, assessment data is displayed on a school-by-school basis for average scores, maximum scores, standard deviation of the scores, number of scores, or warning buttons. Various other screen display options and statistical and analytical options can also be selected via the screen 1700 as shown in FIG. 17.

In addition to the real-time assessment components, the analysis and feedback processing module 150 has included a comprehensive host of statistical analytical tools that facilitate in depth analysis of learning data for research purposes or more detailed feedback that can be displayed via the screen 1700. The structural configuration of the data being partitioned into fields in FIG. 17 enables the investigation of correlations between various parameters of the learning and analysis data. By utilizing a detailed analysis screen such as that shown in FIG. 17, learning data can be analyzed and studied to discover information about how people think and reason, and by incorporating this into the feedback recommendations, can be used to develop improved teaching methodologies. This can be referred to as data driven education (DDE), as opposed to the more traditional theory driven education.

In certain embodiments, the DDE methodologies are configured to read and analyze the keystroke data as described above with regard to the "mdata," "qdata" and "AMC" files. The keystroke data can be stored in a relational database or other data storage device. The statistical and data mining analysis of the DDE is applied to the keystroke to enable, for example, (1) personalized feedback regarding the specific problem(s) the student is having and generating one or more recommendations; (2) detailed analysis of the universals encoded in the keystroke data across a large database of subjects, thereby allowing the determination of the dynamics of how humans learn.

Figure 18:
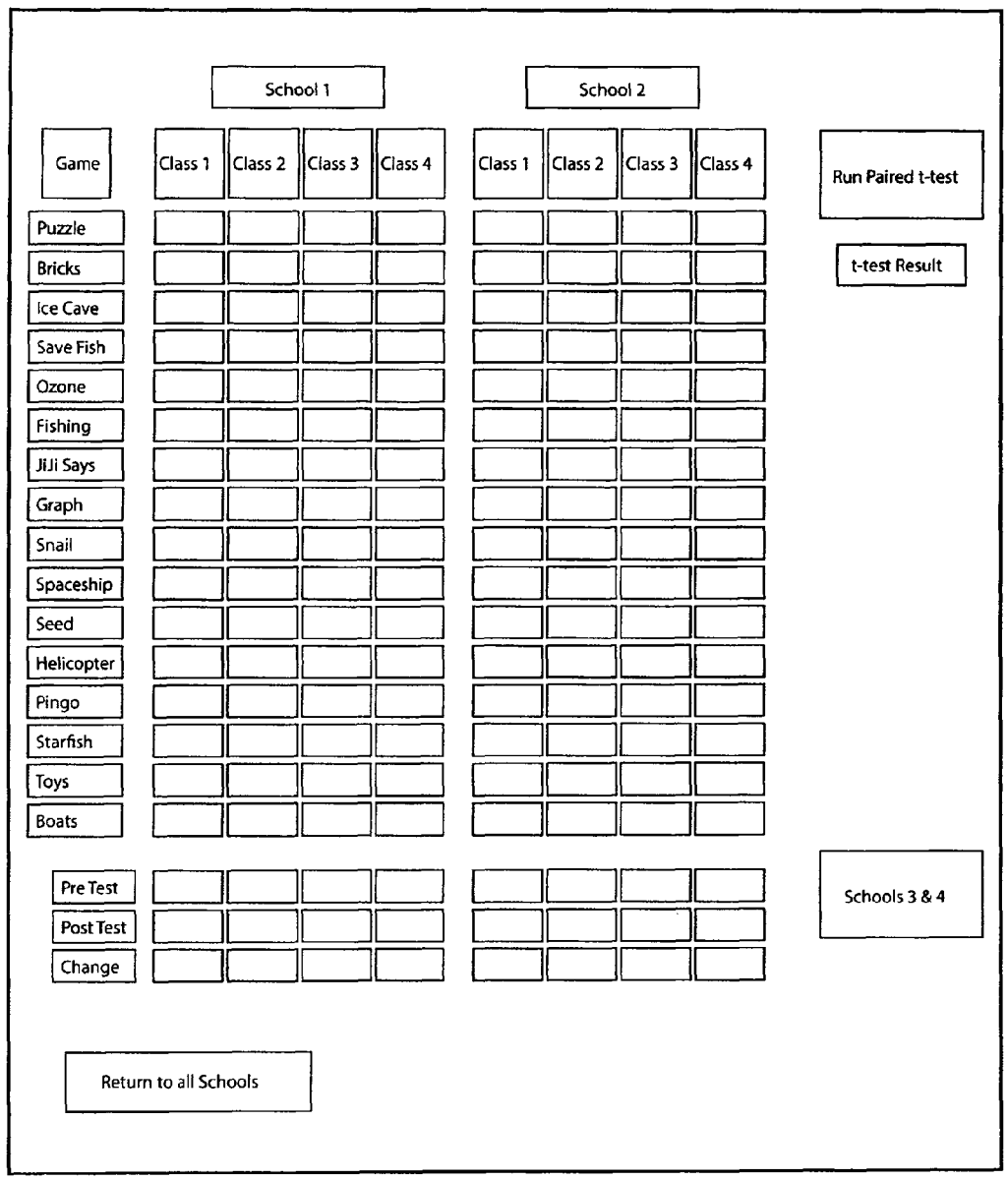
FIG. 18 is an example of a further screen display that allows display of certain assessment data computed by the algorithms of the analysis and feedback processing system.

FIG. 18 is an example of a further screen display 1800 that allows display of certain assessment data computed by the algorithms of the analysis and feedback processing system 150. The screen 1800 displays game score performance information of one or more classes of one more particular schools. Also included on the screen 1800 are pre-test, post test or change scores for each class for each school. Various other screen display options and statistical and analytical options can also be selected via the screen 1800 as shown in FIG. 18. The performance data blocks shown in FIG. 18 are blank, but typically these blocks would display numbers representing game scores.

Figure 19:
FIG. 19 is another example of a screen display that allows display of certain assessment data computed by the algorithms of the analysis and feedback processing system.

FIG. 19 is another example of a screen display 1900 that allows display of certain assessment data computed by the algorithms of the analysis and feedback processing system 150. The screen 1900 displays score performance information of one or more particular students, for example, on a periodic basis such as a weekly basis. In addition, statistic data, Stanford 9 test data, or AMC test data can be displayed on the screen 1900. Various other screen display options and statistical and analytical options can also be selected via the screen 1900 as shown in FIG. 19.

Figure 20:
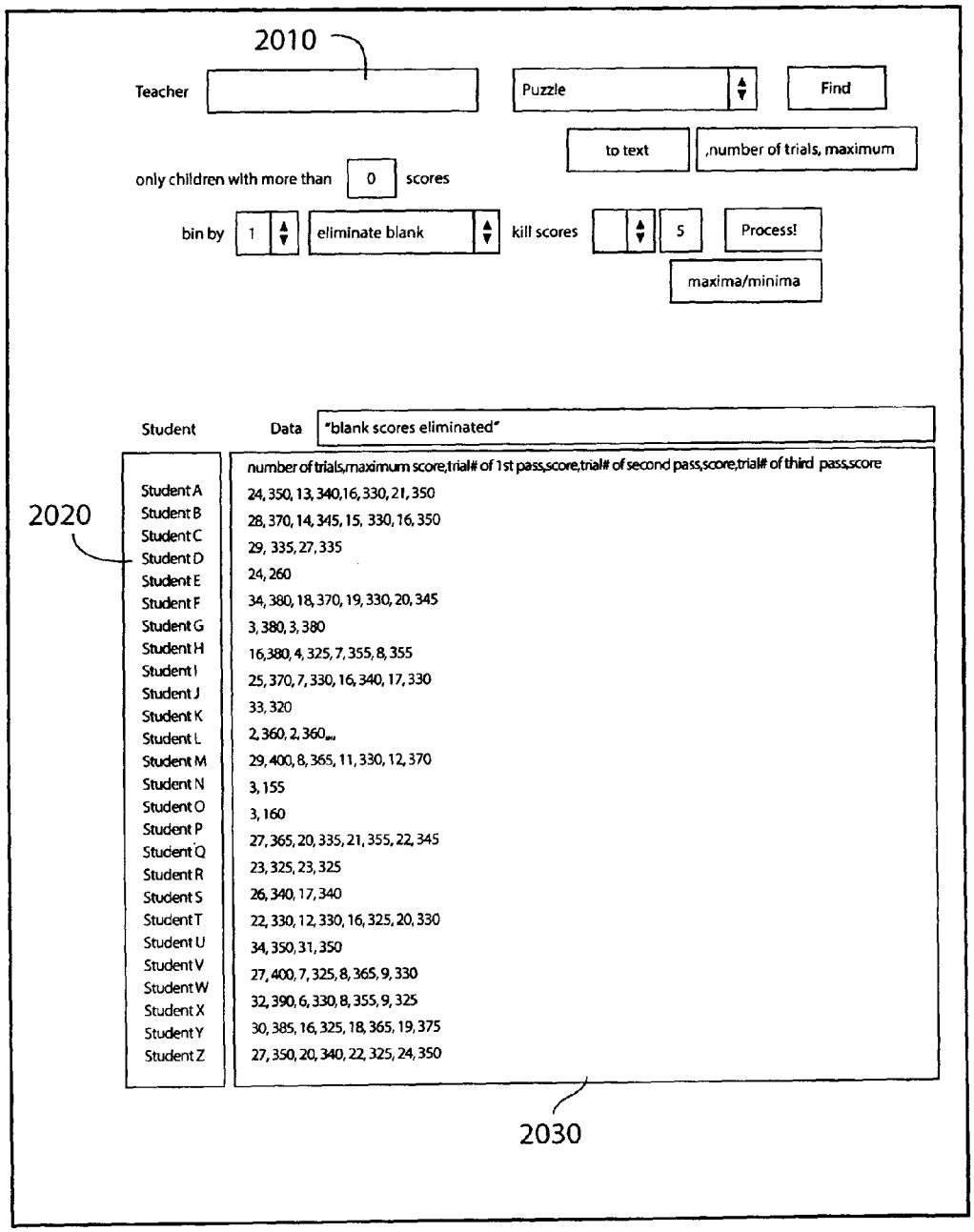
FIG. 20 is an example of a screen display that allows display of certain assessment data of student performance scores computed by the algorithms of the analysis and feedback processing system.

FIG. 20 is an example of a screen display 2000 that allows display of certain assessment data of student performance scores computed by the algorithms of the analysis and feedback processing system 150. The student score data display screen 2000 includes a teacher identification field 2010 to display the name, identification number, or other textual identification of a particular teacher. The display screen 2000 additionally includes a student identification list field 2020 to display a list of student names, identification numbers, or other textual identification of the particular students. The screen 2000 further includes a score data field 2030 to display various numerical or other textual descriptions of performance score information. For example, the field 2030 shown in FIG. 20 has fields for a number of trials, a maximum test score, a trial number of the first passing score achieved by the student, a score of the first passing score, a trial number of the second passing score achieved by the student, a score of the second passing score, a trial number of the third passing score achieved by the student, or a score of the third passing score. Various other screen display options and statistical and analytical options can also be selected via the screen 2000 as shown in FIG. 20.

Figure 21:
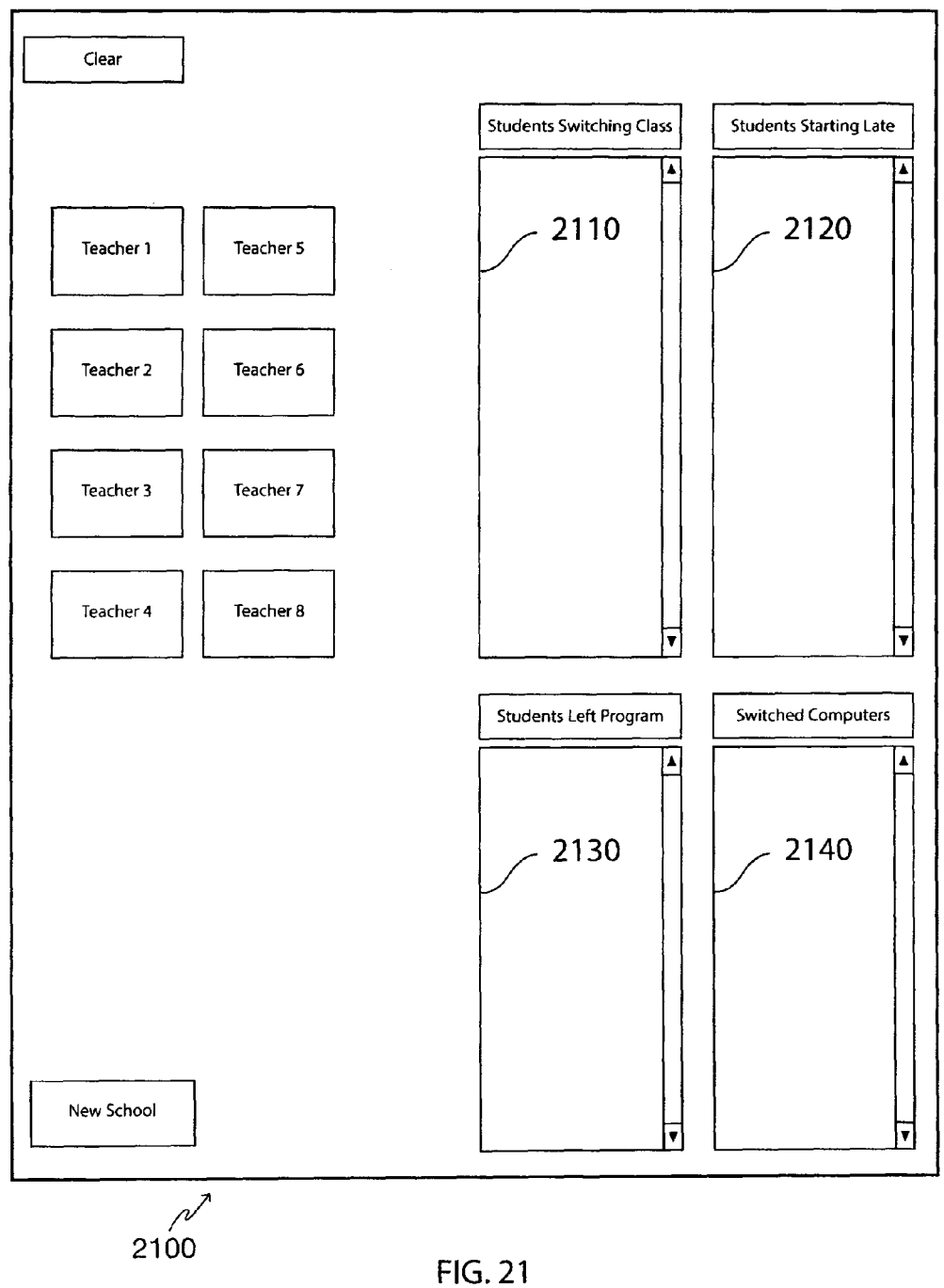
FIG. 21 is an example of a screen display that shows certain student status information for one or more teachers.

FIG. 21 is an example of a screen display 2100 that shows certain student status information for one or more teachers. The screen display 2100 includes a field 2110 for displaying a list of one or more students who are switching classes, and a field 2120 for displaying a list of one or more students who started later than the other students in the class at beginning to play the games or take the lessons, quizzes or tests associated with the STAR curriculum. The screen display 2100 additionally includes a field 2130 for displaying a list of one or more students who have left the STAR learning program, and a field 2140 for displaying a list of one or more students who have switched computers in the course of STAR program. Various other screen display options can also be selected via the screen 2100 as shown in FIG. 21.

Figure 22:
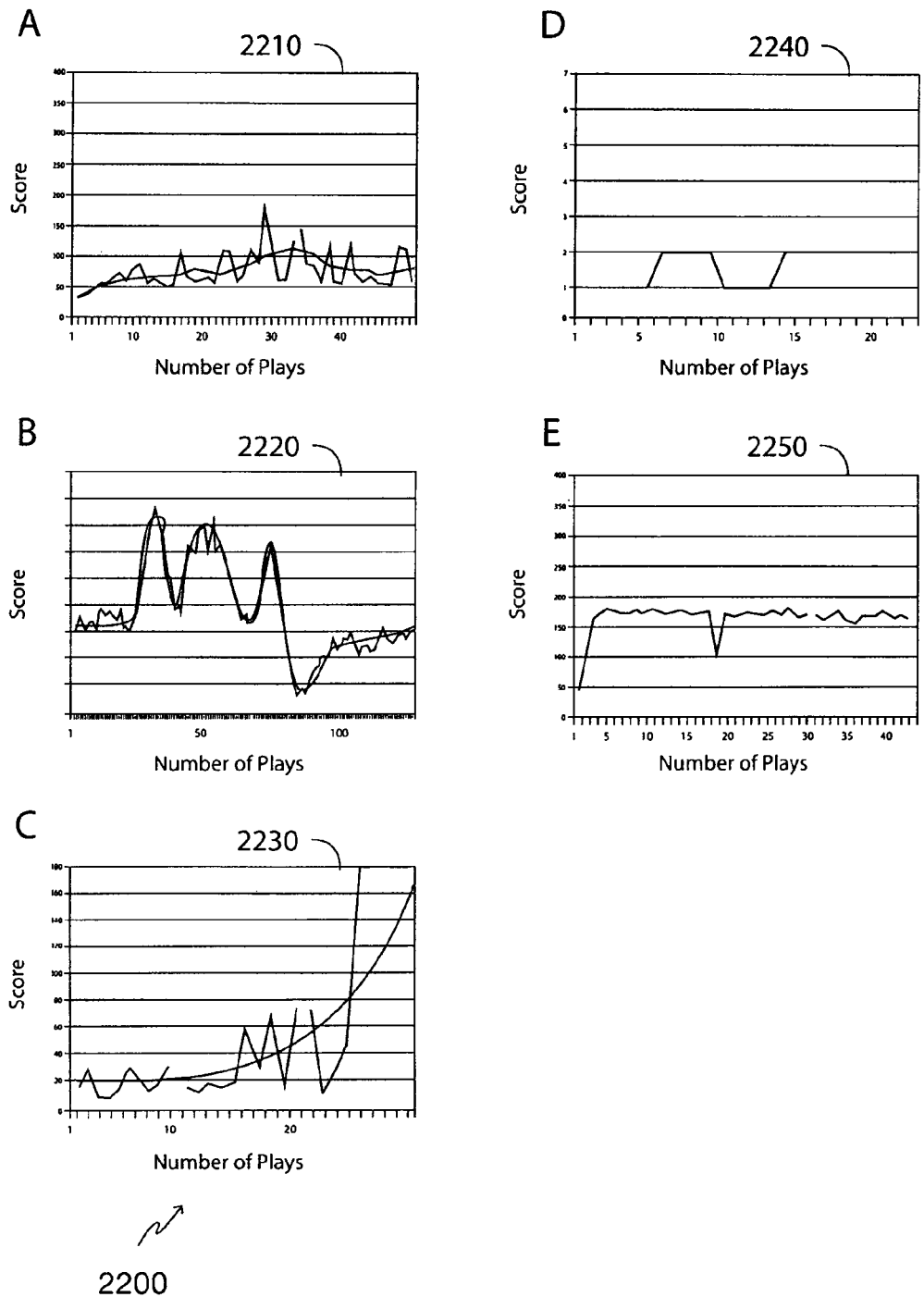
FIG. 22 is a diagram showing a series of graphs (labeled A-E) illustrating some scenarios in which a score curve may indicate that the student did not learn and retain the identified math concept from the math video game.

FIG. 22 is a diagram showing a series of graphs (labeled A-E) illustrating some scenarios in which a score curve may indicate that the student did not learn and retain the identified math concept from the math video game. FIG. 22 illustrates some scenarios where a score curve may indicate that the student did not learn and retain the identified mathematical concept from the STAR math video game. In the first score curve 2210, the sustained positive slope of the score curve is too low, indicating that there is no significant learning over the number of game plays. The score curve is also well below the passing score of the game, which is 300 in this example. Furthermore, an extrapolation of the score curve indicates that the passing score would not be attained within a reasonable number of further game plays. If the score curves of a significant number of sampled students follow this pattern, the game may either be too difficult or instead unsuccessful in tapping into the innate spatial temporal abilities of the students.

In the second score curve 2220, the score curve oscillates over a wide range. This typically indicates a lack of concentration. If the score curves of a significant number of sampled students follow this pattern, the game may either be unchallenging or over-taxing on short-term memory, thus causing the students to lose focus or attention on the game. Possible corrections include making the game more challenging or less memory intensive. It should also be noted that this pattern, if exhibited by the score curves of a particular student repeatedly in various STAR math games, might indicate that the particular student is just extremely inattentive, totally unmotivated or afflicted with an attention disorder such as attention deficit disorder (ADD).

In the third score curve 2230, the initial portion of the score curve is similar to that in the first score curve 2210 in that the sustained positive slope of the score curve is too low, indicating that there is no significant learning over the initial number of plays of the game. However, the score curve 2230 does eventually show an improving trend over the later number of game plays. If the score curves of a significant number of sampled students follow this pattern, the game may be too difficult, especially during the initial stages, thus taking students an overly long time to master. Also, the game play could be non-intuitive, or just not very well conveyed to the student by the animated sequence of the game that illustrates the game play.

In the fourth score curve 2240, the score curve is similar to the first score curve 2210, but in this example a passing score is attained. This typically indicates the same types of problems as those outlined in the description of the first score curve 2210 above, in addition to the game being too easy.

In the fifth score curve 2250, the score curve indicated steady learning initially but with leveling off very quickly. If the score curve 2250 levels off at or beyond the passing score, it could indicate that the game is too easy and of little teaching value. If the score curve 2250 levels off at a point well below the passing score, it may indicate that there is a flaw in the game or the game play such that a block to learning is created partially through the game.

Figure 23:
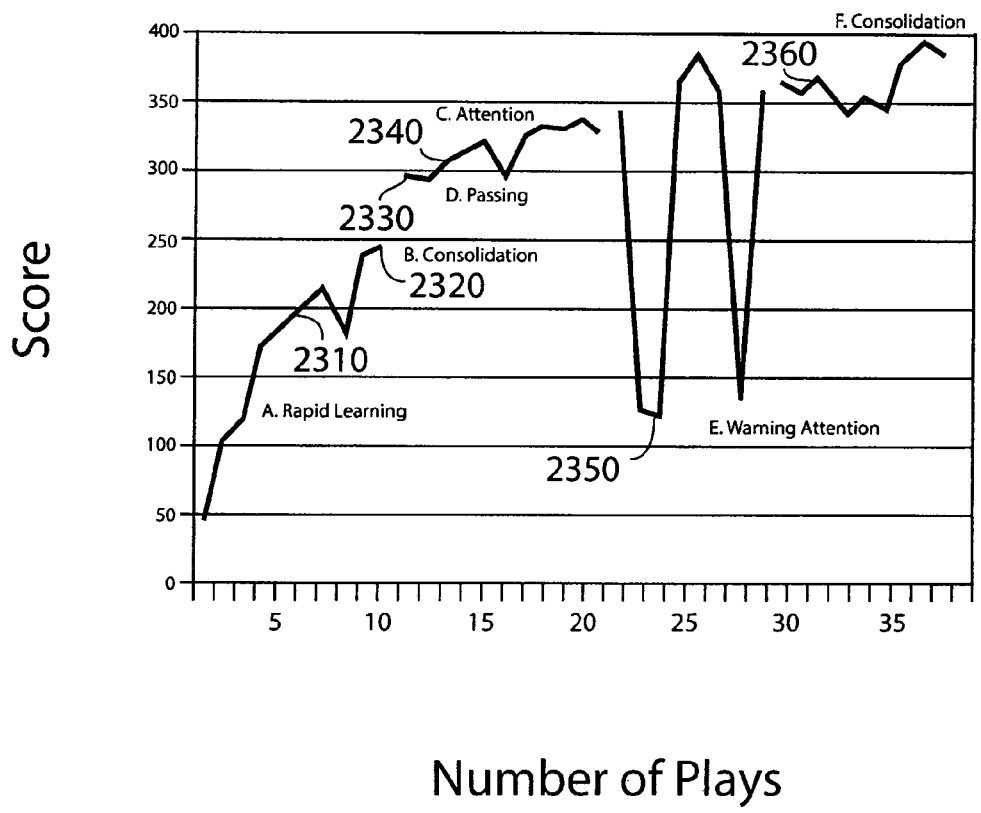
FIG. 23 is graph illustrating an example of an individual learning curve of scores plotted for a particular student for a certain game, test, quiz or lesson.

FIG. 23 is graph illustrating an example of an individual learning curve 2300 of scores plotted for a particular student for a certain game, test, quiz or lesson. The score curve in FIG. 23 illustrates a score curve that indicates that a student has successfully learned and retained the identified mathematical concept from the STAR math video game or other educational lesson. In this example, the passing score for the game or lesson is 300. Each contiguous line in the score curve 2300 represents game plays occurring on the same day. Therefore, there is a break in the score curve 2300 for each day on which the game is not played or the lesson, quiz or test is not taken. At the portion of the score curve 2300 labeled as a portion 'A' 2310, the score curve 2300 is rising rapidly, which indicates rapid learning by the student. At a portion 'B' 2320 of the score curve 2300, there is a break in the score curve between the first and second days on which the game is played. As the scores at the beginning of the second day shows improvements over those at the end of the first day, the portion 'B' 2320 indicates consolidation or retention of knowledge. At a portion 'C' 2330, the score curve 2300 on the second day that the game is played shows steadily improving scores, indicating that the student is paying attention and further honing his knowledge. At a portion 'D' 2340 of the score curve 2300, a passing score of 300 is first attained. At portion 'E' 2350, there is a period of waning attention as the student tends to lose focus or attention. At portion 'F' 2360, there is a break in the score curve 2300 between the third and fourth days on which the game is played. As the scores at the beginning of the fourth day show improvement over those at the end of the third day, the portion 'F' 2360 also indicates consolidation or retention of knowledge similar to that shown by the portion 'B' 2320 of the score curve 2300.

Figure 24:
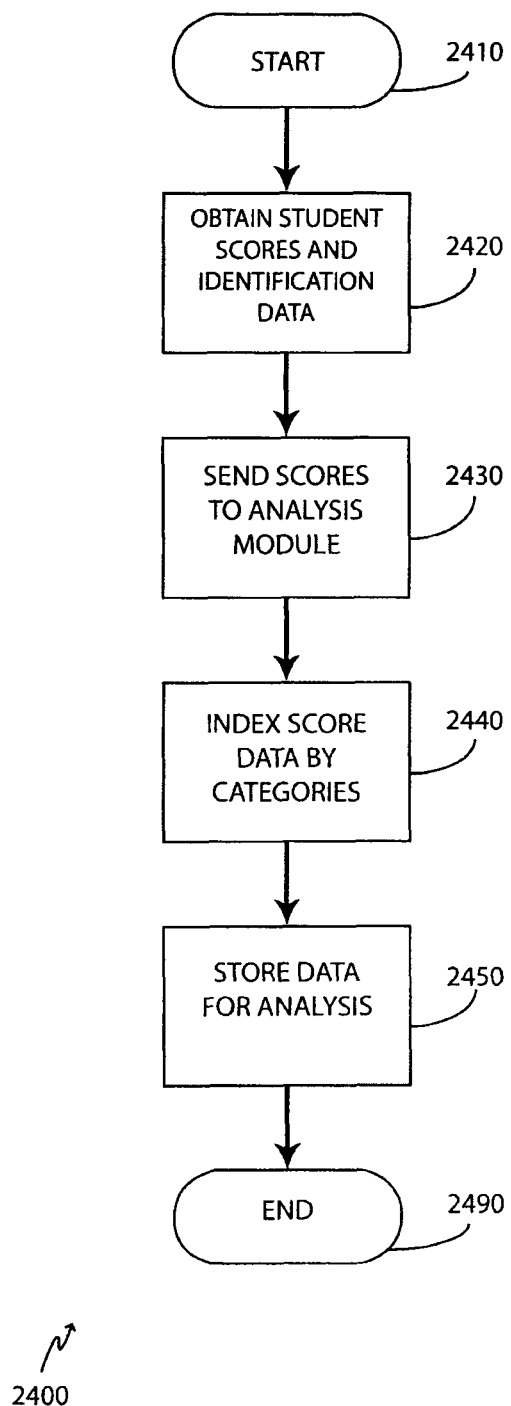
FIG. 24 is a flowchart illustrating a process of data acquisition of student performance scores as performed by certain embodiments of the data acquisition processing module shown in FIG. 8.

FIG. 24 is a flowchart illustrating a process 2400 of data acquisition of student performance scores as performed by certain embodiments of the data acquisition processing module 820 shown in FIG. 8. The data acquisition process 2400 begins at a start block 2410, which can include initialization processing such as data initialization or communications initiation processing. The data acquisition process 2400 continues at a block 2420 for obtaining student scores and identification data. When a student finishes one of the games, lessons, quizzes or tests, the education module 210 receives the corresponding performance data from the student computer 112, 114, 118. The block 2420 obtains the performance data from the education module 210 over the network 140 via the network interface processing module 810.

The data acquisition process 2400 continues at a block 2430 for sending the score or other performance data to the performance analysis processing module 830 for detailed performance analysis and feedback processing. The content and format of the text files, which in certain embodiments are referred to as "mdata" in the case of STAR data, "qdata" in the case of diagnostic quiz data, or "AMC" in the case of advanced math concepts data, are described above with regard to FIGS. 8 and 9.

The data acquisition process 2400 continues at a block 2440 for indexing the score or performance data by certain categories, to facilitate the performance analysis by the performance analysis processing module 830. The process 2400 continues at a block 2450 for storing the data for analysis by the module 830. The block 2450 makes the associated performance data available to the performance analysis processing module 830, for example, by copying to a portion of memory to an area for access by the module 830, or by sending an indication (e.g., index or pointer) of the location of memory at which the data is stored to the module 830. The process 2400 terminates processing at an end block 2490.

Figure 25:
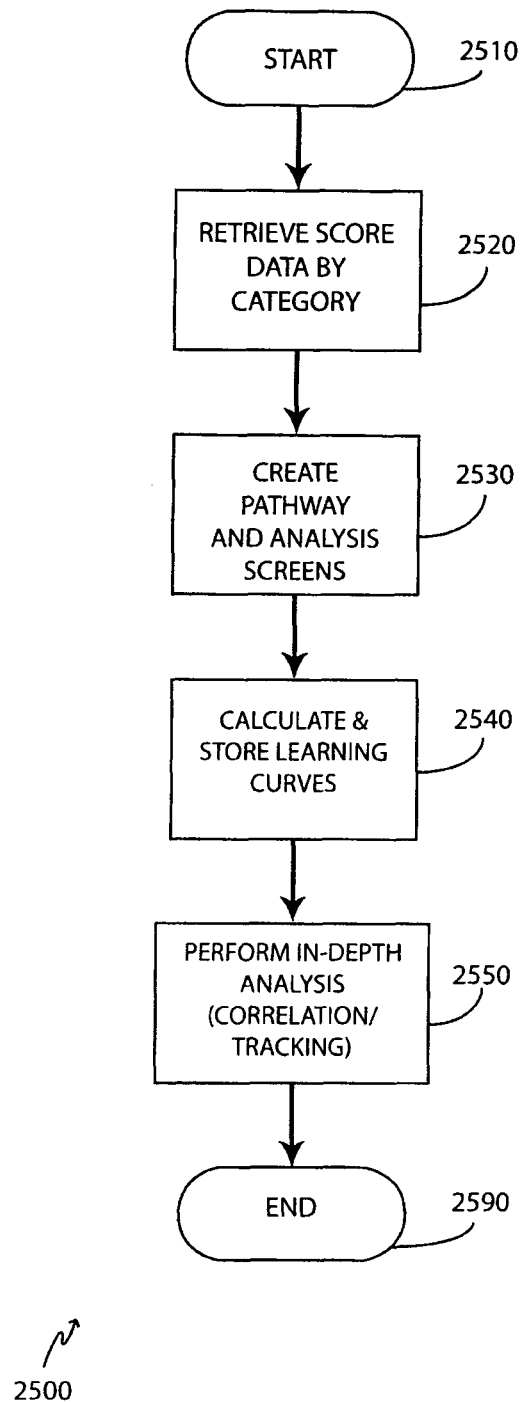
FIG. 25 is a flowchart illustrating a process of analysis of student performance scores as performed by certain embodiments of the performance analysis processing module shown in FIG. 8.

FIG. 25 is a flowchart illustrating a process 2500 of analysis of student performance scores as performed by certain embodiments of the performance analysis processing module 830 shown in FIG. 8. The performance analysis process 2500 begins at a start block 2510, which can include initialization processing such as data initialization or communications initiation processing. The performance analysis process 2500 continues at a block 2520 for retrieving the score or performance data by category as generated by the block 2440 of the data acquisition process 2400 as described above. The performance analysis process 2500 continues at a block 2530 for creating a pathway and analysis screens. In creating analysis screens, for example, as shown in FIG. 10, the data in the text files is identified and categorized, for example, by school, teacher, and student. The block 2530 scans the incoming text files for this information, and sends and stores the data in the appropriate field location that was dynamically created for it. The block 2530 compares the school name in the text file to a stored look-up table in the field for the list of schools from which data has previously been obtained, and sends the data to the appropriate field location that was created for it. If the school name identified in the data file has not previously had any data acquired by the analysis and feedback processing system 150, the look-up table field is appended with the new school name. In addition, a pathway, with analysis screens from which the analysis, display functionality and recommendation generation occurs, is automatically created.

The performance analysis process 2500 continues at a block 2540 for calculating and storing learning curves generated from the score or performance data. The performance analysis process 2500 continues at a block 2550 for performing in depth analysis of the performance data, including correlation or tracking analysis. More detailed descriptions of the operation of the calculate and store learning curves block 2540 and the perform in depth analysis block 2550 are provided below with regard to FIGS. 27-29. The process 2500 terminates processing at an end block 2590.

Figure 26:
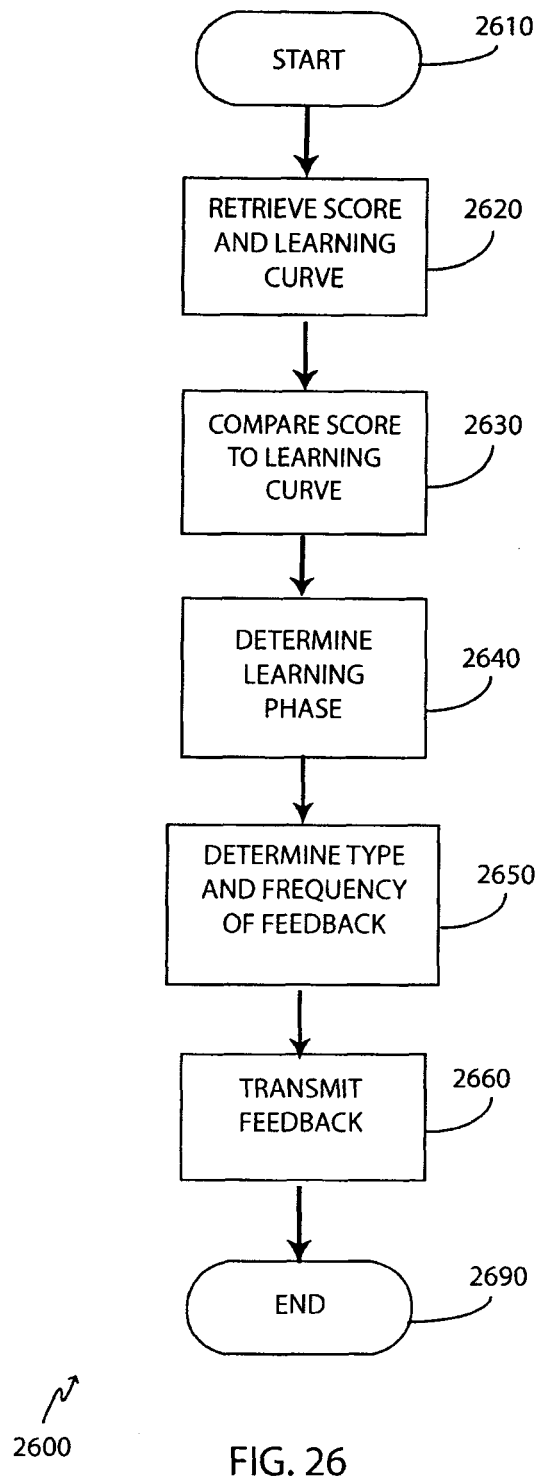
FIG. 26 is a flowchart illustrating a process of generating feedback information as performed by certain embodiments of the feedback generation processing module shown in FIG. 8.

FIG. 26 is a flowchart illustrating a process 2600 of generating feedback information as performed by certain embodiments of the feedback generation processing module 840 shown in FIG. 8. The feedback generation process 2600 begins at a start block 2610, which can include initialization processing such as data initialization or communications initiation processing. The feedback generation process 2600 continues at a block 2620 for retrieving the score or performance data and the learning curves generated by the performance analysis process 2500 from a data storage area or memory locations. The feedback generation process 2600 continues at a block 2630 for comparing the score data to the learning curves. Based on the comparisons of block 2630, which are described in greater detail below with regard to FIGS. 30-32, a block 2640 determines the learning phase that the student is currently at. Examples of the various learning phases that are utilized in certain embodiments are illustrated in FIG. 23 and described above in regard to FIG. 23.

The feedback generation process 2600 continues at a block 2650 for determining the type and frequency of feedback that is appropriate and warranted based on, for example, the analysis data, the learning phase of the student, or other school, class or individual student performance data. The feedback generation process 2600 continues at a block 2660 for transmitting the feedback generated by the process 2600 to the various systems that are configured to receive feedback data, which includes, for example, the computer systems 130, 170, 710, 720, 730 as shown in FIG. 7. More detailed descriptions of the operation of the feedback generation process 2600 are provided below with regard to FIGS. 30-32. The process 2600 terminates processing at an end block 2690.

Figure 27:
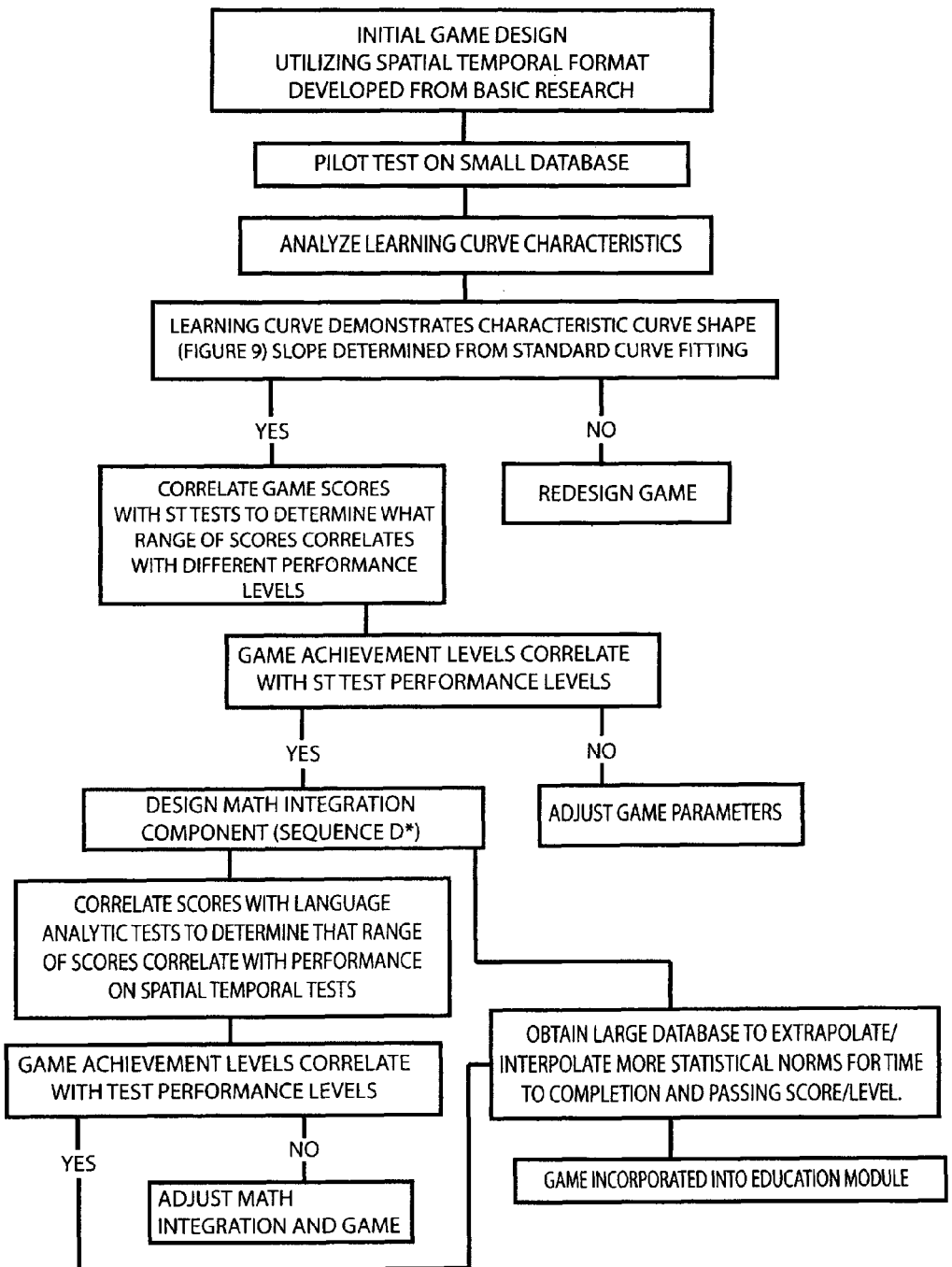
FIG. 27 is a flowchart illustrating a process of establishing parameter norms for the various games, tests, quizzes or lessons.

FIG. 27 is a flowchart illustrating a process of establishing parameter norms for the various games, tests, quizzes or lessons.

Figure 28:
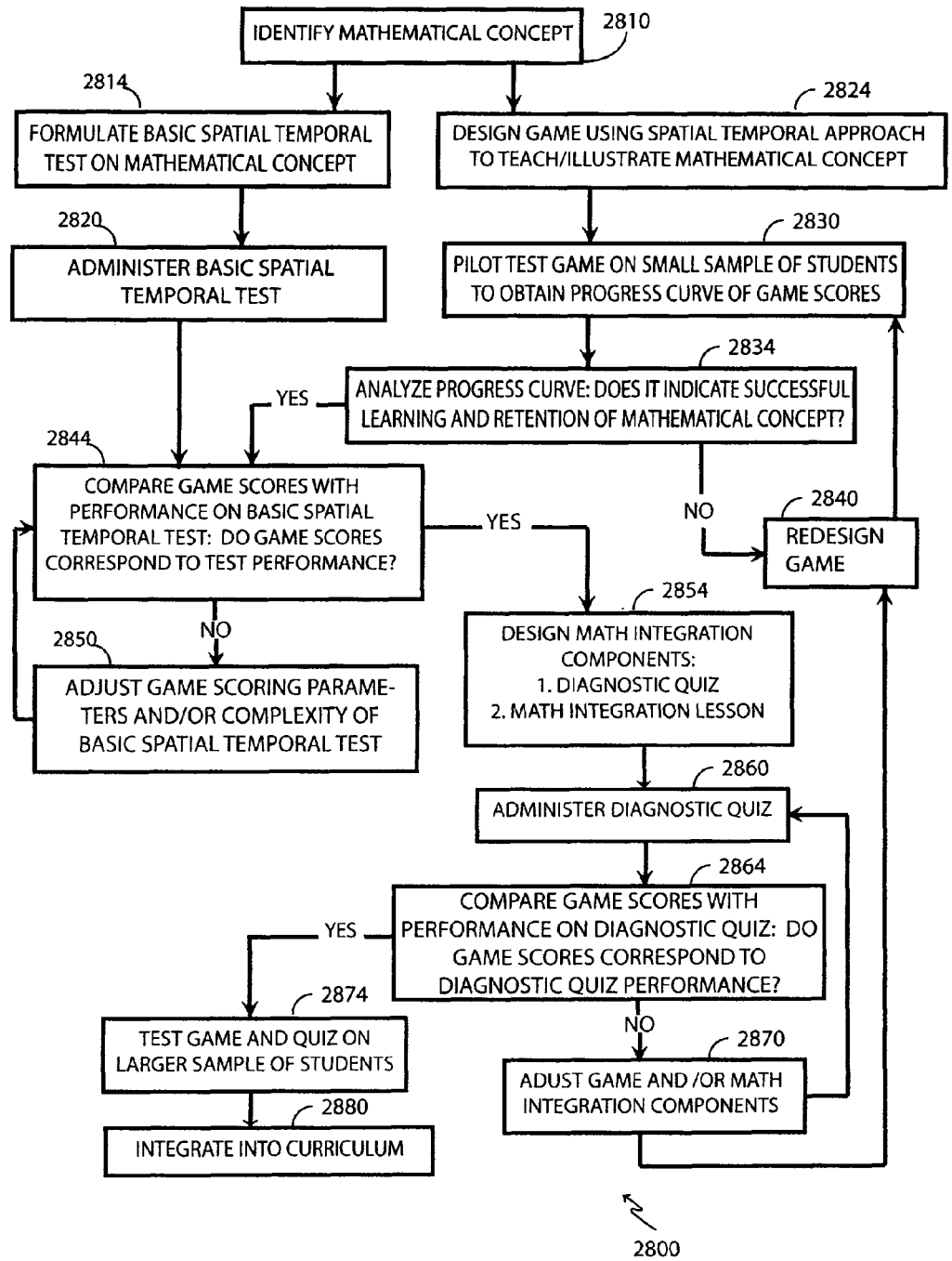
FIG. 28 is a flowchart illustrating a development process of a game, lesson, quiz, or test, for example, the STAR math video game.

FIG. 28 is a flowchart illustrating a development process 2800 of a game, lesson, quiz, or test, for example, the STAR math video game 220. In a block 2810, the process 2800 identifies the mathematical concept to be taught. In a block 2814, a basic spatial temporal test testing the solution of problems based on the identified mathematical concept via a spatial temporal approach or framework is formulated. In a block 2820, the basic spatial temporal test formulated at block 2814 is administered. Often a test formulated in this way can be used as an advanced math concept test 250. Conversely, an advanced math concept test 250 designed for the same mathematical concept can be used as the basic test.

The development process 2800 continues at a block 2824, in which a STAR math video game 220 is designed to present a problem based on the identified mathematical concept as a goal. This can be achieved via a spatial temporal approach. Thus, game play typically involves the manipulation of one or more objects in 2 or 3-dimensional space or time to solve the problem. In a block 2830, the STAR math video game 220 is pilot-tested with a small sample of students to obtain a progress curve of game scores. Each time a student plays the game or takes a lesson, quiz or test, a score is generated. The students are given multiple tries at playing the game to generate a score curve. The development process continues at a block 2834, at which the score curve is analyzed to determine if the sample of students has successfully learned and retained the identified mathematical concept. If a significant number of students from the sample has not successfully learned and retained the identified mathematical concept, the game may be flawed and may have to be redesigned at a block 2840. The analysis indicated by the block 2834 may be performed automatically by the analysis and feedback processing system 150, or manually by the designer of the STAR math video game 220 after the scores from the game have been determined and tabulated by the analysis and feedback processing system 150.

It should be noted that in the development process 2800, the blocks 2824, 2830, 2834 could be performed out concurrently or in parallel with the blocks 2814, 2820. In addition, the spatial temporal approach in the basic test of the block 2814, or the advanced math concept test 250, or the STAR math video game 220 in the block 2824, are not necessarily the same, but may be related in that they both may teach or illustrate the same or similar identified mathematical concept.

If the score curves analyzed in the block 2834 indicate that the student sample has successfully learned and retained the identified mathematical concept, in a block 2844 the performance on the STAR math video game 220 is compared to performance on the basic test or on the advanced math concept test 250 to ensure that they are commensurate. The comparison in block 2844 can be carried out on an individual student basis, as well as on a weighted average basis. If the two performances are not commensurate, the scoring parameters of the STAR math video game 250 or the complexity of the basic test or advanced the math concept test 250 are adjusted at a block 2850 until they are substantially commensurate.

In a block 2854 of the development process 2800, the math integration components corresponding to the STAR math video game 220, which comprise the diagnostic quiz 230 and the math integration lesson 240, are designed. In alternative embodiments, if there is a diagnostic quiz 230 or a math integration lesson 240 that corresponds to the identified mathematical concept, these can be used. The diagnostic quiz 230 and the math integration lesson 240 may correspond to one or more STAR math video games 220. In a block 2860, the corresponding diagnostic quiz 230 is administered to the student sample. In a block 2864, performance on the diagnostic quiz 230 and performance on the STAR math video game 220 are compared to ensure that they are commensurate. The comparison in the decision block 2864 may be carried out on an individual student basis, as well as on a weighted average basis. If the performances are not commensurate, the STAR math video game 220 or the diagnostic quiz 230 may be adjusted in a block 2870. As described above, since the diagnostic quiz 230 is typically designed to be on the level of a standardized test on the identified mathematical concept for that grade level, it may at times be preferable to adjust the STAR math video game 220.

The development process 2800 further includes a block 2874, at which the test and development process described above for blocks 2810-2870 is repeated with a larger student sample. In order to reduce the complexity of flowchart shown in FIG. 28, a single block 2874 represents this repeat test/development process. At a block 2880, the STAR math video game 220, the diagnostic quiz 230, the math integration lesson 240, or the advanced math concept test 250 can be integrated into the learning curriculum.

Figure 29:
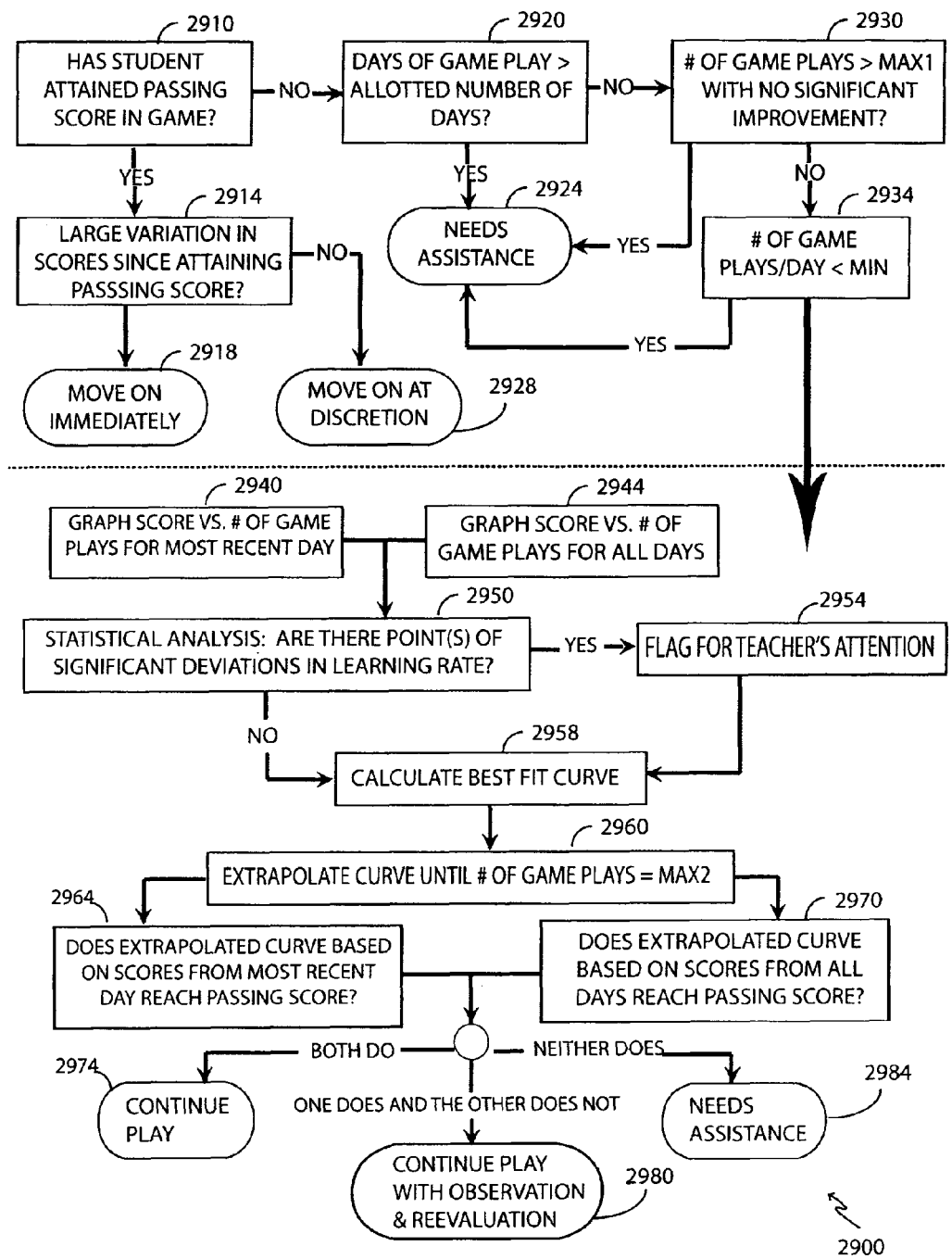
FIG. 29 is a flowchart illustrating a performance analysis and feedback generation process based on analysis of the student performance of the STAR game.

FIG. 29 is a flowchart illustrating a performance analysis and feedback generation process 2900 based on analysis of the student performance of the STAR game 220. At a block 2910, the process 2900 determines whether the student has attained a passing score in the STAR math video game 220. If the student has attained a passing score, the process 2900 determines at a block 2914 whether there is a large variation among the students' scores on subsequent plays of the game. If there is a large variation in subsequent scores, the process 2900 recommends that the student be moved immediately to the next task of the curriculum at a block 2918. If, on the other hand, there is not a large variation in subsequent scores as determined at the block 2914, the process 2900 recommends at a block 2928 that the student be moved on to the next task of the curriculum at the instructor's discretion.

If it is determined at the block 2910 that the student has not attained a passing score, the process 2900 determines at a block 2920 whether the student has played the game for more than the allotted number of days. If the student has not played for more than the allotted number of days, the process 2900 determines at a block 2930 whether the student has played the game over a preset maximum number of times without significant improvement. If the student has not played more than the maximum number of times with significant improvement, the process 2900 determines at a block 2934 whether the student played the game less than a minimum number of times on the most recent day. If any of the conditions in the blocks 2920, 2930, 2934 is answered in the affirmative, the process 2900 recommends assistance from the instructor for the student at a block 2924. If all of these conditions in the blocks 2920, 2930, 2934 are answered in the negative, the process 2900 proceeds with the following analysis that is represented by the flowchart below the dashed line in FIG. 29.

In a block 2940, the process 2900 graphs the scores versus the number of times the game is played for the most recent day. Similarly, in a block 2944 the process 2900 graphs the scores versus the number of times the game is played for all days. The process 2900 analyzes both of the graphs generated at the blocks 2944, 2944 at a block 2950 for significant deviation(s) in the learning rate. If it is determined at the block 2950 that there are significant deviations in the learning rate, the points at which such deviations occurred are identified and noted for the instructor's attention at a block 2954.

Each STAR math video game 220 is designed so that there is an approximately linear correlation between the score achieved and the progress achieved therein. For example, a score of 50% indicates that the student has progressed approximately halfway through the game. Thus, the rate of change in scores on successive game plays also corresponds to the student's learning rate. Therefore, a significant increase in the rate of change in scores may indicate a breakthrough in the student's learning, while a significant decrease in the rate of change may indicate a stumbling block or degradation of the student's learning, at least in the context of the analysis at the block 2950.

The process 2900 additionally includes a block 2958 for calculating a best-fit curve for each graph. In a block 2960, the curves are extrapolated until the number of times the game is played is equal to the maximum allotted number of allowable plays for the game. This maximum value of allowable plays is typically not equal to and usually is greater than the maximum number of game plays allowed without significant improvement as described above with regard to the block 2930. In a block 2964, the extrapolated curve for the most recent day's scores are evaluated to determine whether the passing score for the game is likely to be reached within the maximum allowed number of times in the block 2930. In a block 2970, the extrapolated curve for all days' scores are evaluated to determine whether the passing score for the game is likely to be reached within the maximum allowed number of times in the block 2930.

If the passing score is likely to be reached on both the extrapolated curves from the blocks 2964, 2970, the process 2900 recommends that the student continue playing the game at a block 2974. If the passing score is not likely to be reached on either the extrapolated curve from the blocks 2964, 2970, the process 2900 recommends that the instructor provide assistance to the student at a block 2984. If the passing score is likely to be reached only on one extrapolated curve and not the other in the blocks 2964, 2970, the process 2900 recommends at a block 2980 that the student continue playing, with further observation and reevaluation by the instructor.

Figure 30:
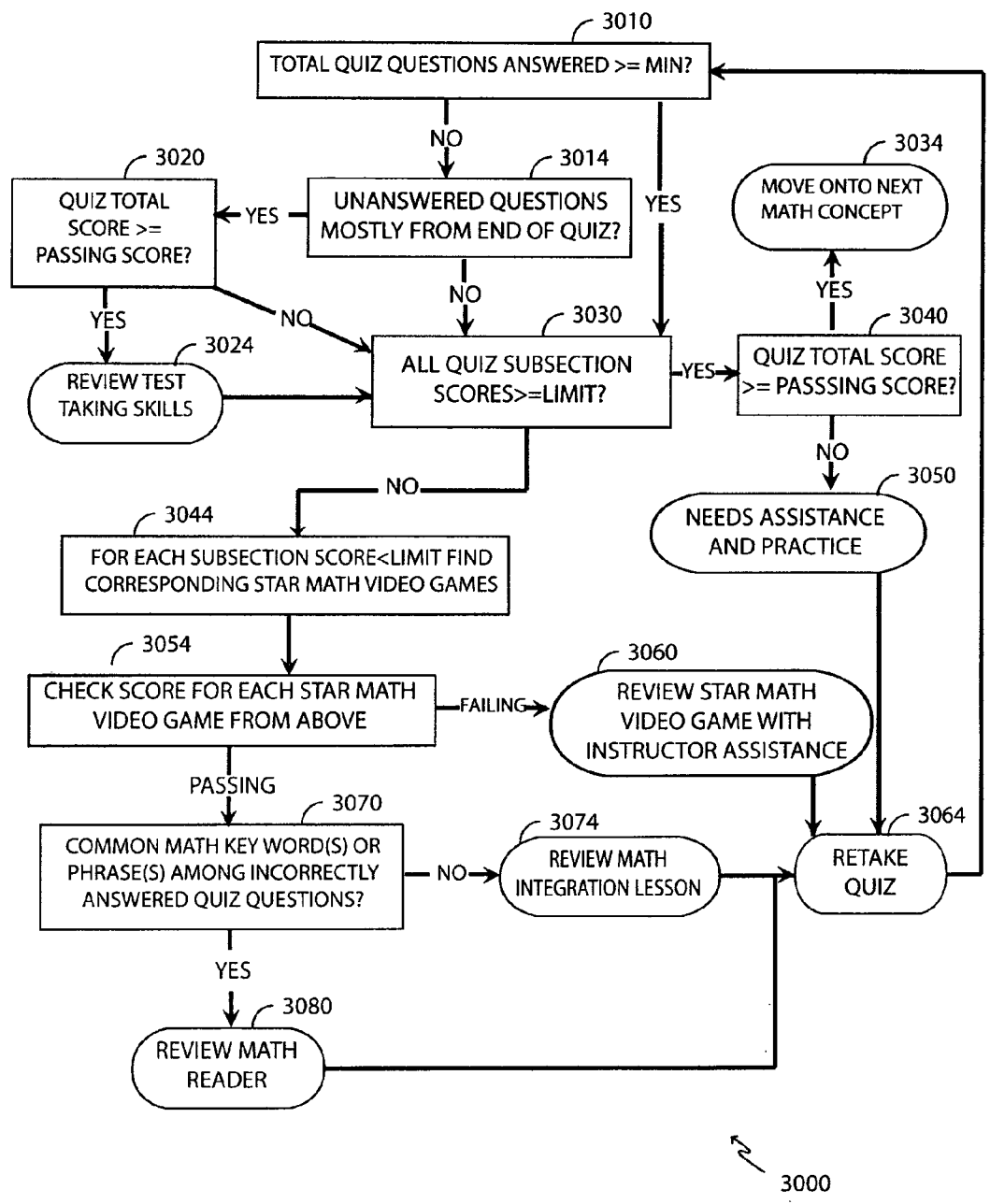
FIG. 30 is a flowchart illustrating a performance analysis and feedback generation process based on analysis of the student performance of the diagnostic quiz.

FIG. 30 is a flowchart illustrating a performance analysis and feedback generation process 3000 based on analysis of the student performance of the diagnostic quiz 230. At a block 3010, the process 3000 determines whether the total number of questions answered on the quiz is at least a preset minimum number. If at least the preset minimum number of questions are not answered, the process 3000 determines at a block 3014 whether the majority of the unanswered questions were from questions at the end of the quiz. If this is the case, the process 3000 determines at a block 3020 whether the student has passed the quiz, for example, whether the total quiz score is greater than or equal to the passing score assigned for the quiz. If the student passed the quiz but did not answer the questions from the end of the quiz, it is a possible indication of a lack of test taking time management skills. In this situation, the process 3000 recommends that the student review test-taking skills with the instructor at a block 3024. However, if the unanswered questions were mostly from the end of the quiz in the block 3014 and the student did not pass the quiz as determined at the block 3020, it likely indicates a lack of understanding of the subject matter. In this situation, a review of test taking skills would not be helpful and thus is not required. In either case, the process 3000 proceeds to a block 3030. If the total number of questions answered on the quiz is at least the preset minimum as determined at the block 3010, the process 3000 proceeds directly to the block 3030.

At the block 3030, the process 3000 determines whether the student has achieved a minimum score (denoted by "LIMIT" in FIG. 30) in every subsection of the quiz. The "LIMIT" is typically a lower percentage than the overall passing score. If the student has achieved scores of at least this "LIMIT" in each quiz subsection, the process 3000 determines at a block 3040 whether the student has passed the quiz. If the block 3040 determines that the student has passed the quiz, the process 3000 recommends that the student be advanced to the next mathematical concept at a block 3034. If the student has achieved scores of at least this "LIMIT" in each quiz subsection at the block 3030, but has failed the quiz at the block 3040, the process 3000 recommends at a block 3050 that the student needs additional assistance or practice, and should retake the quiz at a block 3064 after the additional assistance or practice.

If at the block 3030 it is determined that the student did not achieve a minimum score (as denoted by "LIMIT") in one or more quiz subsections, it is a possible indication that the student does not grasp a crucial part of the mathematical concept that is tested by that subsection. At a block 3044, the process 3000 identifies the STAR math video game 220 corresponding to these quiz subsections. At a block 3054, the process 3000 checks the student performance on these games. If the block 3054 determines that the student has failed on a game, the process 3000 recommends at a block 3060 that the instructor reviews the game with the student before retaking the quiz at the block 3064. If it is determined at the block 3054 that the student did not fail any STAR math video games 220, the process 3000 determines at a block 3070 whether there are any common mathematical key words or phrases among the incorrectly answered quiz questions. If there are common mathematical key words or phrases, the process 3000 recommends at a block 3080 that the student review the math reader to learn the key words or phrases to bridge the gap in the student's quiz performance. If it is determined at the block 3070 that there are no common key words or phrases, this indicates that the student does not know how to analyze quiz questions and translate them into a problem that is solvable using the spatial temporal approach the student learned from the STAR math video game 220. In this situation, the process 3000 recommends at a block 3074 that the instructor review the math integration lessons with him before retaking the quiz at the block 3064.

Figure 31:
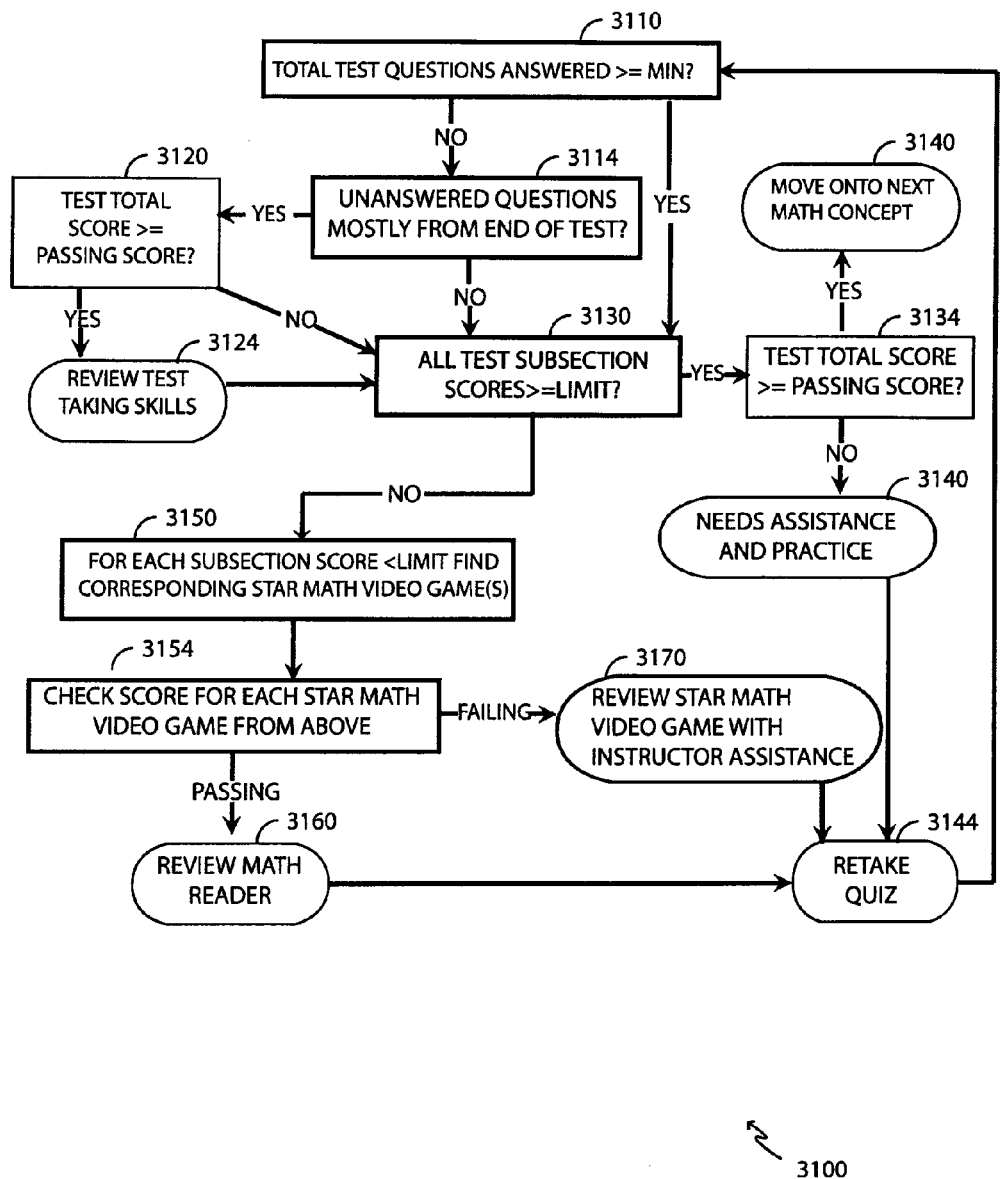
FIG. 31 is a flowchart illustrating a performance analysis and feedback generation process based on analysis of the student performance of the advanced math concept test.

FIG. 31 is a flowchart illustrating a performance analysis and feedback generation process 3100 based on analysis of the student performance of the advanced math concept test 250. At a block 3110, the process 3100 determines whether the total number of questions answered on the test is at least a preset minimum number. If it is determined at the block 3110 that at least the preset minimum number of questions are not answered, the process 3100 determines at a block 3114 whether the majority of the unanswered questions were from questions at the end of the test. If this is the case, the process 3100 determines at a block 3120 whether the student has passed the test, for example, whether the total test score is greater than or equal to the passing score assigned for the test. If the student passed the test but did not answer the questions from the end of the test, it is a possible indication of a lack of test taking time management skills. In this situation, the process 3100 recommends that the student review test-taking skills with the instructor at a block 3124. However, if the unanswered questions were mostly from the end of the test in the block 3114 and the student did not pass the test as determined at the block 3120, it likely indicates a lack of understanding of the subject matter. In this situation, a review of test taking skills would not be helpful and thus is not required. In either case, the process 3100 proceeds to a block 3130. If the total number of questions answered on the test is at least the preset minimum as determined at the block 3110, the process 3100 proceeds directly to the block 3130.

At the block 3130, the process 3100 determines whether the student has achieved a minimum score (denoted by "LIMIT" in FIG. 31) in every subsection of the test. The "LIMIT" is typically a lower percentage than the overall passing score. If the student has achieved scores of at least this "LIMIT" in each test subsection, the process 3100 determines at a block 3134 whether the student has passed the quiz. If the block 3134 determines that the student has passed the quiz, the process 3100 recommends that the student be advanced to the next mathematical concept at a block 3140. If the student has achieved scores of at least this "LIMIT" in each test subsection at the block 3130, but has failed the test at the block 3134, the process 3100 recommends at a block 3140 that the student needs additional assistance or practice, and should retake the quiz at a block 3144 after the additional assistance or practice.

If at the block 3130 it is determined that the student did not achieve a minimum score (as denoted by "LIMIT") in one or more test subsections, it is a possible indication that the student does not grasp a crucial part of the mathematical concept that is tested by that subsection. At a block 3150, the process 3100 identifies the STAR math video game 220 corresponding to these test subsections. At a block 3154, the process 3100 checks the student performance on these games. If the block 3154 determines that the student has failed on a game, the process 3100 recommends at a block 3170 that the instructor reviews the game with the student before retaking the quiz at the block 3144. If it is determined at the block 3154 that the student did not fail any STAR math video games 220, the process 3100 recommends at a block 3160 that the student review the math reader to bridge the gap in the student's test performance before retaking the test at the block 3144.

Figure 32:
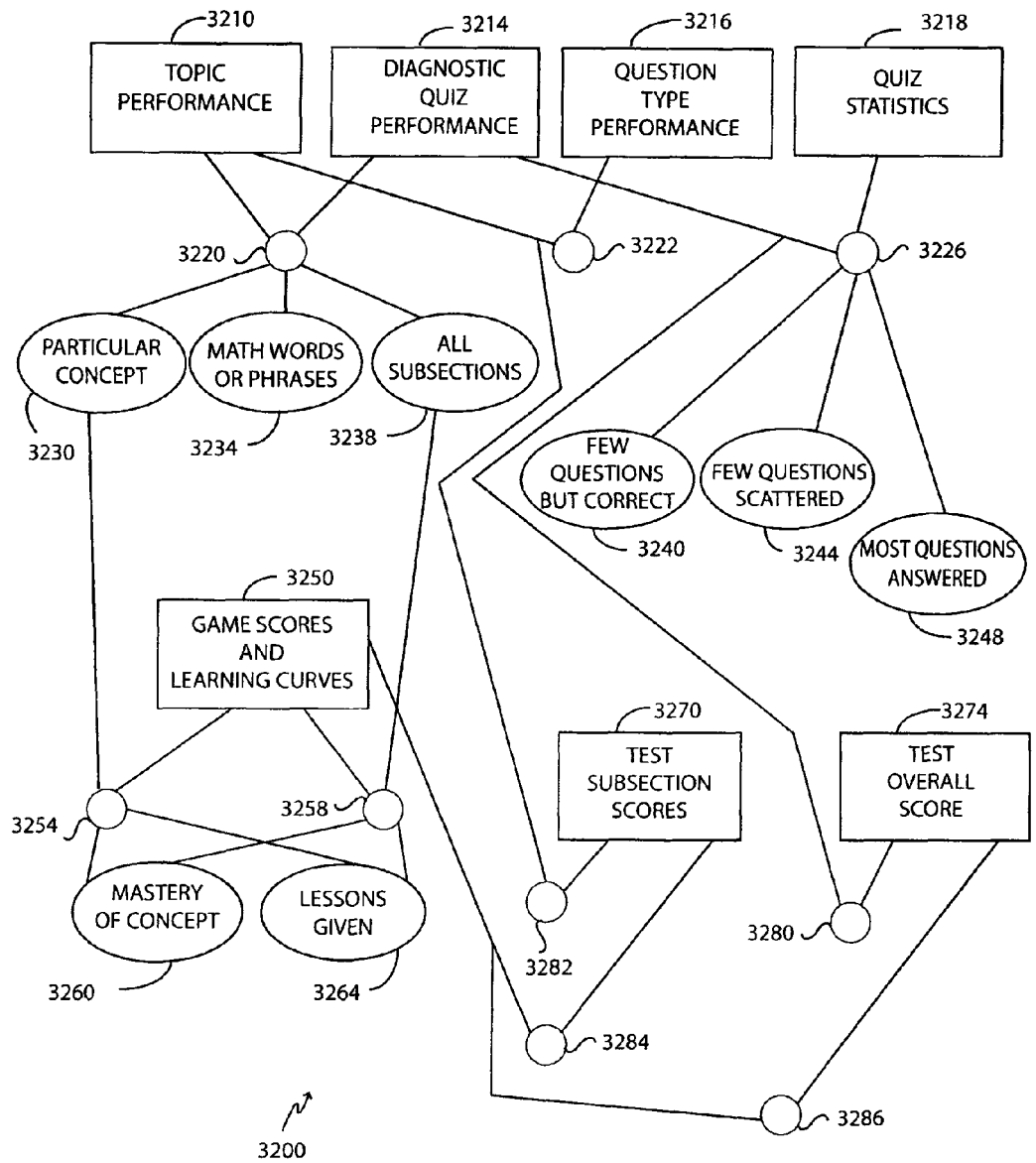
FIG. 32 is a diagram illustrating comparisons between various game, quiz or test components by the analysis and feedback processing system in performing analysis or assessment computations.

FIG. 32 is a diagram 3200 illustrating comparisons between various game, quiz or test components by the analysis and feedback processing system 150 in performing analysis or assessment computations. In the diagram 3200, blocks represent various game, quiz and test components, small circles represent comparisons between components performed by the analysis and feedback processing module 150, and ovals represent possible outcomes or determinations resulting from the comparisons.

The comparison diagram 3200 includes a topic performance block 3210 representing quiz subsection scores and performance data for various quiz topics, and a diagnostic quiz performance block 3214 representing the overall quiz score for particular students, classes or schools. A comparison 3220 performs a comparison of the overall diagnostic quiz score 3214 and the subsection scores covering specific concepts 3210. From the comparison 3220, the analysis and feedback processing module 150 determines whether a particular problem is confined to a particular subset of concepts or spans the entire concept at an outcome 3230, whether a particular problem involves questions particular to math words or phrases at an outcome 3234, or whether a particular problem involves incorrect answers to questions over all quiz subsections at an outcome 3238. For example, if the concept is fractions, the particular problem may be in understanding thirds (fractions with 3 in the denominator), or if multiplication, the particular problem may be in carrying an overflow from one digit to the next. The result of the outcome 3230 is passed down to a comparison 3254 with a game score and learning curve integration lesson block 3250 as described below.

The comparison diagram additionally includes a question type performance block 3216 representing the subsection score for particular types of quiz questions, and a quiz statistics block 3218 representing certain statistical data regarding the quiz. For example, the quiz statistics block 3218 can include the number of quiz questions answered or the percent correct of all quiz questions answered by the student, class, school or district. A comparison 3222 performs a comparison of the question type performance 3216 and the quiz topic (subsection) performance 3210. Based on the comparison 3222, the analysis and feedback processing module 150 determines whether the problem involves a particular type or format of problem rather than understanding of a concept. In this case, recommendations typically include to practice taking the quiz with a focus on the particular type of question and the recommended approach to solving the type of question.

The comparison diagram 3200 further includes a comparison 3226 between the diagnostic quiz performance overall score 3214 and the quiz statistics 3218. The comparison 3226 determines whether a low quiz score is due to deficiencies in understanding the concepts, or is a result of poor test taking skills or math language skills. From the comparison 3218, a recommended corrective action can be determined. An outcome 3240 is reached if performance was high on the questions actually answered, the answered questions were concentrated at the beginning of the quiz, and the remaining questions past the beginning of the quiz were unanswered. In this case, it is recognized that the student's understanding of the subject matter may be high, but that the problem might be poor test taking abilities. Students in this situation are recommended to practice taking quizzes and review test taking strategies. An outcome 3244 is reached if performance was high on questions actually answered, with the answered questions being scattered throughout the quiz. In this event, the problem may be due to poor understanding of the concepts, which is revealed by the comparison with the math integration lessons, or may be due to poor language analytic skills. An outcome 3248 is reached if most or all questions were answered in the quiz, but many of the questions were answered incorrectly. In this case, the problem is likely due to poor understanding of the concepts or poor language analytic skills.

The comparison diagram 3200 also includes a comparison 3258 between the video game scores and learning curves component 3250 and the diagnostic quiz performance component 3214. Poor performance on a diagnostic quiz over an entire concept, as represented by the outcome 3238, leads to analysis regarding: (1) examination of performance on the relevant math video game(s) teaching that concept; and (2) examination of the math integration games and lessons relating the relevant STAR games to performance in the language analytic form. From these examinations, a recommended corrective action can be determined based on whether one of the following contingencies having been realized: (1) the relevant STAR game(s) or math integration was not given; (2) the relevant STAR game(s) or math integration was given but mastery was not obtained; or (3) mastery of the STAR games (s) or math integration was achieved.

In the first case where the game or math integration has not been given, the recommendation is to give the relevant STAR math integration instruction at an outcome 3264. In the second case where the game(s) or math integration was given but mastery was not obtained, the recommendation is to go back to the relevant STAR math integration until the student achieves mastery of the subject matter, also at the outcome 3264. If after concentrated effort, mastery is not achieved, detailed analysis is conducted (e.g., through DDE) to determine the specific conceptual difficulties in learning that are preventing mastery of the subject matter. In the third case where mastery was achieved at an outcome 3260, the problem lies outside of the realm of student understanding, and falls within the area of test taking difficulties. In this case, the recommendation is to review test-taking strategies, retake the quiz to practice test taking, and a study of the relevant language in the math reader materials.

The comparison diagram 3200 additionally includes a comparison 3254 between the video game scores and learning curves component 3250 and the quiz topic performance 3210 or quiz subsection scores. In the comparison 3254, the actions and recommendations are the same as in the comparison 3258 with overall score as described above, except that the area of concentration is more focused.

The comparison diagram 3200 also includes a comparison 3280 between the diagnostic quiz overall score performance 3214 and a test overall score 3274, for example, an advanced math concepts (AMC) test overall score. The comparison 3280 provides a measure of understanding of the concept versus the language skills. For example, if performance is high on the AMC test, but low on quizzes or on standardized tests, this typically indicates a problem with aspects of language aspects. Math reader study is recommended in this case. However, if performance is high on quizzes, but low on the AMC test, review of STAR games is recommended.

The comparison diagram 3200 further includes a comparison 3282 between the quiz topic performance subsection score 3210 and a test subsection score component 3270, for example, an AMC test subsection score component. The comparison 3282 is similar to the comparison 3280, but is more focused on a particular concept.

The comparison diagram 3200 additionally includes a comparison 3284 between the STAR math video game scores and learning curves 3250 and the test overall score 3274. The comparison 3284 provides a comprehensive test of the student's understanding of concepts from a spatial temporal learning standpoint. The comparison diagram 3200 also includes a comparison 3286 between the STAR video game performance component 3250 and the test subsection scores component 3270. The comparison 3286 is similar to the comparison 3284 described above, although more focused on a particular concept.

Figure 33:
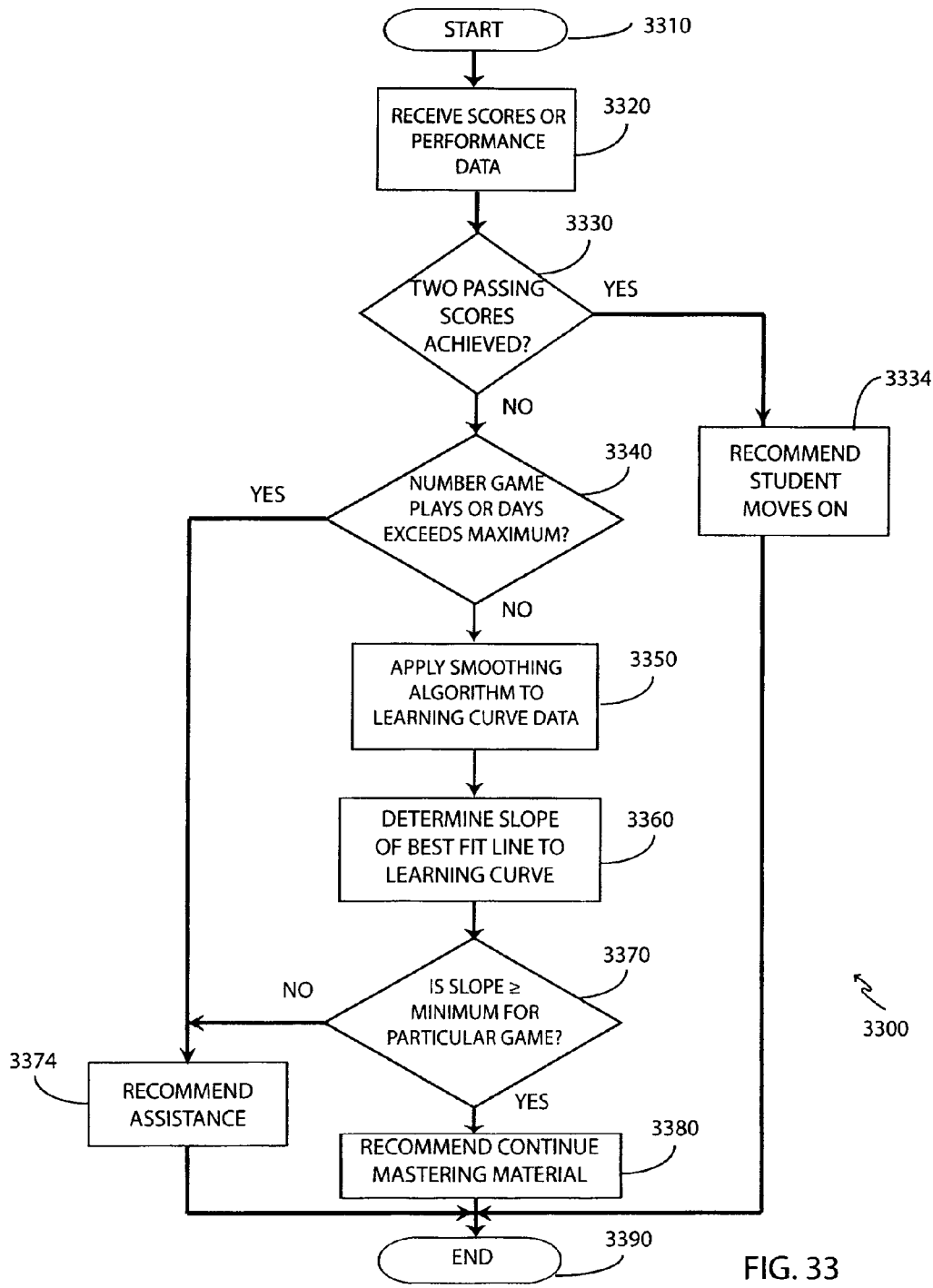
FIG. 33 is a flowchart illustrating an algorithm for determining recommendations based on student performance parameters.

FIG. 33 is a flowchart illustrating an algorithmic process 3300 for determining recommendations based on student performance parameters. The process 3300 begins at a start block 3310. The process continues at a block 3320 for receiving student scores or performance data, for example, via the network 140 such as the Internet. The performance data includes one or more of the following parameters: (1) the maximum number of plays in which specific milestones of performance, e.g., game scores or game levels, should be reached within a determined margin of variance; and (2) the maximum number of days over which these plays may be spread allowing for normal progress within the spatial temporal math program.

At a decision block 3330, the process 330 determines whether the student has achieved a passing score two or more times. It the student has achieved a passing score two or more times, the process 3300 continues to a block 3334 to recommend that the student move on to the next game, lesson, quiz or test. The process continues to an end block 3390 at which the process 330 terminates.

If it is determined at the decision block 3330 that the student has not achieved a passing score two or more times, the process continues to a decision block 3340 to determine whether the number of times the game has been played or the numbers of days over which the game has been played exceeds the maximum allowed number of plays or days of play that have been established for the particular game. If the maximum has been exceeded, the process 3300 continues to a block 3374 to recommend that the student receive assistance from the teacher.

If it is determined at the decision block 3340 that the maximum has not been exceeded, the process 330 continues to a block 3350 to apply smoothing algorithms to the learning curve data. At a block 3360, the process 3300 determines the slope of the best fit line to the learning curve using the points obtained. In addition, if the game has been played more than five times, the block 3360 determines the slope of the best fit line to the portion of the learning curve corresponding to the last five plays. At a decision block 3370, the process 3300 determines whether the slope of these lines is greater than or equal to the minimum established for the particular game. The process 3300 determines the minimum slopes by calculating the point at which the line will cross the horizontal line corresponding to a passing score, which is referred to as extrapolation. If the slope is such that the student will not reach the passing line within the maximum number of plays, the process 3300 recommends assistance be given to the student. This includes the case where no learning is taking place, e.g., the slope of the learning curve is zero or negative.

If the slope is not greater than or equal to the minimum, the process 3300 continues to the block 3374 to recommend that the student receive assistance. If it is determined at the decision block 3370 that the slope is greater than or equal to the minimum, the process 3300 continues to a block 3380 to recommend that the student be left to continue mastering the material.

While the above detailed description has shown, described, and pointed out novel features of the invention as applied to various embodiments, it will be understood that various omissions, substitutions, and changes in the form and details of the device or process illustrated may be made by those of ordinary skill in the technology without departing from the spirit of the invention. This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of analyzing successive performances by a student for a computerized quiz and providing feedback based on the performances, the method comprising:
   determining, via a computer system, whether a student score is above a threshold passing score to identify that the student has achieved a passing score on a quiz;
   comparing the passing score of the student to at least one score obtained from at least one subsequent quiz;
   determining, via the computer system, whether the student is authorized to progress to a next task of a curriculum or whether the student needs assistance from an instructor based on the comparison;
   analyzing, via the computer system, the passing score of the student and the at least one subsequent quiz score to generate a learning curve and determine whether a deviation in a learning rate exists;
   calculating a best fit curve to the learning curve;
   extrapolating the best fit curve to determine whether the threshold passing score will be reached within a maximum allotted number of times of taking the quiz; and
   generating, via the computer system, feedback data based on the determination of whether the threshold passing score will be reached within the maximum allotted number of times of taking the quiz, wherein generating feedback data is additionally based on whether a number of game plays or days the game is played exceeds a predetermined value.

2. The system method of claim 1, wherein the game comprises a spatial temporal math video game.

3. The method of claim 1, wherein the feedback data comprises recommending that the student continue taking the quiz, recommending that the instructor provide assistance to the student, or recommending that the student continue taking the quiz with further observation and reevaluation by the instructor.

4. The method of claim 1, wherein the determining whether a deviation in a learning rate exists comprises graphing the quiz scores against the number of times the quiz is taken for the most recent day.

5. The method of claim 4, wherein the determining whether a deviation in a learning rate exists further comprises comparing the quiz scores against the number of times the quiz is taken for all days the quiz is taken.

6. The method of claim 1, wherein analyzing scores of the student additionally comprises determining whether a variation in scores since attaining the passing score exceeds a selected value.

7. The method of claim 6, wherein generating feedback data is additionally based on whether the variation in scores since attaining the passing score exceeds the selected value.

8. The method of claim 1, wherein feedback data is additionally generated by determining whether a slope of the best fit curve is greater or equal to a minimum slope for the quiz, wherein the minimum slope for the quiz is the slope of the best fit curve at a calculated point at which the best fit curve crosses a horizontal line corresponding to a passing score.

9. A method of developing a computerized game for teaching mathematical concepts to a student, the method comprising:
   determining a mathematical concept to be taught to a student;
   formulating a basic spatial temporal test of the mathematical concept;
   administering, via a computer system, the basic spatial temporal test to the student;
   testing an initially designed game of the mathematical concept to obtain a progress curve of game scores;
   analyzing, via the computer system, the progress curve for the game to determine whether it indicates successful learning and retention of the mathematical concept;
   comparing, via the computer system, a score on the initially designed game with a score on the basic spatial temporal test to determine whether the game score is commensurate with the test score;
   administering, via the computer system, a diagnostic quiz of the mathematical concept to the student;
   comparing, via the computer system, the game score to a score on the diagnostic quiz to determine whether the game score is commensurate with the diagnostic quiz score;
   determining that the game is deficient if the game score is not commensurate with the diagnostic quiz score;
   determining adjustments to the game or the diagnostic quiz based on the comparison of the game score to the diagnostic quiz score if the game is deficient;
   redesigning the game based on the adjustments to the game or the diagnostic quiz; and
   integrating the redesigned game into an educational curriculum.

10. The method of claim 1, wherein the game is a spatial temporal math video game.

11. A non-transitory computer readable storage medium having stored thereon instructions that when executed by a computer processor perform a method of analyzing successive performances by a student for a computerized game and providing feedback based on the performances, the method comprising:
   determining whether a student score is above a threshold passing score to identify that the student has achieved a passing score on a quiz;
   comparing the passing score of the student to at least one score obtained from at least one subsequent quiz;
   determining whether the student is authorized to progress to a next task of a curriculum or whether the student needs assistance from an instructor based on the comparison;
   analyzing the passing score of the student and the at least one subsequent quiz score to generate a learning curve and determine whether a deviation in a learning rate exists;
   calculating a best fit curve to the learning curve;
   extrapolating the best fit curve to determine whether the threshold passing score will be reached within a maximum allotted number of times of taking the quiz; and
   generating feedback data based on the determination of whether the threshold passing score will be reached within the maximum allotted number of times of taking the quiz, wherein generating feedback data is additionally based on whether a number of game plays or days the game is played exceeds a predetermined value.

12. The computer readable storage medium having stored thereon instructions that when executed by a computer processor perform the method of claim 11, wherein the feedback data comprises recommending that the student continue taking the quiz, recommending that the instructor provide assistance to the student, or recommending that the student continue taking the quiz with further observation and reevaluation by the instructor.

13. The computer readable storage medium having stored thereon instructions that when executed by a computer processor perform the method of claim 11, wherein the determining whether a deviation in a learning rate exists comprises graphing the quiz scores against the number of times the quiz is taken for the most recent day.

14. The computer readable storage medium having stored thereon instructions that when executed by a computer processor perform the method of claim 13, wherein the determining whether a deviation in a learning rate exists further comprises graphing the quiz scores against the number of times the quiz is taken for all days the quiz is taken.

15. The computer readable storage medium having stored thereon instructions that when executed by a computer processor perform the method of claim 11, wherein each quiz can have a different minimum slope.

16. The computer readable storage medium having stored thereon instructions that when executed by a computer processor perform the method of claim 11, wherein analyzing scores of the student additionally comprises determining whether a variation in scores since attaining the passing score exceeds a selected value.

\* \* \* \* \*

UNITED STATES PATENT AND TRADEMARK OFFICE
CERTIFICATE OF CORRECTION

PATENT NO.        : 8,491,311 B2                                                    Page 1 of 2
APPLICATION NO.   : 10/675232
DATED             : July 23, 2013
INVENTOR(S)       : Bodner et al.

It is certified that error appears in the above-identified patent and that said Letters Patent is hereby corrected as shown below:

In the Drawings

Sheet 6 of 33 (FIG. 6) at line 6, Change "squre" to --square--.
Sheet 6 of 33 (FIG. 6) at line 9, Change "tringles" to --triangles--.

In the Specification

In column 3 at line 38, Change "data" to --data.--.
In column 3 at line 61, Change "qiuze" to --quiz--.
In column 18 after line 35, insert the following paragraph --The performance analysis processing module 830 additionally includes an individual learning curve graph module 960. The individual learning curve graph module 960 is configured to display a screen having a single learning curve as discussed above with regard to the learning curve graphing module 950. An example of a screen display that displays an individual learning curve graph is shown in FIG. 13 and described below.--.

In column 18 at lines 50-62, cancel the following text: "The performance analysis processing module 830 additionally includes one or more feedback recommendations module 970, 980. The operations of the feedback recommendations module 970, 980 can be performed in one or more modules, and are shown in FIG. 9, for example, as multiple modules to illustrate that one or more types of feedback data can be produced. In the example shown in FIG. 9, the feedback recommendation module 970 provides feedback based on STAR game performance data, and the feedback recommendation module 980 provides feedback based on diagnostic quiz performance data. Examples of screen displays that illustrate several of possible feedback recommendations are shown in Signed and Sealed this
Twenty-third Day of December, 2014

Michelle K. Lee
*Deputy Director of the United States Patent and Trademark Office*

FIGS. 15 and 16 and described below.".

In the Claims

In column 33 at line 39, In Claim 2, change "system method" to --method--.

In column 34 at line 34, In Claim 10, change "claim 1," to --claim 9,--.